United States Patent
Marjanovic et al.

(10) Patent No.: US 10,144,093 B2
(45) Date of Patent: *Dec. 4, 2018

(54) METHOD FOR RAPID LASER DRILLING OF HOLES IN GLASS AND PRODUCTS MADE THEREFROM

(71) Applicant: CORNING INCORPORATED, Corning, NY (US)

(72) Inventors: Sasha Marjanovic, Painted Post, NY (US); Garrett Andrew Piech, Corning, NY (US); Shyamala Shanmugam, Painted Post, NY (US); Carlos Alberto Pons Siepermann, Grand Island, NY (US); Sergio Tsuda, Horseheads, NY (US); Zsigmond Varga, Cambridge, MA (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,453

(22) Filed: Aug. 30, 2016

(65) Prior Publication Data

US 2016/0368100 A1    Dec. 22, 2016

Related U.S. Application Data

(62) Division of application No. 14/535,754, filed on Nov. 7, 2014, now Pat. No. 9,517,963.

(Continued)

(51) Int. Cl.
*B23K 26/384*    (2014.01)
*B23K 26/402*    (2014.01)

(Continued)

(52) U.S. Cl.
CPC ........ *B23K 26/384* (2015.10); *B23K 26/0057* (2013.01); *B23K 26/04* (2013.01);
(Continued)

(58) Field of Classification Search
CPC ... C03B 33/091; C03B 33/0222; C03C 15/00; C03C 23/0025; B23K 26/0057;
(Continued)

(56) References Cited

U.S. PATENT DOCUMENTS

| | | |
|---|---|---|
| 1,790,397 A | 1/1931 | Woods et al. |
| 2,682,134 A | 6/1954 | Stookey |

(Continued)

FOREIGN PATENT DOCUMENTS

| | | |
|---|---|---|
| CN | 2388062 Y | 7/2000 |
| CN | 1283409 C | 11/2006 |

(Continued)

OTHER PUBLICATIONS

Abramov et al., "Laser separation of chemically strengthened glass"; Physics Procedia 5 (2010) 285-290, Elsevier.; doi: 10.1016/j.phpro.2010.08.054.
(Continued)

*Primary Examiner* — Queenie S Dehghan
(74) *Attorney, Agent, or Firm* — John P. McGroarty; Svetlana Z. Short

(57) ABSTRACT

Forming holes in a material includes focusing a pulsed laser beam into a laser beam focal line oriented along the beam propagation direction and directed into the material, the laser beam focal line generating an induced absorption within the material, the induced absorption producing a defect line along the laser beam focal line within the material, and translating the material and the laser beam relative to each other, thereby forming a plurality of defect lines in the material, and etching the material in an acid solution to
(Continued)

produce holes greater than 1 micron in diameter by enlarging the defect lines in the material. A glass article includes a stack of glass substrates with formed holes of 1-100 micron diameter extending through the stack.

26 Claims, 43 Drawing Sheets

Related U.S. Application Data

(60) Provisional application No. 62/073,191, filed on Oct. 31, 2014, provisional application No. 62/023,429, filed on Jul. 11, 2014, provisional application No. 61/917,179, filed on Dec. 17, 2013.

(51) Int. Cl.
| | |
|---|---|
| *C03B 33/09* | (2006.01) |
| *B23K 26/04* | (2014.01) |
| *C03B 33/02* | (2006.01) |
| *C03C 15/00* | (2006.01) |
| *B32B 17/06* | (2006.01) |
| *C03C 17/00* | (2006.01) |
| *B23K 26/00* | (2014.01) |
| *B23K 26/06* | (2014.01) |
| *B23K 26/38* | (2014.01) |
| *B23K 26/0622* | (2014.01) |
| *C09K 13/00* | (2006.01) |

(52) U.S. Cl.
CPC ...... *B23K 26/0613* (2013.01); *B23K 26/0617* (2013.01); *B23K 26/0624* (2015.10); *B23K 26/38* (2013.01); *B23K 26/402* (2013.01); *B32B 17/064* (2013.01); *C03B 33/0222* (2013.01); *C03B 33/091* (2013.01); *C03C 15/00* (2013.01); *C03C 17/00* (2013.01); *B23K 26/006* (2013.01); *C03C 2217/70* (2013.01); *C09K 13/00* (2013.01); *Y02P 40/57* (2015.11); *Y10T 428/24273* (2015.01); *Y10T 428/24322* (2015.01)

(58) Field of Classification Search
CPC ............... B23K 26/0617; B23K 26/38; B23K 26/0624; B23K 26/0613; B23K 26/006
See application file for complete search history.

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,491,983 B2 | 7/2013 | Ono et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |

(56) References Cited

U.S. PATENT DOCUMENTS

| | | |
|---|---|---|
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 9,517,963 B2 | 12/2016 | Marjanovic et al. |
| 2001/0027842 A1 | 10/2001 | Curcio et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0213883 A1 | 9/2006 | Eberhardt et al. |
| 2006/0227440 A1 | 10/2006 | Gluckstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1* | 1/2009 | Koyo ............... B23K 26/0093 65/31 |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0020304 A1* | 1/2010 | Soer ................ G03F 7/70191 355/71 |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0106117 A1 | 5/2012 | Sundaram et al. |
| 2012/0131962 A1 | 5/2012 | Mitsugi et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1* | 5/2014 | Shorey ................ C03B 33/102 428/137 |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |

(56) References Cited

U.S. PATENT DOCUMENTS

| | | | |
|---|---|---|---|
| 2014/0333929 A1 | 11/2014 | Sung et al. | |
| 2014/0361463 A1 | 12/2014 | DeSimone et al. | |
| 2015/0038313 A1 | 2/2015 | Hosseini | |
| 2015/0060402 A1* | 3/2015 | Burkett | B23K 26/006 216/41 |
| 2015/0075221 A1 | 3/2015 | Kawaguchi et al. | |
| 2015/0075222 A1 | 3/2015 | Mader | |
| 2015/0110442 A1 | 4/2015 | Zimmel et al. | |
| 2015/0118522 A1 | 4/2015 | Hosseini | |
| 2015/0136743 A1 | 5/2015 | Hosseini | |
| 2015/0140241 A1 | 5/2015 | Hosseini | |
| 2015/0140735 A1 | 5/2015 | Hosseini | |
| 2015/0151380 A1 | 6/2015 | Hosseini | |
| 2015/0158120 A1 | 6/2015 | Courvoisier et al. | |
| 2015/0165548 A1 | 6/2015 | Marjanovic et al. | |
| 2015/0165560 A1 | 6/2015 | Hackert et al. | |
| 2015/0165562 A1 | 6/2015 | Marjanovic et al. | |
| 2015/0165563 A1 | 6/2015 | Manley et al. | |
| 2015/0166391 A1 | 6/2015 | Marjanovic et al. | |
| 2015/0166393 A1 | 6/2015 | Marjanovic et al. | |
| 2015/0166394 A1 | 6/2015 | Marjanovic et al. | |
| 2015/0166395 A1 | 6/2015 | Marjanovic et al. | |
| 2015/0166396 A1 | 6/2015 | Marjanovic et al. | |
| 2015/0166397 A1 | 6/2015 | Marjanovic et al. | |
| 2015/0183679 A1 | 7/2015 | Saito | |
| 2015/0232369 A1 | 8/2015 | Marjanovic et al. | |
| 2015/0299018 A1 | 10/2015 | Bhuyan et al. | |
| 2015/0360991 A1 | 12/2015 | Grundmueller et al. | |
| 2015/0367442 A1 | 12/2015 | Bovatsek et al. | |
| 2016/0008927 A1 | 1/2016 | Grundmueller et al. | |
| 2016/0009066 A1 | 1/2016 | Nieber et al. | |
| 2016/0023922 A1 | 1/2016 | Addiego et al. | |
| 2016/0031745 A1 | 2/2016 | Ortner et al. | |
| 2016/0060156 A1 | 3/2016 | Krueger et al. | |
| 2016/0279895 A1 | 9/2016 | Marjanovic | |
| 2016/0280580 A1 | 9/2016 | Bohme | |
| 2016/0290791 A1 | 10/2016 | Buono et al. | |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 1994318756 | 11/1994 |
| JP | 9106243 A | 4/1997 |
| JP | 11197498 A | 7/1999 |
| JP | 1999197498 | 7/1999 |
| JP | 11269683 A | 10/1999 |
| JP | 1999269683 | 10/1999 |
| JP | 11330597 A | 11/1999 |
| JP | 1999330597 | 11/1999 |
| JP | 11347758 A | 12/1999 |
| JP | 1999347758 | 12/1999 |
| JP | 2001138083 A | 5/2001 |
| JP | 2002210730 | 7/2002 |
| JP | 2002210730 A | 7/2002 |
| JP | 2002228818 A | 8/2002 |
| JP | 2003025085 A | 1/2003 |
| JP | 2003114400 A | 4/2003 |
| JP | 2003154517 | 5/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 | 10/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |

(56) References Cited

FOREIGN PATENT DOCUMENTS

| WO | 2008080182 | A1 | 7/2008 |
|---|---|---|---|
| WO | 2008128612 | A1 | 10/2008 |
| WO | 2009114375 | | 9/2009 |
| WO | 2009114375 | A2 | 9/2009 |
| WO | 2012075072 | | 9/2009 |
| WO | 2010035736 | A1 | 4/2010 |
| WO | 2010111609 | A2 | 9/2010 |
| WO | 2010129459 | A2 | 11/2010 |
| WO | 2011025908 | A1 | 3/2011 |
| WO | 2011056781 | A1 | 5/2011 |
| WO | 2012006736 | A2 | 1/2012 |
| WO | 2012075072 | A2 | 6/2012 |
| WO | 2012166753 | | 6/2012 |
| WO | 2012108052 | A1 | 8/2012 |
| WO | 2012166753 | A1 | 12/2012 |
| WO | 2013022148 | A1 | 2/2013 |
| WO | 2013043173 | A1 | 3/2013 |
| WO | 2013138802 | A1 | 9/2013 |
| WO | 2013150990 | A1 | 10/2013 |
| WO | 2013153195 | A1 | 10/2013 |
| WO | 2014028022 | A1 | 2/2014 |
| WO | 2014064492 | A1 | 5/2014 |
| WO | 2014079478 | | 5/2014 |
| WO | 2014079478 | A1 | 5/2014 |
| WO | 2014079570 | | 5/2014 |
| WO | 2014079570 | A1 | 5/2014 |
| WO | 2014085663 | A1 | 6/2014 |
| WO | 2014111385 | A1 | 7/2014 |
| WO | 2014111794 | A1 | 7/2014 |
| WO | 2014161534 | | 10/2014 |
| WO | 2014161534 | A2 | 10/2014 |
| WO | 2014161535 | | 10/2014 |
| WO | 2014161535 | A2 | 10/2014 |
| WO | 2015077113 | A1 | 5/2015 |
| WO | 2015095088 | A1 | 6/2015 |
| WO | 2015095090 | A1 | 6/2015 |
| WO | 2015095146 | A1 | 6/2015 |
| WO | 2015127583 | A1 | 9/2015 |
| WO | 2016010954 | A2 | 1/2016 |

OTHER PUBLICATIONS

Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
http://www.gtat.com/Collateral/Documents/English-US/Sapphire/12-21-12_GT_TouchScreen_V3_web.pdf.
E. Vanagas et al., "Glass Cutting by Femtosecond Pulsed Radiation", J. Microlith., Microfa., Microsyst., 3(2) 358-363, 2004.
M. K. Bhuyan, et al., High aspect ratio taper-free microchannel fabrication using femtosecond Bessel beams, Jan. 18, 2010 / vol. 18, No. 2 / Optics Express 566.
Design of Diffractivephase Axicon Illuminated by a Gaussian-Profile Beam, Zhangg Uo-Qing, D Ongb I-Zhen,Y Angg Uo-Zhen, and Gu Ben-Yuan, vol. 6, No. 5 Acta Physica Sinica May 1996, pp. 354.
High-resolution optical coherence tomography over a large depth range with an axicon lens, Zhihua Ding, Hongwu Ren, Yonghua Zhao, J. Stuart Nelson, and Zhongping Chen, Feb. 15, 2002 / vol. 27, No. 4 / Optics Letters 243.
Ilya Golub, Fresnel axicon, 1890 Optics Letters / vol. 31, No. 12 / Jun. 15, 2006.

(56) References Cited

OTHER PUBLICATIONS

M. K. Bhuyan, et al., High aspect ratio nanochannel machining using single shot femtosecond Bessel beams, Appl. Phys. Lett. 97, 081102 (2010).
Rieko Arimoto, et al., Imaging properties of axicon in a scanning optical system; Nov. 1, 1992 / vol. 31, No. 31 / Applied Optics 6653.
D. Zeng, et al., Characteristic analysis of a refractive axicon system for optical trepanning; Optical Engineering 45(9), 094302 Sep. 2006.
Pavel Polynkin, et al., Extended filamentation with temporally chirped femtosecond Bessel-Gauss beams in air, Jan. 19, 2009 / vol. 17, No. 2 / Optics Express 575.
O.G. Kosareva, et al. Formation of extended plasma channels in a condensed medium upon axicon focusing of a femtosecond laser pulse, Quantum Electronics, 35(11), 1013-1014 (2005).
Kruger, et al., "Laser micromachining of barium aluminum borosilicate glass with pulse durations between 20 fs and 3 ps,", Applied Surface Science, 127-129(1998), 892-898.
Perry, et al., "Ultrashort-Pulse Laser Machining," submitted to ICA of Lasers and Electro-Optics, Preprint Nov. 16-19, 1998, Pub. Jan. 22, 1999, International Congress on Applications of Lasers and Electro-Optics.
Herman, et al., "Laser Micromachining of 'transparent' fused silica with 1ps pulses and pulse trains", SPIE Conference, San Jose, CA, Jan. 1999, vol. 3616-0277-786X/99.
Yoshino, et al., "Micromachining with a High Repetition Rate Femtosecond Fiber Laser," Journal of laser Micro/Nanoengineering vol. 3, No. 3, 2008.
Abramov et al., "Laser separation of chemically strengthened glass", Physics Procedia, 5 (2010), 285-290.
Sukumaran, "Through-Package-Via Formation and Metallization of Glass Interposers.", Electronic Components and Technology Conference: 557-563, (2010.).
Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).
Bagchi, "Fast Ion Beams From Intense, Femtosecond Laser Irradiated Nanostructured Surfaces." Appl. Phys. B88: 167-173(2007.).
Bhuyan, "Laser micro and nanostructuring using femtosecond Bessel beams." Eur. Phys. J Special Topics 199: 101-110 (2011.).
Bhuyan. "Ultrafast Bessel beams for high aspect ratio taper free micromachining of glass." Nonlinear Optics and Applications IV, Proc of SPIE vol. 7728:7228IV-1-7228IV-8 (2010.).
Bhuyan, "Single-shot high aspect ratio bulk nanostructuring of fused silica using chirp-controlled ultrafast laser Bessel beams." Applied Physics Letters 10-4, 021107-1-021107-4 (2014.).
Courvoisier, "Applications of femtosecond Bessel beams to laser ablation." Appl Phys A, 112:29-34, (2013).
Courvoisier, "Surface nanoprocessing with nondiffracting femtosecond Bessel beams." Optics Letters, vol. 34, No. 20, 3163-3165, Oct. 15, 2009.
Stoian, "Spatial and temporal laser pulse design for material processing on ultrafast scales." Appl. Phys. A, 114:119-127, (2014).
Velpula, "Ultrafast imaging of free carriers: controlled excitation with chirped ultrafast laser Bessel beams." Prof of SPIE vol. 8967, 899711-1-896711-8, (2014.).
U.S. Appl. No. 14/535,800, filed Nov. 7, 2014.
Patent Cooperation Treaty International Notification of Transmittal of the International Search Report and the Written Opinion of the International Searching Authority, international application No. PCT/US2014/070459: dated Apr. 20, 2015, 11 pages.
Dong et al; "On-Axis Irradiance Distribution of Axicons Illuminated by Spherical Wave"; Optics & Laser Technology 39 (2007) 1258-1261.
Thiele; "Relation Between Catalytic Activity and Size of Partical", Industrial and Engineering Chemistry, 31 (1939), pp. 916-920.
Toytoman et al; "Optical Breakdown in Transparent Media With Adjustable Axial Length and Location"; Optics Express vol. 18 No. 24, 24688-24698 (2010).

Ding et al; "High-Resolution Optical Coherence Tomography Over a Large Depth Range With an Axicon Lens"; Feb. 15, 2002 / vol. 27, No. 4 / Optics Letters 243.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.

(56) References Cited

OTHER PUBLICATIONS

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Office Action for U.S. Appl. No. 14/535,800 dated Apr. 26, 2017, 14 pages.

English Translation of CN201480075631.8 Office Action dated Apr. 19, 2017, China Patent Office.

\* cited by examiner

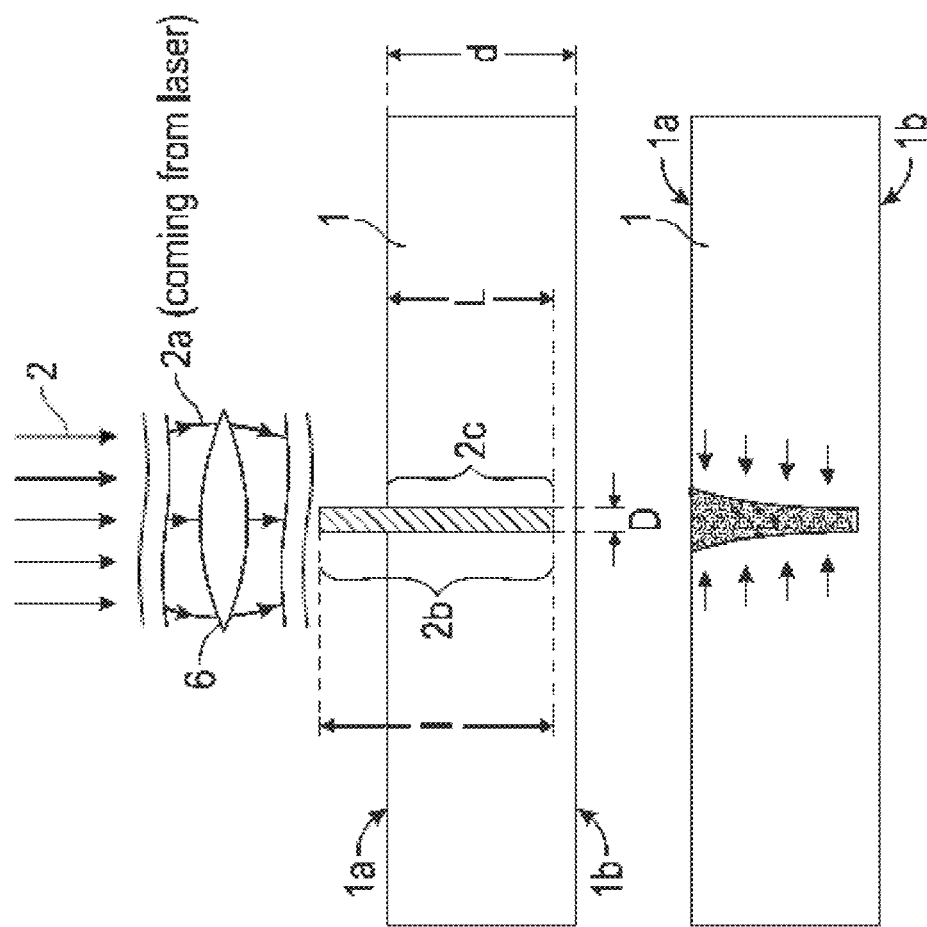

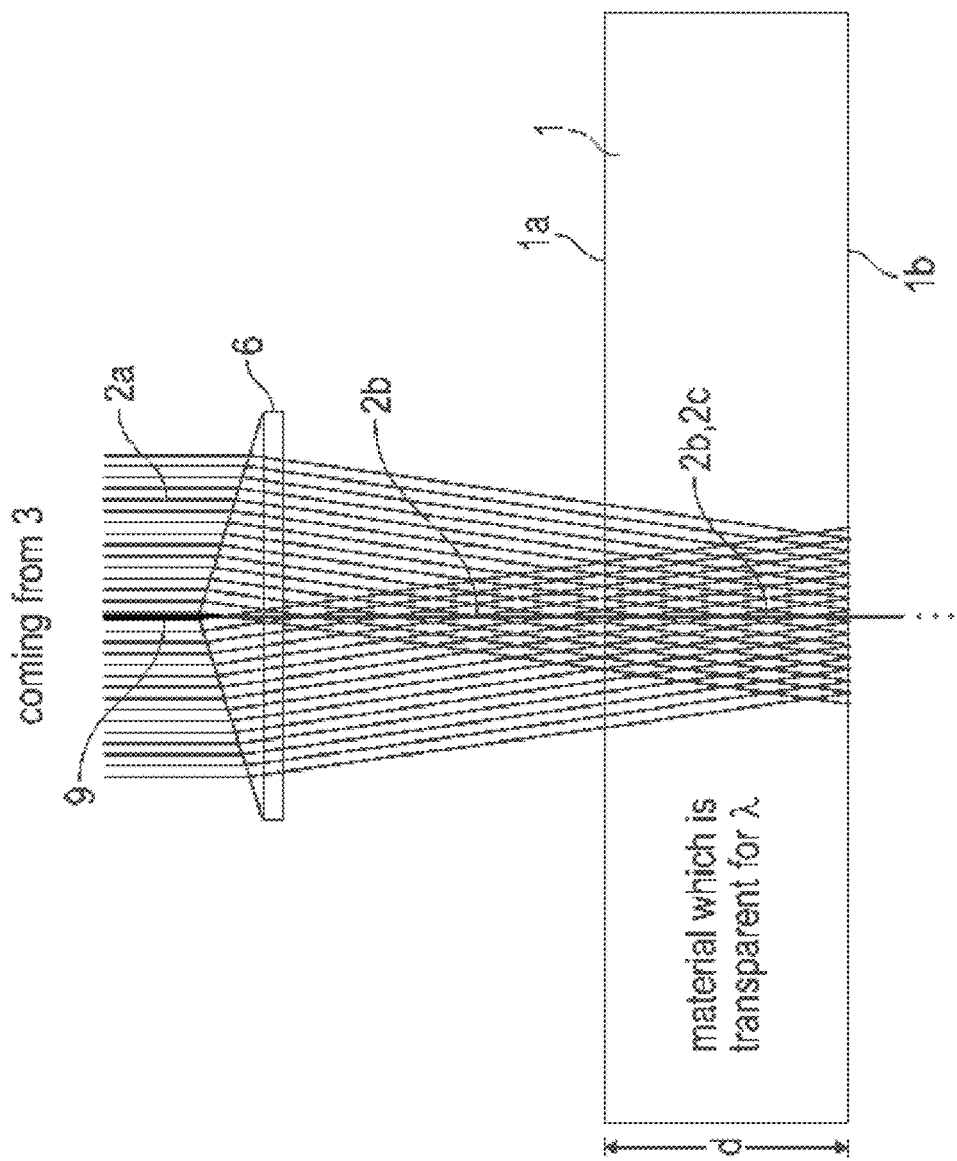

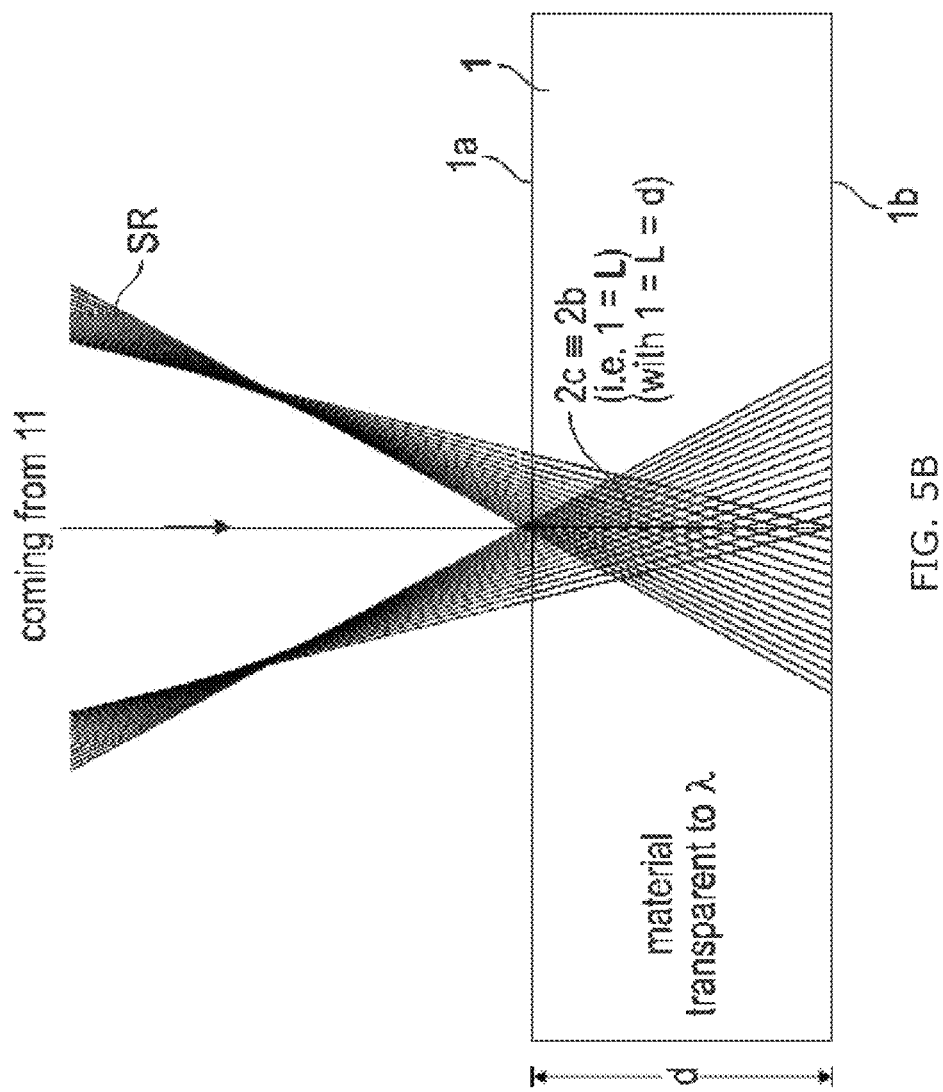

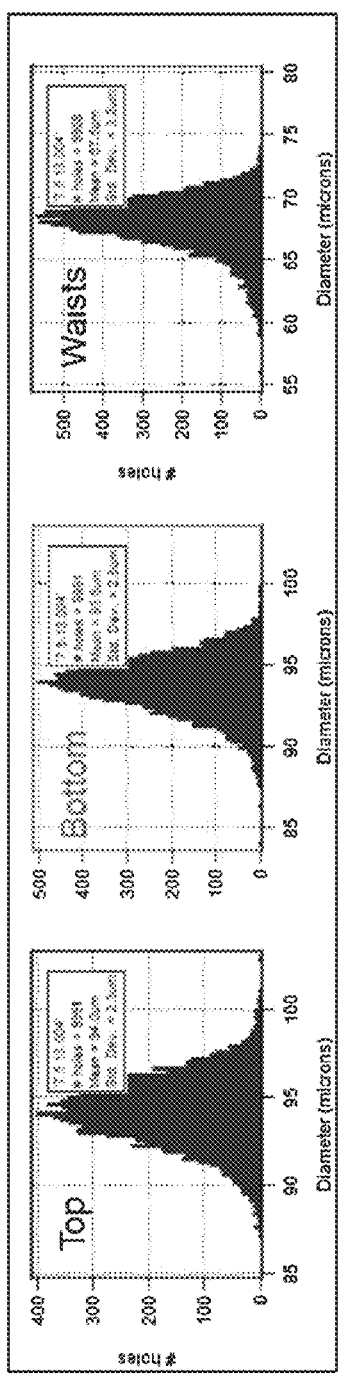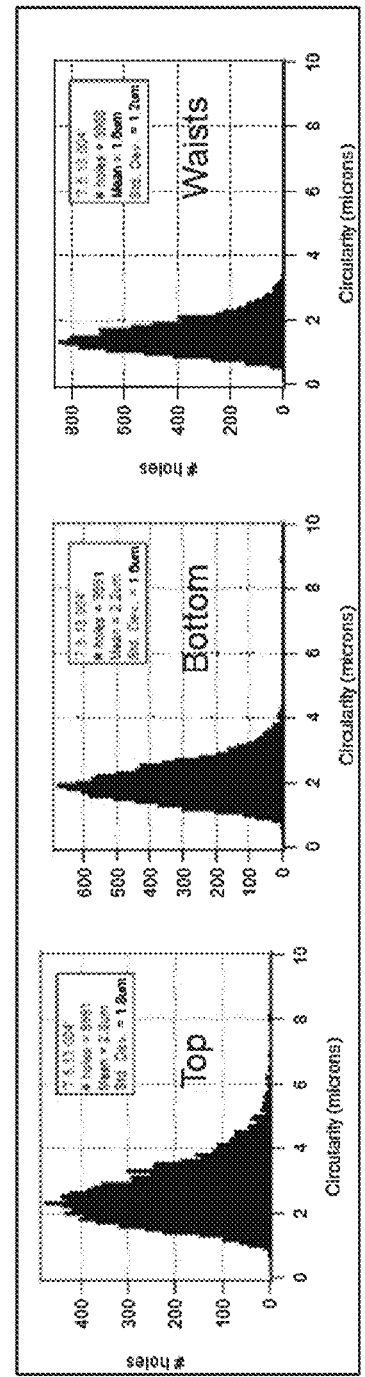

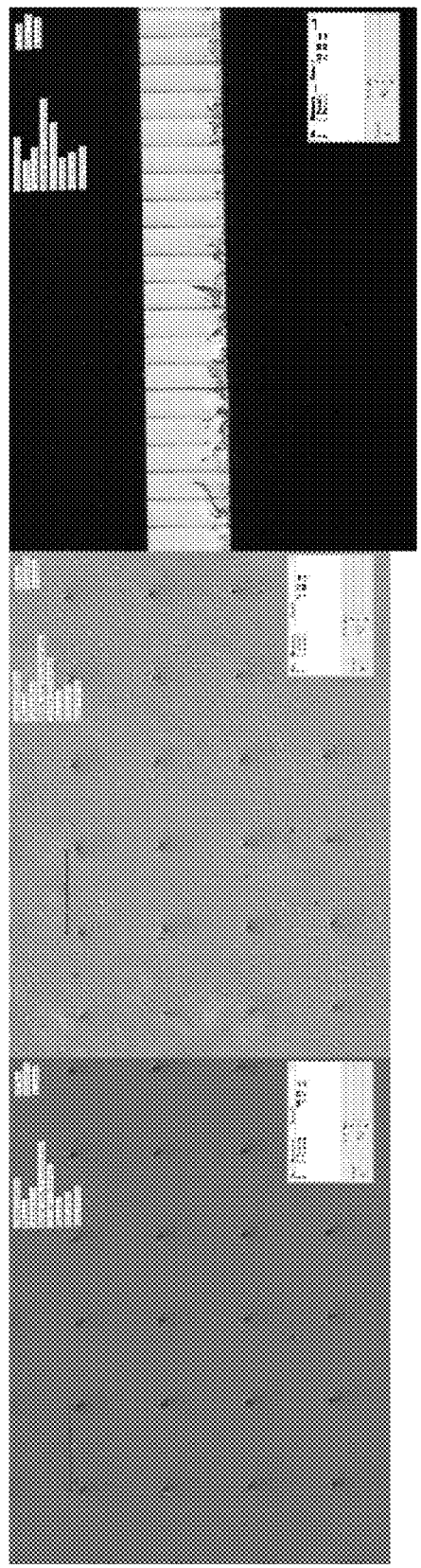

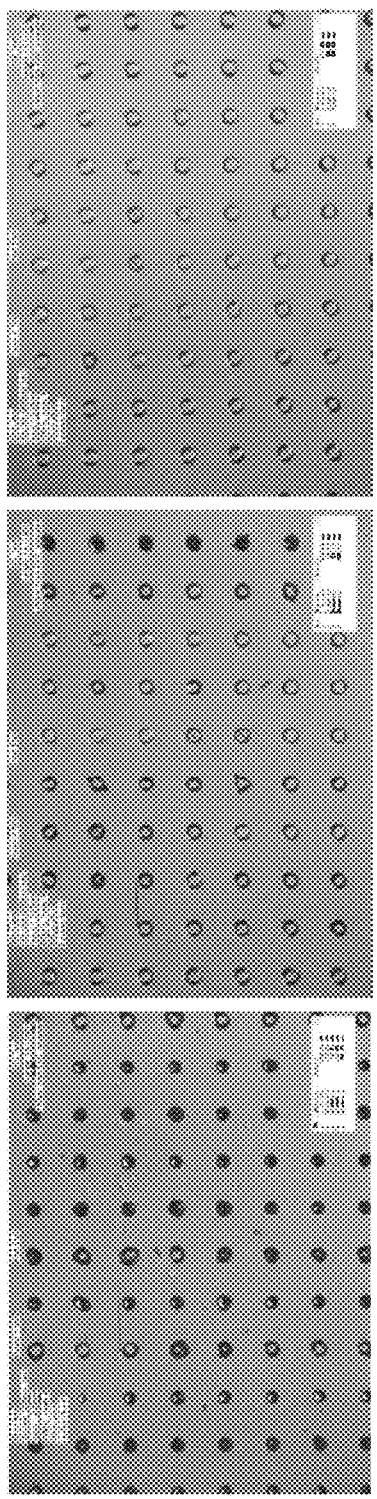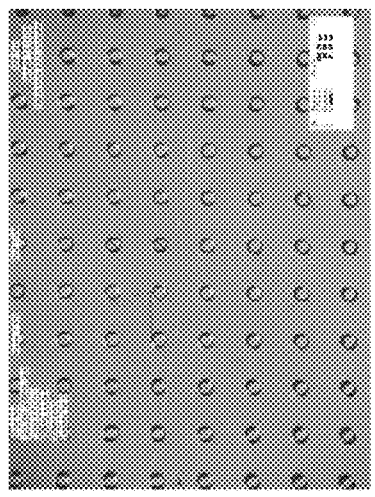
FIG. 22A
FIG. 22B
FIG. 22C
FIG. 22D
FIG. 22E

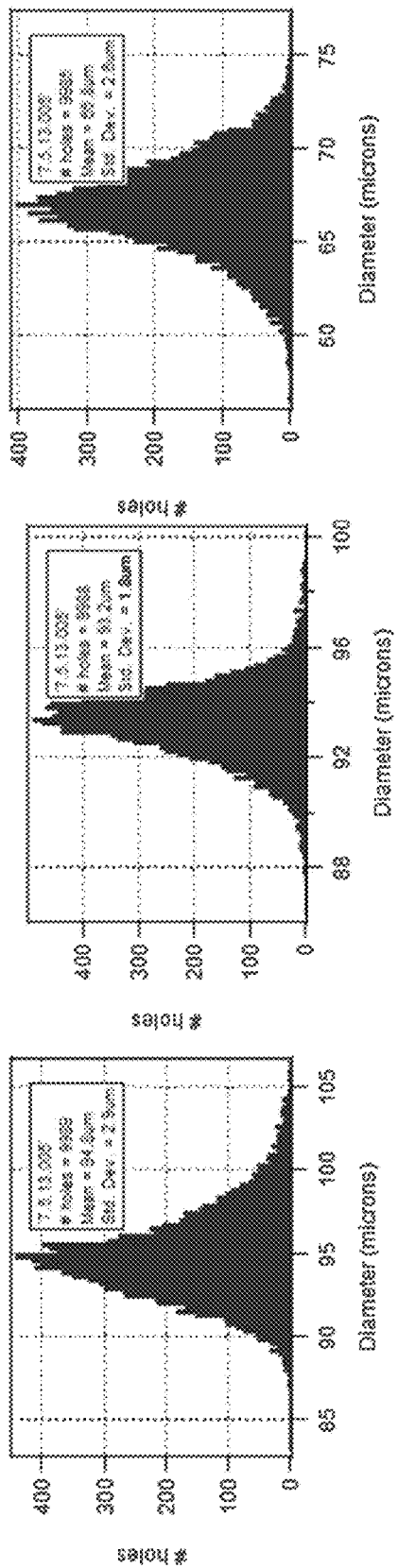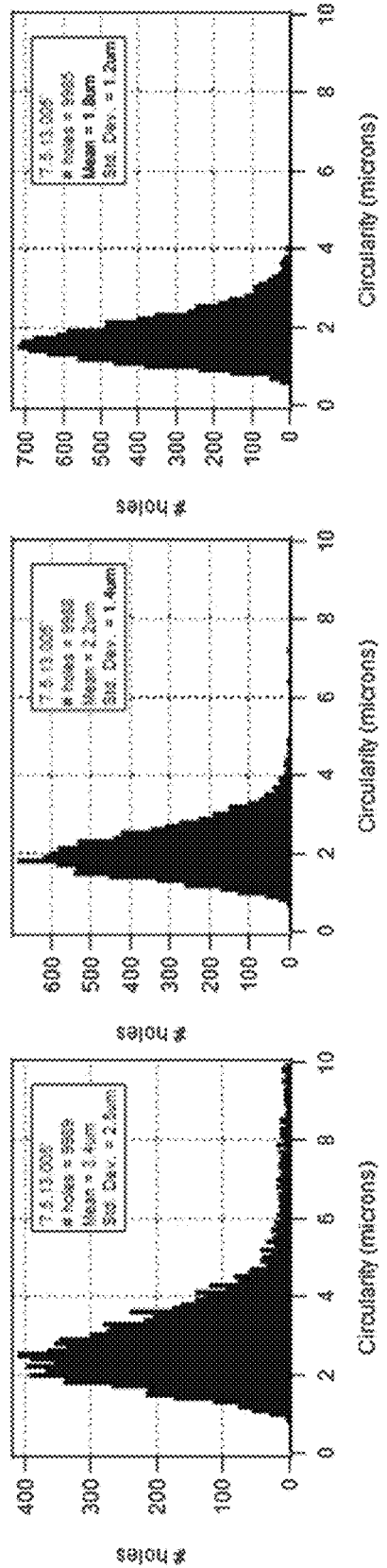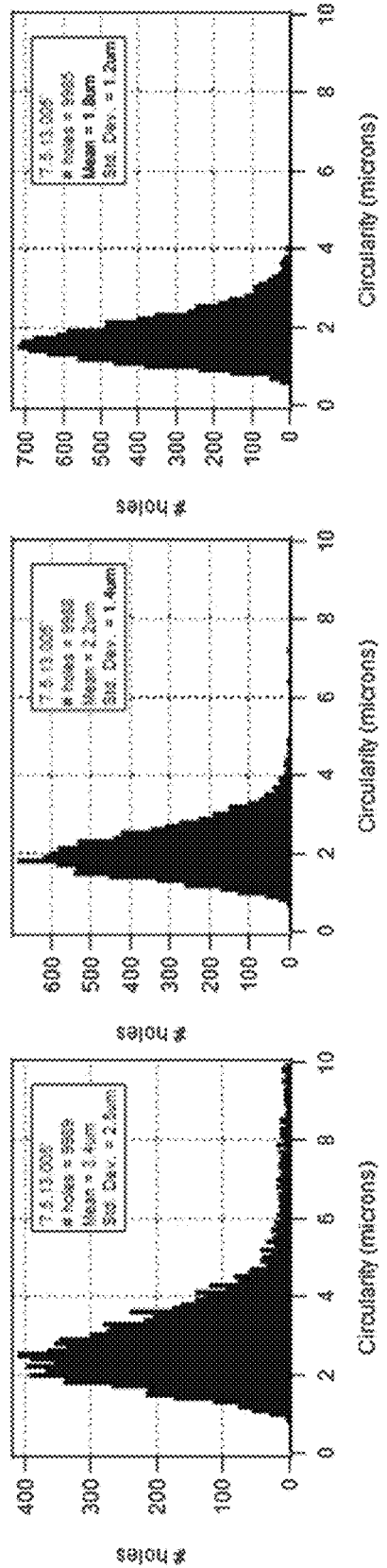
FIG. 26A  FIG. 26B  FIG. 26C
FIG. 27A  FIG. 27B  FIG. 27C

METHOD FOR RAPID LASER DRILLING OF HOLES IN GLASS AND PRODUCTS MADE THEREFROM

This application is a divisional of and claims the benefit of priority under 35 U.S.C. § 120 of U.S. patent application Ser. No. 14/535,754, filed on Nov. 7, 2014, which claims the benefit of priority under 35 U.S.C. § 119 of U.S. Provisional Application No. 62/073,191, filed on Oct. 31, 2014, U.S. Provisional Application No. 62/023,429 filed on Jul. 11, 2014, and U.S. Provisional Application No. 61/917,179, filed on Dec. 17, 2013 the contents of each are relied upon and incorporated herein by reference in their entirety.

BACKGROUND

Today there is intense interest in thin glass with precision formed holes for electronics applications. The holes are filled with a conducting material, and are used to conduct electrical signals from one part to another, allowing precision connection of central processing units, memory chips, graphical processing units, or other electronic components. For such applications, substrates with metalized holes in them are typically called "interposers." As compared to presently used interposer materials such as fiber reinforced polymer or silicon, glass has a number of advantageous properties. Glass can be formed thin and smooth in large sheets without the need for polishing, it has higher stiffness and greater dimensional stability than organic alternatives, it is a much better electrical insulator than silicon, it has better dimensional (thermal and rigidity) stability than organic options, and it can be tailored to different coefficients of thermal expansion to control stack warp in integrated circuits.

A variety of hole formation methods can be used to create holes in glass, such as hot pressing, lithography of photo-machinable glass, electric-discharge drilling, powder blasting, and a wide variety of laser drilling methods. With any of the techniques, the challenge is generally around forming a hole of sufficient quality (low cracking, appropriate size or roundness) at a high enough rate (holes/sec) which ultimately affects cost. For example, hot pressing of glass has difficulty forming holes of small enough dimensions (less than or equal to about 100 microns), electrical discharge drilling can be difficult to do with a tight hole pitch (i.e., a hole to hole distance of less than about 50 microns), laser drilling of holes using beam trepanning can be slow (e.g., about 1 hole/sec), and excimer laser processing and photo-machinable glass can have large initial capital costs.

Laser drilling methods with UV nanosecond lasers have been demonstrated that make particularly high quality holes. A laser is used to make about 10 micron diameter pilot holes using multiple (e.g., hundreds) of laser pulses per hole, and then the part is etched with acid to enlarge the holes and achieve the target dimensions. The holes are subsequently metalized, redistribution layers are added to fan out electrical signals, and the parts are diced into smaller pieces to create functional interposers. However, laser drilling can be a time consuming process, and with percussion drilling (i.e., one pulse after another at the same location), it can take hundreds of pulses to drill an individual hole to the desired depth. As the capital cost of a precision laser drilling platform can be significant (approaching $1M/machine), speed of hole formation is a key parameter in overall interposer production cost.

Therefore, there is a need for a method of laser drilling a material, such as glass, that minimizes or eliminates the above mentioned problems.

SUMMARY

The embodiments disclosed herein are directed to a method of forming damage tracks (also referred to as pilot holes) at extremely fast rates. By taking advantage of a specialized optical delivery system and a picosecond pulsed laser, damage tracks/pilot holes can be drilled in the glass or other transparent material with as little as a single laser pulse being required to form each damage track/pilot hole. This process enables damage track/pilot hole drilling rates that are easily 100X faster than what might be achieved with the nanosecond laser drilling process described above. However, the initial damage track/pilot hole is generally too small to allow filling with an electrically conductive material, and often not contiguous. So, by itself, such a damage track/pilot hole is not suitable for an interposer or an electrical via. By combining the aforementioned process with a subsequent acid etching step, the damage tracks or pilot holes can then be enlarged, in a highly parallel process, to hole sizes that are practical for interposers. This combined process produces holes in glass that are of appropriate size (from less than twenty microns to on the order of tens of microns), profile, and quality for interposers at much lower cost per part than other methods.

In one embodiment, a method of laser drilling or forming through-holes in a substantially transparent material includes focusing a pulsed laser beam into a laser beam focal line oriented along the beam propagation direction and directed into the material, the laser beam focal line generating an induced absorption within the material, the induced absorption producing a damage track along the laser beam focal line within the material, and translating the material and the laser beam relative to each other, thereby laser forming a plurality of damage tracks. The method further includes etching the material in an acid solution to produce holes of a diameter greater than 1 micron by enlarging the defect lines in the material. The etch rate can be a rate of less than about 10 microns/min, such as a rate of less than about 5 microns/min, or a rate of less than about 2 microns/min. The Thiele modulus of the etching process can be less than or equal to 2.

In some embodiments, the pulse duration can be in a range of between greater than about 1 picoseconds and less than about 100 picoseconds, such as greater than about 5 picoseconds and less than about 20 picoseconds, and the repetition rate can be in a range of between about 1 kHz and 4 MHz, such as in a range of between about 10 kHz and 650 kHz. In addition to a single pulse at the aforementioned repetition rates, the pulses can be produced in bursts of two pulses or more (such as 3 pulses, 4, pulses, 5 pulses or more) separated by a duration in a range of between about 1 nsec and about 50 nsec, for example, 10 to 30 nsec, such as about 20 nsec plus or minus 2 nsec, at an energy of at least 400 µJ per burst, and the burst repetition frequency can be in a range of between about 1 kHz and about 200 kHz. The pulsed laser beam can have a wavelength selected such that the material is substantially transparent at this wavelength. The average laser energy per burst measured at the material can be greater than 40 microJoules per mm thickness of material, for example between 40 microJoules/mm and 1000 microJoules/mm, or between 100 microJoules/mm and 650 microJoules/mm. The pulsed laser beam can have a burst energy density in a range from 25 microJoules/mm of line focus to 125 microJoules/mm of line focus. The pulsed laser beam can produce at least 500 damage tracks/sec, at least 1,000 damage tracks/sec, or at least 5,000 damage tracks/sec. The damage tracks can be made in an aperiodic pattern.

The laser beam focal line can be created by using a Bessel beam or a Gauss-Bessel beam. The focal line can be generated using an axicon. The laser beam focal line can have a length in a range of between about 0.1 mm and about 10 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm, and an average spot diameter in a range of between about 0.1 micron and about 5 microns. The through-holes each can have a diameter between 5 microns and 100 microns. The damage tracks each can have a diameter less than or equal to about 5 microns. In some embodiments, the material can be a stack of glass sheets. The spacing of the holes can be between 50 microns and 500 microns, or between 10 microns and 50 microns. Translating the material and the laser beam relative to each other can comprise translating the glass sheet with a series of linear stages, or translating the laser beam using linear stages, a resonant scanning mirror scanner, a galvanometer (galvo) mirror scanner, a piezo-electric adjustable mirror, or an acousto-optic beam deflector. The method can further include coating the interior glass surfaces at the through-holes with a conductor to produce conductivity between top and bottom of the through-holes, or coating the interior glass surface at the through-holes to facilitate attachment of biomolecules. The material can be transparent to at least one wavelength in a range from 390 nm to 700 nm and/or can transmit at least 70% of at least one wavelength in a range from 390 nm to 700 nm. The material can be glass, fused silica, or a stack of glass sheets.

In some embodiments, the plurality of through-holes have a diameter of 20 µm or less, a spacing between adjacent through-holes of 10 µm or greater, the plurality of through-holes comprise an opening in the first surface, an opening in the second surface, and a waist located between the opening in the first surface and the opening in the second surface, a diameter of the waist is at least 50% of the diameter of the opening in the first surface or the opening in the second surface, and a difference between a diameter of the opening in the first surface and a diameter of the opening in the second surface is 3 µm or less. Further embodiments include glass articles made according to the methods described above and in the detailed description.

In another embodiment, a glass article includes a substrate having a plurality of damage tracks, wherein the damage tracks have a diameter of less than 5 microns, a spacing between adjacent holes of at least 20 microns, and an aspect ratio of 20:1 or greater. The diameter of the damage tracks can be less than 1 micron.

In still another embodiment, a glass article includes a stack of glass substrates with a plurality of holes formed through said stack, wherein the holes extend through each of the glass substrates, and wherein the holes are between about 1 micron and about 100 microns in diameter and have a hole-to-hole spacing of about 25-1000 microns. The glass article can include at least two glass substrates separated by an air gap larger than 10 microns.

In yet another embodiment, a substantially transparent article includes a multilayer stack of materials substantially transparent to a wavelength between about 200 nm and about 2000 nm, the multilayer stack having a plurality of holes formed through the multiple layers of the stack. The holes are between 1 micron and 100 microns in diameter and have a hole-to-hole spacing of 25-1000 microns. The multilayer stack can include any one or more of the following: a) multiple glass layers and at least one polymer layer situated between the glass layers, b) at least two glass layers of different compositions, or c) at least one glass layer and at least one non-glass inorganic layer.

In still yet another embodiment, a method of forming through-hole in a material includes forming a plurality of damage tracks into the material by focusing a pulsed laser beam into a laser beam focal line oriented along a beam propagation direction and directing the laser beam focal line into the material, wherein the damage tracks have a diameter of 5 µm or less, and etching the material in an acid solution to enlarge the plurality of defect lines to produce a plurality of through-holes in the material, wherein a Thiele modulus of the etching is less than or equal to 2. The material can be transparent to at least one wavelength in a range from 390 nm to 700 nm and/or can transmit at least 70% of at least one wavelength in a range from 390 nm to 700 nm. The method can also include mechanically agitating the acid solution during etching. The acid solution can include a surfactant. The plurality of through-hole can have a diameter of 20 µm or less and a spacing between adjacent through-hole of at least 10 µm. The plurality of through-holes comprise an opening in the first surface, an opening in the second surface, and a waist located between the opening in the first surface and the opening in the second surface, a diameter of the waist is at least 50% of the diameter of the opening in the first surface or the opening in the second surface, and a difference between a diameter of the opening in the first surface and a diameter of the opening in the second surface is 3 µm or less.

In further embodiments, an article includes a substrate having a plurality of through-holes continuously extending from a first surface of the substrate to a second surface of the substrate, wherein the substrate is transparent to at least one wavelength in a range from 390 nm to 700 nm, the plurality of through-holes have a diameter of 20 µm or less, the plurality of through-holes comprise an opening in the first surface, an opening in the second surface, and a waist located between the opening in the first surface and the opening in the second surface, a diameter of the waist is at least 50% of the diameter of the opening in the first surface or the opening in the second surface, and a difference between a diameter of the opening in the first surface and a diameter of the opening in the second surface is 3 µm or less. The plurality of through-holes can have a diameter greater than 5 µm, a diameter of 15 µm or less, or a diameter of 10 µm or less. the diameter of the waist is at least 70%, at least 75%, or at least 80% of the diameter of the opening of the first surface or the opening in the second surface. The substrate can be fused silica, glass, or chemically strengthened glass. The substrate can have a thickness of 1 mm or less, or a thickness in a range from 20 µm to 200 µm. The through-holes can have a density in a range from 5 through-holes/mm$^2$ to 50 through-holes/mm$^2$. The through-holes can have an aspect ratio in a range from 5:1 to 20:1. The through-holes can have an aperiodic pattern. The through-holes contain a conductive material.

The embodiments described herein provide many advantages including enabling the formation of holes/damage tracks with as little as a single laser pulse or a single burst of pulses, allowing much faster drilling or hole/damage track formation rates than traditional percussion drilling laser methods. The hole/damage track drilling rate described herein is limited only by the repetition rate of the laser and the speed at which the laser beam can be moved to the next drill location. Drilling speeds of hundreds of holes/sec are easily achieved, and depending on the stages used and hole pattern density, drill rates of more than 10,000 holes/sec are possible. Additionally, this process can drill multiple parts at the same time (stacks), further increasing the throughput of the system.

Due to the line focus optics, the laser drilled holes/damage tracks are extremely small (e.g., about 1 micron) in diameter, which is much smaller than the ablated hole dimensions achievable with Gaussian optical beams (typically greater than about 10 microns).

Use of acid etching allows for formation of via through holes with dimensions that are practical for metallization or other chemical coating. All pilot holes/damage tracks are enlarged in parallel to a target diameter in a parallel process, which is much faster than using a laser to drill out the holes to a large diameter by using further laser exposure.

Acid etching creates a stronger part than use of the laser only, by blunting any micro-cracks or damage caused by the laser.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A and 2B are illustrations of positioning of the laser beam focal line, i.e., the processing of a material transparent for the laser wavelength due to the induced absorption along the focal line.

FIG. 3B-1 through 3B-4 is an illustration of various possibilities to process the substrate by differently positioning the laser beam focal line relative to the substrate.

FIG. 4 is an illustration of a second embodiment of an optical assembly for laser processing.

FIGS. 5A and 5B are illustrations of a third embodiment of an optical assembly for laser processing.

FIGS. 17A-17C are graphs of number of holes as a function of diameter at the top (FIG. 17A), bottom (FIG. 17B), and at the waists (FIG. 17C), showing hole diameter statistics made on about 10,000 holes, post-etch.

FIGS. 18A-18C are graphs of number of holes as a function of diameter at the top (18A), bottom (18B), and at the waists (18C), showing circularity statistics, post-etch. Circularity=max diameter−min diameter of a given hole. The data indicates all holes are without significant cracks/chips, which would etch out into significantly non-round shapes.

FIGS. 20A-20C are photographs of holes before etching, showing a top view (FIG. 19A), bottom view (FIG. 19B), and side view (FIG. 19C).

FIGS. 22A-22E are photographs of bottom views of holes post acid etching at 55% laser power (FIG. 22A), 65% laser power (FIG. 22B), 75% laser power (FIG. 22C), 85% laser power (FIG. 22D), and 100% laser power (FIG. 22E).

—FIG. 23A: 100 micron holes at 200 micron pitch in a 150×150 array; FIGS. 23B and 23C: 50 micron holes at 100 micron pitch in a 300×300 array, showing (FIG. 23C) some cracked and chipped holes.

FIGS. 26A-26C are graphs of number of holes a function of diameter for a sample having 100×100 array of holes, showing results for a second sample for the top (FIG. 26A), bottom (FIG. 26B), and waists (FIG. 26C).

FIGS. 27A-27C are graphs of number of holes a function of circularity for a sample having 100×100 array of holes, showing results for a second sample for the top (FIG. 27A), bottom (FIG. 27B), and waists (FIG. 27C).

DETAILED DESCRIPTION

Figure 1:
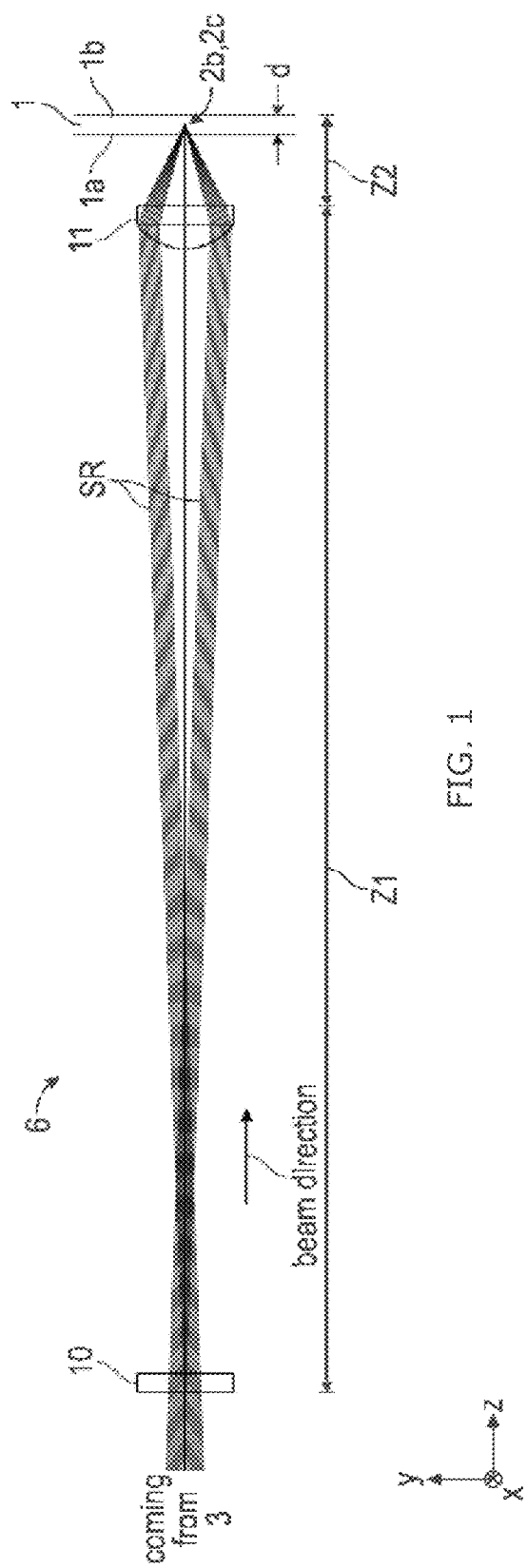
FIG. 1 is a schematic illustration of one embodiment of an optical assembly for laser drilling.

A description of example embodiments follows.

The following embodiments utilize a short (e.g., from $10^{-10}$ to $10^{-15}$ second) pulsed laser with an optical system that creates a line focus system to form defect lines, damage tracks, or holes in a piece of material that is substantially transparent to the wavelength of the laser, such as a glass, fused silica, synthetic quartz, a glass ceramic, ceramic, a crystalline material such as sapphire, or laminated layers of such materials (for example, coated glass). The generation of a line focus may be performed by sending a Gaussian laser beam into an axicon lens, in which case a beam profile known as a Gauss-Bessel beam is created. Such a beam diffracts much more slowly (e.g. may maintain single micron spot sizes for ranges of hundreds of microns or millimeters as opposed to few tens of microns or less) than a Gaussian beam. Hence the depth of focus or length of intense interaction with the material may be much larger than when using a Gaussian beam only. Other forms or slowly diffracting or non-diffracting beams may also be used, such as Airy beams. The material or article is substantially transparent to the laser wavelength when the absorption is less than about 10%, preferably less than about 1% per mm of material depth at this wavelength. In some embodiments, the material can also be transparent to at least one wavelength in a range from about 390 nm to about 700 nm. Use of the intense laser and line focus allows each laser pulse to simultaneously damage, ablate, or otherwise modify a long (e.g. 100-1000 microns) track in the glass. This track can easily extend through the entire thickness of the glass part. Even a single pulse or burst of pulses thus creates the full "pilot hole" or intense damage track, and no percussion drilling is needed.

The pilot holes/damage tracks are very small (single microns or less) in cross-sectional dimension, but are relatively long—i.e., they have a high aspect ratio. The parts are subsequently acid etched to reach final hole dimensions—for example diameter of about 30 microns or less, about 25 microns or less, about 20 microns or less, about 15 microns or less, about 10 microns or less, in a range from about 5 to about 10 microns, about 5 to about 15 microns, about 5 to about 20 microns, about 5 to about 25 microns, about 5 to about 30 microns, or up to many tens of microns depending upon requirements for the intended use. In some embodiments, the etching can be carried out so that the Thiele modulus of the etching process is about 3 or less, about 2.5 or less, about 2 or less, about 1.5 or less, about 1 or less, or about 0.5 or less. After etching, the surface of the glass may be slightly textured from imperfect uniformity in the etching process—the interior of the etched holes, while somewhat smooth, may also have some fine grain texture that is visible under a microscope or scanning electron microscope. In some embodiments, the substrate can have a plurality of through-holes continuously extending from a first surface of the substrate to a second surface of the substrate, wherein the substrate is transparent to at least one wavelength in a range from 390 nm to 700 nm, the plurality of through-holes have a diameter of 20 µm or less, the plurality of through-holes comprise an opening in the first surface, an opening in the second surface, and a waist located between the opening in the first surface and the opening in the second surface, a diameter of the waist is at least 50% of the diameter of the opening in the first surface or the opening in the second surface, and a difference between a diameter of the opening in the first surface and a diameter of the opening in the second surface is 3 µm or less The holes may then be coated and/or filled with a conductive material, for example through metallization, in order to create an interposer part made of the transparent material. The metal or conductive material can be, for example copper, aluminum, gold, silver, lead, tin, indium tin oxide, or a combination or alloy thereof. The process used to metalize the interior of the holes can be, for example, electro-plating, electroless plating, physical vapor deposition, or other evaporative coating methods. The holes may also be coated with catalytic materials, such as platinum, palladium, titanium dioxide, or other materials that facilitate chemical reactions within the holes. Alternatively, the holes may be coated with other chemical functionalization, so as to change surface wetting properties or allow attachment of biomolecules, and used for biochemical analysis. Such chemical functionalization could be silanization of the glass surface of the holes, and/or additional attachment of specific proteins, antibodies, or other biologically specific molecules, designed to promote attachment of biomolecules for desired applications.

In one embodiment, a method of laser drilling a material includes focusing a pulsed laser beam into a laser beam focal line oriented along the beam propagation direction and directed into the material, the laser beam having an average laser burst energy measured at the material greater than about 50 microJoules per mm thickness of material being processed, having burst energy density in a range from about 25 µJ/mm of line focus to about 125 µJ/mm of line focus, having pulses having a duration less than about 100 picoseconds, and a repetition rate in a range of between about 1 kHz and about 4 MHz. The length of the line focus can be determined by the distance between the two points on the optical axis where the intensity is one half the maximum intensity. The laser beam focal line generates an induced absorption within the material, the induced absorption producing a hole along the laser beam focal line within the material. The method also includes translating the material and the laser beam relative to each other, thereby laser drilling a plurality of holes (or damage tracks) within the material at a rate greater than about 50 holes/second, greater than about 100 holes/second, greater than about 500 holes/second, greater than about 1,000 holes/second, greater than about 2,000 holes/second, greater than about 3,000 holes/second, greater than about 4,000 holes/second, greater than about 5,000 holes/second, greater than about 6,000 holes/second, greater than about 7,000 holes/second, greater than about 8,000 holes/second, greater than about 9,000 holes/second, greater than about 10,000 holes/second, greater than about 25,000 holes/second, greater than about 50,000 holes/second, greater than about 75,000 holes/second, or greater than about 100,000 holes/second, depending upon the desired pattern of holes/damage tracks. The method further includes etching the material in an acid solution at a rate of less than about 5 microns/min, such as at a rate of about 2 microns/min, thereby enlarging the holes in the material.

In some embodiments, the pulse duration can be in a range of between greater than about 5 picoseconds and less than about 100 picoseconds, and the repetition rate can be in a range of between about 1 kHz and 4 MHz. The pulses can be produced in bursts of at least two pulses separated by a duration in a range of between about 1 nsec and about 50 nsec, for example 10 to 30 nsec, such as about 20 nsec plus or minus 2 nsec, and the burst repetition frequency can be in a range of between about 1 kHz and about 4 MHz. The pulsed laser beam can have a wavelength selected such that the material is substantially transparent at this wavelength. This wavelength may be, for example, 1064, 532, 355 or 266 nanometers. In some embodiments, the burst repetition frequency can be in a range between about 1 kHz and about 4 MHz, in a range between about 10 kHz and about 650 kHz, about 10 kHz or greater, or about 100 kHz or greater.

The laser beam focal line can have a length in a range of between about 0.1 mm and about 10 mm, or a length in a range of between about 0.1 mm and about 1 mm, and an average spot diameter in a range of between about 0.1 micron and about 5 microns. The spot diameter D of a Bessel beam can be written as $D=(2.4048\lambda)/(2\pi B)$, where $\lambda$ is the laser beam wavelength and B is a function the cone angle of the beam.

Laser and Optical System:

For the purpose of cutting transparent substrates, especially glass, a method was developed that uses a 1064 nm picosecond laser in combination with line-focus beam forming optics to create lines of damage or damage tracks in the substrates. This is detailed below and in U.S. Application No. 61/752,489 filed on Jan. 15, 2013, to which U.S. application Ser. No. 14/154,525 filed Jan. 14, 2014 (published as US Publication No. 2014/0199519) claims benefit, the entire contents of each are incorporated by reference as if fully set forth herein. The damage tracks created by the laser are interchangeably referred to herein as holes, pilot holes, defect lines, or perforations. The method of cutting transparent substrates can also be applied to creating damage tracks, which are subsequently enlarged by an etching process, as described below.

FIG. 1 gives a schematic of one version of the concept, where an axicon optical element 10 and other lenses 11 and 12 are used to focus light rays from a laser 3 (not shown) into a pattern 2b that will have a linear shape, parallel to the optical axis of the system. The substrate 1 is positioned so that it is within the line-focus. With a line-focus of about 1 mm extent, and a picosecond laser that produces output power greater than or equal to about 20 W at a repetition rate of 100 kHz (about 200 microJoules/burst measured at the material), then the optical intensities in the line region 2b can easily be high enough to create non-linear absorption in the material. The pulsed laser beam can have an average laser burst energy measured, at the material, greater than 40 microJoules per mm thickness of material. The average laser burst energy used can be as high as 2500 µJ per mm of thickness of material, for example 100-2000 µJ/mm, with 200-1750 µJ/mm being preferable, and 500-1500 µJ/mm being more preferable. This "average laser energy" can also be referred to as an average, per-burst, linear energy density, or an average energy per laser burst per mm thickness of material. In some embodiments, the burst energy density can be in a range from about 25 µJ/mm of line focus to about 125 µJ/mm of line focus, or in a range from about 75 µJ/mm of line focus to about 125 µJ/mm of line focus. A region of damaged, ablated, vaporized, or otherwise modified material is created that approximately follows the linear region of high intensity.

Figure 3A:
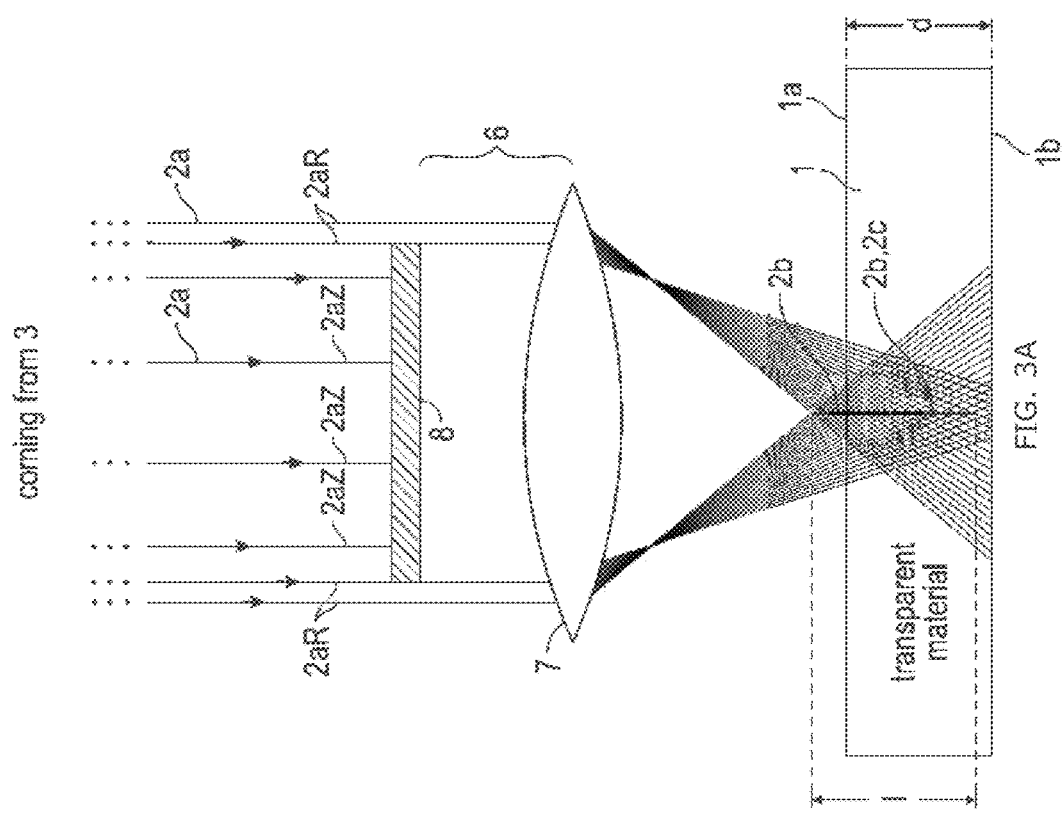
FIG. 3A is an illustration of an optical assembly for laser processing according to one embodiment.

Turning to FIGS. 2A and 2B, a method of laser processing a material includes focusing a pulsed laser beam 2 into a laser beam focal line 2b oriented along the beam propagation direction. As shown in FIG. 3A, laser 3 (not shown) emits laser beam 2, which has a portion 2a incident to the optical assembly 6. The optical assembly 6 turns the incident laser beam into an extensive laser beam focal line 2b on the output side over a defined expansion range along the beam direction (length l of the focal line). The planar substrate 1 is positioned in the beam path to at least partially overlap the laser beam focal line 2b of laser beam 2. The laser beam focal line is thus directed into the substrate. Reference 1a designates the surface of the planar substrate facing the optical assembly 6 or the laser, respectively, and reference 1b designates the reverse surface of substrate 1. The substrate or material thickness (in this embodiment measured perpendicularly to the planes 1a and 1b, i.e., to the substrate plane) is labeled with d. The substrate or material can be a glass article that is substantially transparent to the wavelength of the laser beam 2, for example.

As FIG. 2A depicts, substrate 1 (or material or glass article) is aligned perpendicular to the longitudinal beam axis and thus behind the same focal line 2b produced by the optical assembly 6 (the substrate is perpendicular to the plane of the drawing). The focal line being oriented or aligned along the beam direction, the substrate is positioned relative to the focal line 2b in such a way that the focal line 2b starts before the surface 1a of the substrate and stops before the surface 1b of the substrate, i.e. still focal line 2b terminates within the substrate and does not extend beyond surface 1b. In the overlapping area of the laser beam focal line 2b with substrate 1, i.e. in the substrate material covered by focal line 2b, the extensive laser beam focal line 2b generates (assuming suitable laser intensity along the laser beam focal line 2b, which intensity is ensured by the focusing of laser beam 2 on a section of length l, i.e. a line focus of length l) an extensive section 2c (aligned along the longitudinal beam direction) along which an induced absorption is generated in the substrate material. The induced absorption produces defect line formation in the substrate material along section 2c. The defect line is a microscopic (e.g., >100 nm and <0.5 micron in diameter) elongated "hole" (also called a perforation, a damage track, or a defect line) in a substantially transparent material, substrate, or workpiece generated by using a single high energy burst pulse. Individual perforations can be created at rates of several hundred kilohertz (several hundred thousand perforations per second), for example. With relative motion between the source and the material, these perforations can be placed adjacent to one another (spatial separation varying from sub-micron to many microns as desired). This spatial separation (pitch) can be selected to facilitate separation of the material or workpiece. In some embodiments, the defect line/damage track is a "through hole", which is a hole or an open channel that extends from the top to the bottom of the substantially transparent material. In other embodiments, the damage track is not a true "through hole" because there are particles of the material block the path of the damage track. Thus while the damage track can extend from the top surface to the bottom surface of material, in some embodiments it is not a continuous hole or channel because particles of the material are blocking the path. The defect line/damage track formation is not only local, but over the entire length of the extensive section 2c of the induced absorption. The length of section 2c (which corresponds to the length of the overlapping of laser beam focal line 2b with substrate 1) is labeled with reference L. The average diameter or extent of the section of the induced absorption 2c (or the sections in the material of substrate 1 undergoing the defect line formation) is labeled with reference D. This average extent D basically corresponds to the average diameter δ of the laser beam focal line 2b, that is, an average spot diameter in a range of between about 0.1 micron and about 5 microns.

Thus, it is possible to create a microscopic (i.e., <2 micron and >100 nm in diameter, and in some embodiments <0.5 μm and >100 nm) elongated "hole" (also called a perforation, a damage track, or a defect line, as noted above) in transparent material using a single high energy burst pulse. These individual perforations can be created at rates of several hundred kilohertz (several hundred thousand perforations per second, for example). Thus, with relative motion between the source and the material these perforations can be placed at any desired location within the workpiece. In some embodiments the defect line/damage track is a "through hole", which is a hole or an open channel that extends from the top to the bottom of the transparent material. In some embodiments the defect line/damage track may not be a continuous channel, and may be blocked or partially blocked by portions or sections of solid material (e.g., glass). As defined herein, the internal diameter of the defect line/damage track is the internal diameter of the open channel or the air hole. For example, in the embodiments described herein the internal diameter of the defect line/damage track is <500 nm, for example ≤400 nm, or ≤300 nm. The disrupted or modified area (e.g, compacted, melted, or otherwise changed) of the material surrounding the holes in the embodiments disclosed herein, preferably has diameter of <50 microns (e.g., <10 micron).

As FIG. 2A shows, the substrate material (which is transparent to the wavelength λ of laser beam 2) is heated due to the induced absorption along the focal line 2b arising from the nonlinear effects associated with the high intensity of the laser beam within focal line 2b. FIG. 2B illustrates that the heated substrate material will eventually expand so that a corresponding induced tension leads to micro-crack formation, with the tension being the highest at surface 1a.

The selection of a laser source is predicated on the ability to create multi-photon absorption (MPA) in transparent materials. MPA is the simultaneous absorption of two or more photons of identical or different frequencies in order to excite a molecule from one state (usually the ground state) to a higher energy electronic state (possibly resulting in ionization). The energy difference between the involved lower and upper states of the molecule can be equal to the sum of the energies of the two or more photons. MPA, also called induced absorption, can be a second-order, third-order, or higher-order process, for example, that is several orders of magnitude weaker than linear absorption. MPA differs from linear absorption in that the strength of induced absorption can be proportional to the square, or the cube, or other higher power, of the light intensity, for example, instead of being proportional to the light intensity itself. Thus, MPA is a nonlinear optical process.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To ensure high quality drilled holes (regarding achieving high breaking strength, geometric precision, creation of a strong path for etchant, hole interior morphology and avoidance of micro-cracking), the individual focal lines positioned on the substrate surface should be generated using the optical assembly described below (hereinafter, the optical assembly is alternatively also referred to as laser optics). In order to achieve a small spot size of, for example, 0.5 micron to 2 microns in case of a given wavelength λ of laser 3 (interaction with the material of substrate 1), certain requirements must usually be imposed on the numerical aperture of laser optics 6.

In order to achieve the required numerical aperture, the optics must, on the one hand, dispose of the required opening for a given focal length, according to the known Abbé formulae (N.A.=n sin (theta), n: refractive index of the glass or other material to be processed, theta: half the aperture angle; and theta=arctan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the substrate plane, i.e. incidence angle is 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

As illustrated in FIG. 3A, the laser beam focal line 2b is not only a single focal point for the laser beam, but rather a series of focal points for different rays in the laser beam. The series of focal points form an elongated focal line of a defined length, shown in FIG. 3A as the length l of the laser beam focal line 2b. Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to $1/e^2$ of the peak intensity) and approximately 75% of the diameter of the lens of the optical assembly 6. The focal line 2b of a non-aberration-corrected spherical lens 7 generated by blocking out the beam bundles in the center is thus used. FIG. 3A shows the section in one plane through the central beam, and the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the substrate material in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 3B:
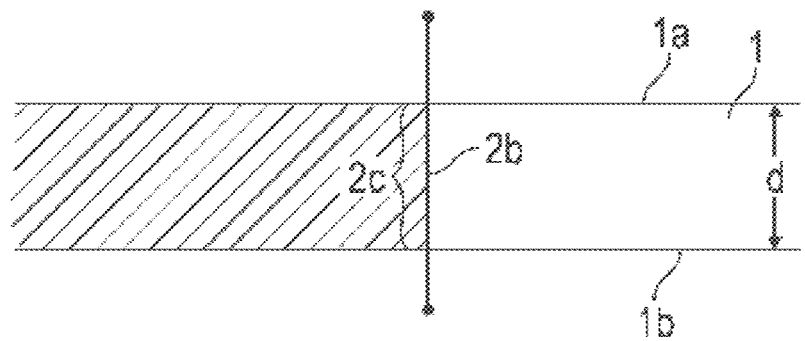
Figures 2, 3B:
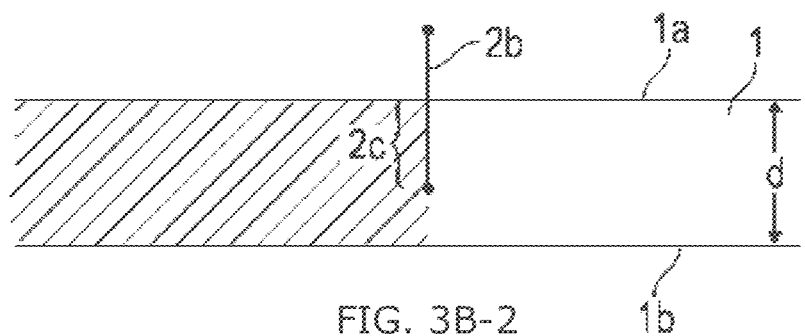
Figures 3, 3B:
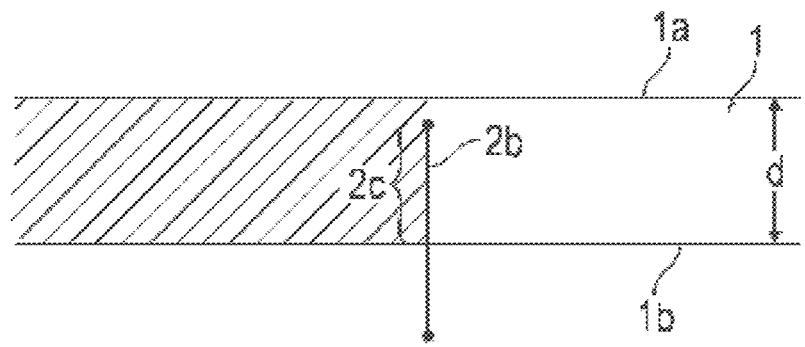
Figures 3, 3B, 4:
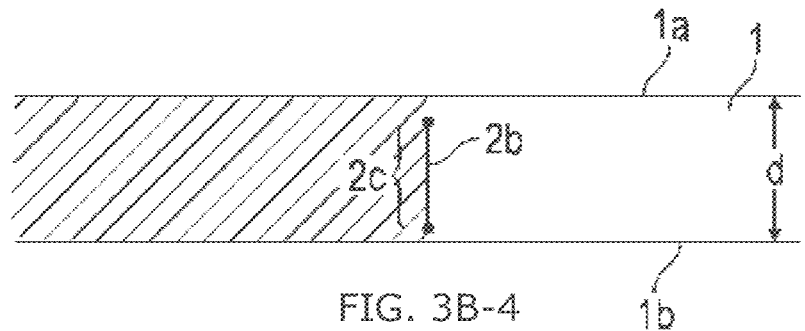

FIGS. 3B-1-4 show (not only for the optical assembly in FIG. 3A, but basically also for any other applicable optical assembly 6) that the position of laser beam focal line 2b can be controlled by suitably positioning and/or aligning the optical assembly 6 relative to substrate 1 as well as by suitably selecting the parameters of the optical assembly 6. As FIG. 3B-1 illustrates, the length l of the focal line 2b can be adjusted in such a way that it exceeds the substrate thickness d (here by factor 2). If substrate 1 is placed (viewed in longitudinal beam direction) centrally to focal line 2b, an extensive section of induced absorption 2c is generated over the entire substrate thickness. The laser beam focal line 2b can have a length l in a range of between about 0.01 mm and about 100 mm or in a range of between about 0.1 mm and about 10 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example.

In the case shown in FIG. 3B-2, a focal line 2b of length l is generated which corresponds more or less to the substrate thickness d. Since substrate 1 is positioned relative to line 2b in such a way that line 2b starts at a point outside the substrate, the length L of the extensive section of induced absorption 2c (which extends here from the substrate surface to a defined substrate depth, but not to the reverse surface 1b) is smaller than the length l of focal line 2b. FIG. 3B-3 shows the case in which the substrate 1 (viewed along a direction perpendicular to the beam direction) is positioned above the starting point of focal line 2b so that, as in FIG. 3B-2, the length l of line 2b is greater than the length L of the section of induced absorption 2c in substrate 1. The focal line thus starts within the substrate and extends beyond the reverse surface 1b. FIG. 3B-4 shows the case in which the focal line length l is smaller than the substrate thickness d so that—in the case of a central positioning of the substrate relative to the focal line viewed in the direction of incidence—the focal line starts near the surface 1a within the substrate and ends near the surface 1b within the substrate (e.g. l=0.75·d).

It is particularly advantageous to position the focal line 2b in such a way that at least one of surfaces 1a, 1b is covered by the focal line, so that the section of induced absorption 2c starts at least on one surface of the substrate. In this way it is possible to achieve virtually ideal cuts or formation of damage tracks while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one skilled in the art; the cone angle in the example is 10°. The apex of the axicon labeled here with reference 9 is directed towards the incidence direction and centered on the beam center. Since the focal line 2b produced by the axicon 9 starts within its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins within axicon 9, a significant part of the laser energy is not focused into the section of induced absorption 2c of focal line 2b, which is located within the material, in the situation where there is a separation a between axicon 9 and the substrate or glass composite workpiece material. Furthermore, length l of focal line 2b is related to the beam diameter through the refractive indices and cone angles of axicon 9. This is why, in the case of relatively thin materials (several millimeters), the total focal line is much longer than the substrate or glass composite workpiece thickness, having the effect that much of the laser energy is not focused into the material.

Figure 5A:
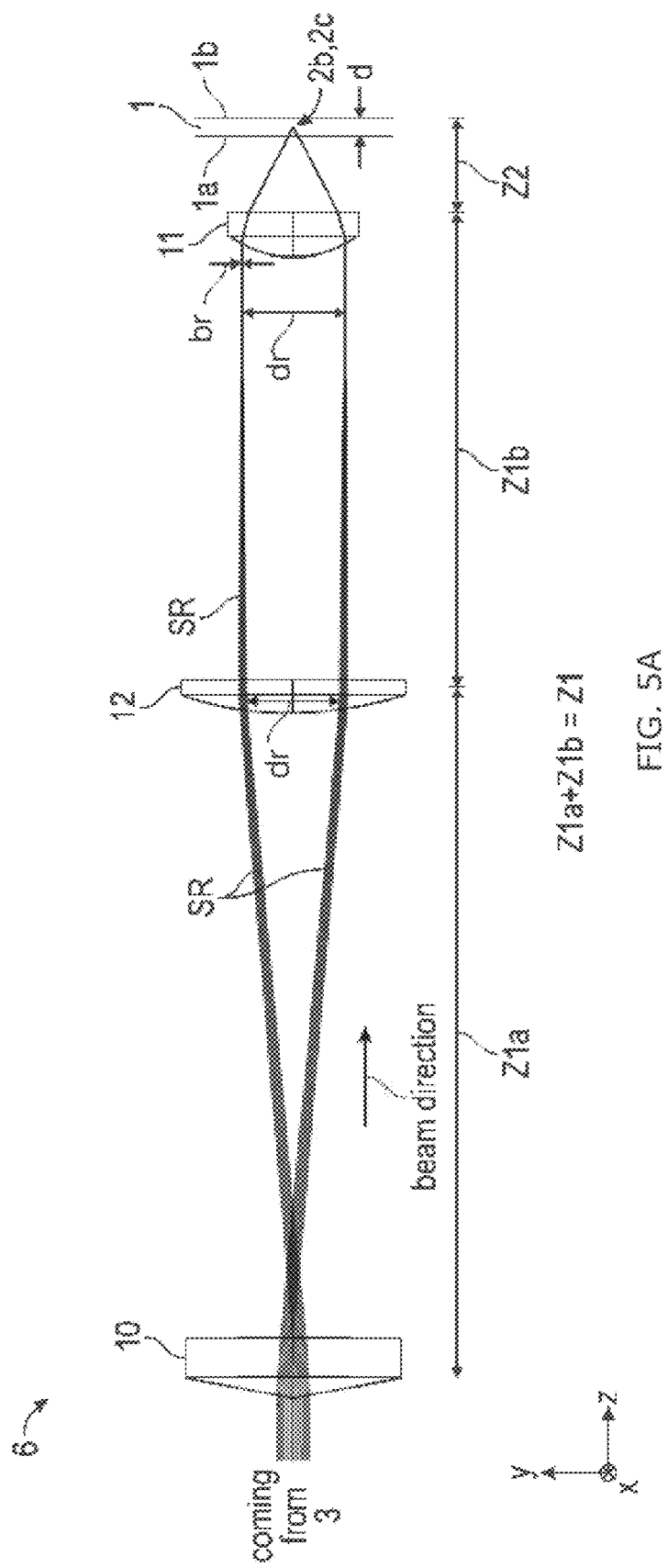

For this reason, it may be desirable to use an optical assembly 6 that includes both an axicon and a focusing lens. FIG. 5A depicts such an optical assembly 6 in which a first optical element with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the length l of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the defect line/damage track formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the defect line/damage track formation is intended to continue to the back side of the substrate, the circular (annular) illumination still has the advantage that (1) the laser power is used optimally in the sense that most of the laser light remains concentrated in the required length of the focal line and (2) it is possible to achieve a uniform spot size along the focal line—and thus a uniform separation of part from substrate along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using only the combination of an axicon and a lens 11 depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances. Both effects can be avoided by including another lens, a collimating lens 12, in the optical assembly 6. The additional positive collimating lens 12 serves to adjust the circular illumination of focusing lens 11 very tightly. The focal length f' of the collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

The optical assembly 6 depicted in FIG. 5A is thus based on the one depicted in FIG. 1 so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction).

As also shown in FIG. 5A, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

Figure 6:
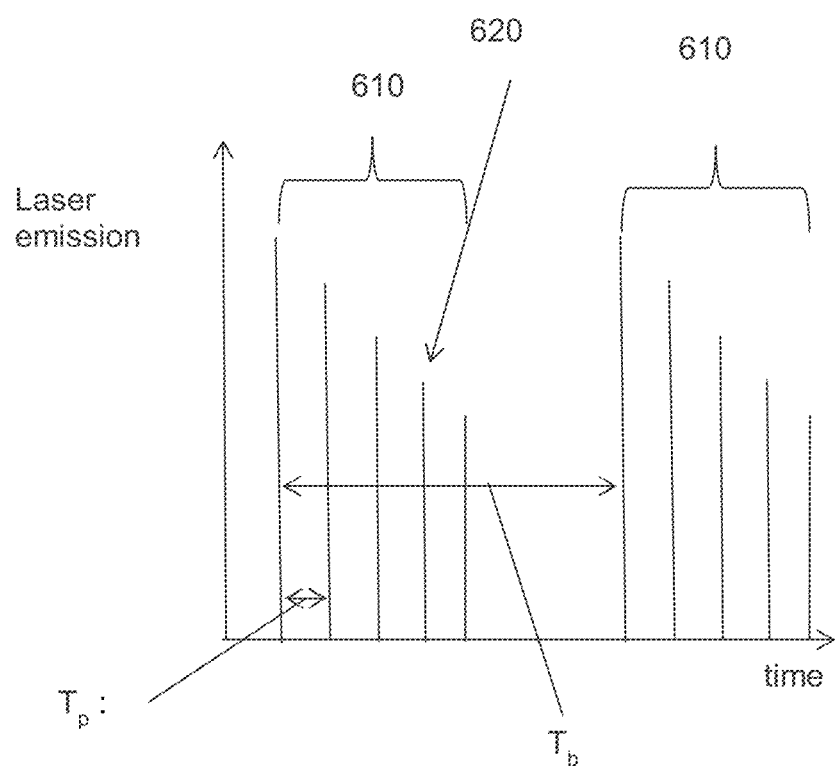
FIG. 6 is a graph of laser emission (intensity) as a function of time for exemplary picosecond lasers.

Note that the typical operation of such a picosecond laser creates a "burst" of pulses, sometimes also called a "burst pulse". Bursting is a type of laser operation where the emission of pulses is not in a uniform and steady stream but rather in tight clusters of pulses. This is depicted in FIG. 6. Each "burst" 610 may contain multiple pulses 620 (such as at least 2 pulses, at least 3 pulses, at least 4 pulses, at least 5 pulses, at least 10 pulses, at least 15 pulses, at least 20 pulses, or more) of very short duration. That is, a pulse burst is a "pocket" of pulses, and the bursts are separated from one another by a longer duration than the separation of individual adjacent pulses within each burst. Pulses 610 can have a pulse duration $T_d$ in a range from about 0.1 psec to about 100 psec (for example, 0.1 psec, 5 psec, 10 psec, 15 psec, 18 ps, 20 ps, 22 ps, 25 ps, 30 ps, 50 ps, 75 ps, or therebetween). In some embodiments, the pulse duration can be in a range from greater than about 1 picosecond and less than about 100 picoseconds or greater than about 5 picoseconds and less than about 20 picoseconds. These individual pulses 620 within a single burst 610 can also be termed "sub-pulses," which simply denotes the fact that they occur within a single burst of pulses. The energy or intensity of each laser pulse 620 within the burst 610 may not be equal to that of other pulses within the bust, and the intensity distribution of the multiple pulses within a burst 610 often follows an exponential decay in time governed by the laser design. In some embodiments, each pulse 620 within the burst 610 is separated in time by a duration $T_p$ in a range of between about 1 nsec and about 50 nsec, (e.g. 10-50 ns, or 10-50 ns, or 10-30 nsec), with the time often governed by the laser cavity design. For a given laser, the time separation $T_p$ between each pulses (pulse-to-pulse separation) within a burst 610 is relatively uniform (±10%). For example, in some of the embodiments, $T_p$ is approximately 20 nsec (50 MHz). Also for example, for a laser that produces pulse-to pulse separation $T_p$ of about 20 nsec, the pulse to pulse separation $T_p$ within a burst is maintained within about ±10%, or is about ±2 nsec. The time between each "burst" 610 of pulses 620 (i.e., time separation $T_b$ between bursts) will be much longer, (e.g., 0.25≤$T_b$≤1000 microseconds, for example 1-10 microseconds, or 3-8 microseconds). In some of the exemplary embodiments $T_b$ is about 10 microseconds, for a laser repetition rate of about 100 kHz. In some of the exemplary embodiments of the laser described herein, $T_b$ can be around 5 microseconds for a laser repetition rate or frequency of about 200 kHz. The time between each "burst" can also be around 5 microseconds, for a laser repetition rate of ~200 kHz, for example. The laser repetition rate is also referred to as burst repetition frequency herein, and is defined as the time between the first pulse in a burst to the first pulse in the subsequent burst. In other embodiments, the burst repetition frequency is in a range of between about 1 kHz and about 4 MHz. More preferably, the laser repetition rates can be in a range of between about 10 kHz and 650 kHz. In some embodiments, the laser repetition rate can be about 10 kHz or greater or about 100 kHz or greater. The time $T_b$ between the first pulse in each burst to the first pulse in the subsequent burst may be 0.25 microsecond (4 MHz repetition rate) to 1000 microseconds (1 kHz repetition rate), for example 0.5 microseconds (2 MHz repetition rate) to 40 microseconds (25 kHz repetition rate), or 2 microseconds (500 kHz repetition rate) to 20 microseconds (50 kHz repetition rate). The exact timings, pulse durations, and repetition rates can vary depending on the laser design, but short pulses ($T_d$<20 psec and preferably $T_d$≤15 psec) of high intensity have been shown to work particularly well. In some of the embodiments 5 psec≤$T_d$≤15 psec.

The required energy to modify the material can be described in terms of the burst energy—the energy contained within a burst (each burst 610 contains a series of pulses 620), or in terms of the energy contained within a single laser pulse (many of which may comprise a burst). For these applications, the energy per burst can be from 25 μJ-750 μJ, more preferably 40 μJ-750 μJ, 500-500 μJ, 50-250 μJ, or 100-250 μJ. The energy of an individual pulse within the burst can be less, and the exact individual laser pulse energy will depend on the number of pulses within the burst and the rate of decay (e.g. exponential decay rate) of the laser pulses with time as shown in FIG. 6. For example, for a constant energy/burst, if a burst contains 10 individual laser pulses, then each individual laser pulse will contain less energy than if the same burst had only 2 individual laser pulses.

The use of a laser capable of generating such bursts of pulses is advantageous for such processing. In contrast with the use of single pulses spaced apart in time by the repetition rate of the laser, the use of a burst sequence that spreads the laser energy over a rapid sequence of sub-pulses (that comprise a burst) allows access to larger timescales of high intensity interaction with the material than is possible with single-pulse lasers. While a single-pulse can be expanded in time, as this is done the intensity within the pulse must drop as roughly one over the pulse width. Hence if a 10 psec pulse is expanded to a 10 nsec pulse, the intensity drop by roughly three orders of magnitude. Such a reduction can reduce the optical intensity to the point where non-linear absorption is no longer significant, and light material interaction is no longer strong enough to allow for material modification. In contrast, with a burst pulse laser, the intensity during each sub-pulse can remain very high—for example three 10 psec pulses spaced apart in time by approximately 10 nsec still allows the intensity within each pulse to be approximately within a factor of three of a single 10 psec pulse, while the laser is allowed to interact with the material over a timescale that is now three orders of magnitude larger. This adjustment of multiple pulses within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse.

The damage track or hole is formed in the material when a single burst of pulses strikes substantially the same location on the material. That is, multiple laser pulses within a single burst correspond to a single defect line or a hole location in the material. Of course, since the material is translated (for example by a constantly moving stage) or the beam is moved relative to the material, the individual pulses within the burst cannot be at exactly the same spatial location on the material. However, the pulses are well within 1 micron of one another so that they strike the material at essentially the same location. For example, the pulses may strike the material at a spacing sp where 0<sp≤500 nm from one another. For example, when a location on the material is hit with a burst of 20 pulses the individual pulses within the burst strike the glass within 250 nm of each other. Thus, in some embodiments, the spacing sp is in a range from about 1 nm to about 250 nm or from about 1 nm to about 100 nm.

The optical method of forming the line focus can take multiple forms, using donut shaped laser beams and spherical lenses, axicon lenses, diffractive elements, or other methods to form the linear region of high intensity as described above. The type of laser (picosecond, femto second, etc.) and wavelength (IR, green, UV, etc.) can also be varied, as long as sufficient optical intensities are reached to create breakdown of the substrate material.

Figure 7:
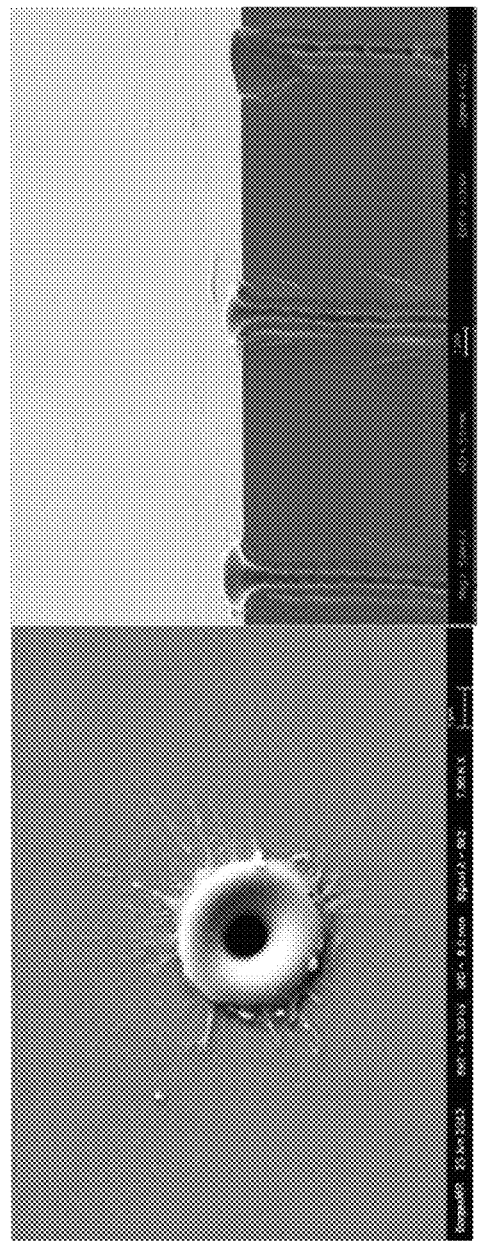
FIGS. 7A and 7B are scanning electron micrographs of the features formed by laser drilling, as made in a piece of Eagle XG® glass.

Hole or Damage Track Formation:

The damage tracks created by the aforementioned laser process generally take the form of holes with interior dimensions in the range of about 0.1 microns to 2 microns, for example 0.1-1.5 microns. Preferably the holes formed by the laser are very small (single microns or less) in dimension—i.e., they are narrow. In some embodiments, these holes are 0.2 to 0.7 microns in diameter. As described above, in some embodiments, the damage tracks are not continuous holes or channels. The diameter of the damage tracks can be 5 microns or less, 4 microns or less, 3 microns or less, 2 microns or less, or 1 micron or less. In some embodiments, the diameter of the damage tracks can be in a range from greater than 100 nm to less than 2 microns, or from greater than 100 nm to less than 0.5 microns. Scanning electron micrograph images of such features are shown in FIGS. 7A and 7B. These holes are un-etched holes (i.e., they have not been widened by the etching steps)

Figure 8:
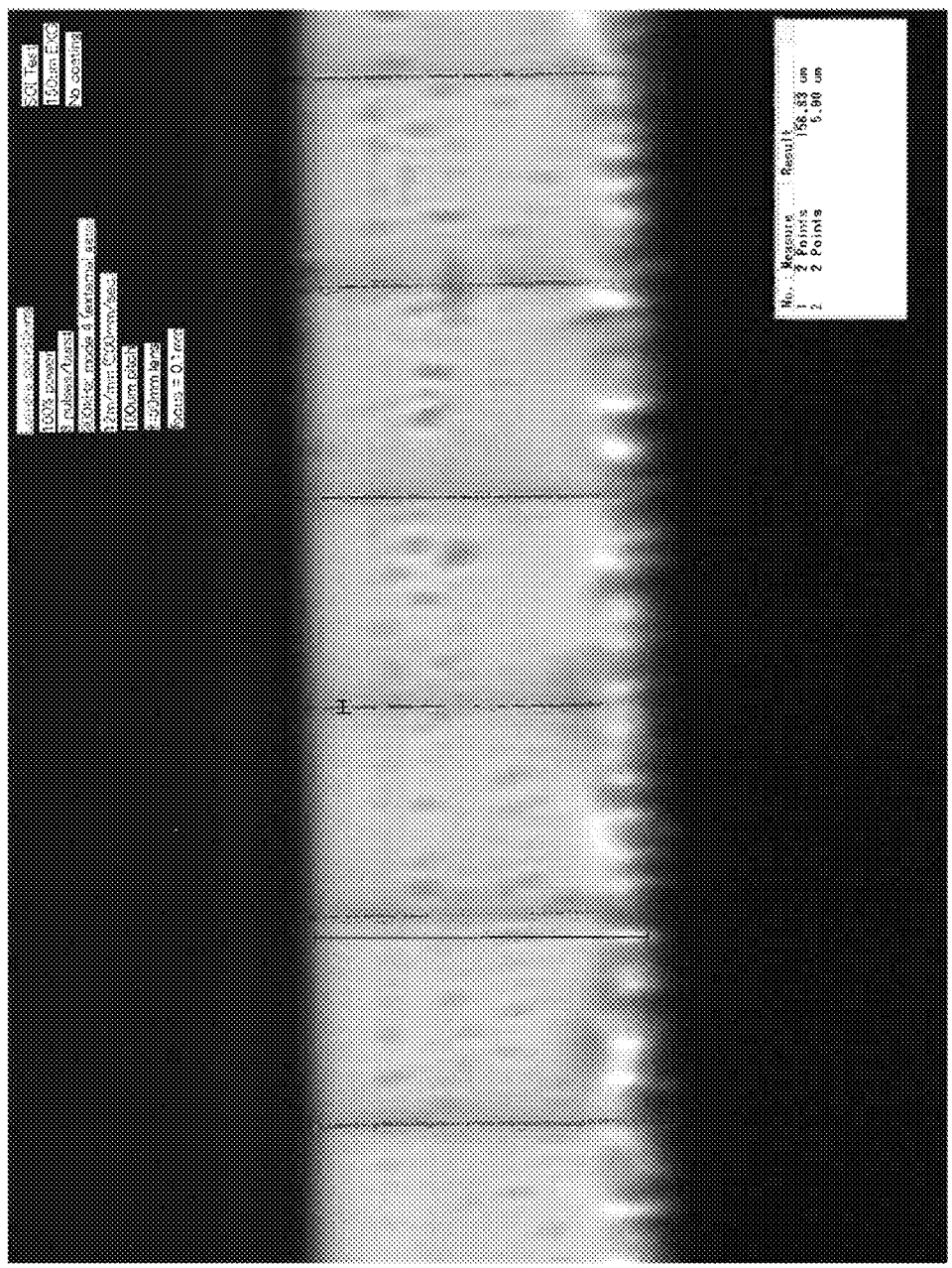
FIG. 8 is a microscope image of typical damage tracks, perforations or defect lines (these three terms are used interchangeably herein), side view, no etching. The tracks made through the glass are generally not completely open—i.e., regions of material are removed, but complete through-holes are not necessarily formed.

The holes or defect lines/damage tracks can perforate the entire thickness of the material, and may or may not be a continuous opening throughout the depth of the material. FIG. 8 shows an example of such tracks or defect lines perforating the entire thickness of a workpiece of 150 micron thick Eagle XG® glass substrate. The perforations or damage tracks are observed through the side of a cleaved edge. The tracks through the material are not necessarily through holes. There are often regions of glass that plug the holes, but they are generally small in size, on the order of microns, for example.

Figure 9:
FIG. 9 is a microscope side view image at greater magnification than the micrograph shown in FIG. 8 of damage tracks or perforations, with no acid etching.

FIG. 9 shows a greater magnification image of similar holes or damage tracks, where the diameter of the holes can be more clearly seen, and also the presence of regions where the hole is plugged by remaining glass. The tracks made through the glass are about 1 micron in diameter. They are not completely open—i.e., regions of material are removed, but complete through-holes are not necessarily formed.

It is also possible to perforate or create holes/damage tracks in stacked sheets of glass or stacks of other substantially transparent materials. In this case the focal line length needs to be longer than the stack height. For example, the tests were performed with three stacked 150 micron sheets of Eagle XG® glass, and full perforations were made through all three pieces with the perforations or defect lines/damage tracks (of approximately 1 micron internal diameter) extended from the top surface of the upper sheet all the way through the bottom surface of the bottom sheet. An example of a focal line configured for full perforation through a single substrate is shown in FIG. 3B-1, while a full perforation through three stacked sheets is described hereinafter in conjunction with FIG. 48. As defined herein, the internal diameter of a defect line or perforation is the internal diameter of the open channel or the air hole. The disrupted or modified area (e.g, compacted, melted, or otherwise changed) of the material surrounding the holes in the can have a diameter larger than the internal diameter of the open channel or air hole. The perforations in the stack can be acid etched to create a plurality of through holes that extend through all of the glass sheets comprising the stack, or alternatively the glass sheets can be separated and then the holes can be acid etched in each of the sheets separately. For example, this process may result in glass with etched hole diameters of 1-100 microns, for example, 10-75 microns, 10-50 microns, 2-25 microns, 2-20 microns, 2-15 microns, 2-10 microns, and the holes may have, for example, spacing of 25-1000 microns.

This process may also be utilized to create holes in sheets of transparent materials other than glass. Since the optical system uses a line focus, it is possible to drill through transparent materials that have large (>1 micron, up to 4 mm, for example 10-500 microns) air gaps or other filler materials (e.g. water, transparent polymers, transparent electrodes like indium tin oxide) between the substrate sheets. The ability to continue to drill through multiple glass sheets even when they are separated by a macroscopic (many microns, many tens of microns, or even many hundreds of microns) is to be noted as a particular advantage of this line focus method of drilling. In contrast, when other laser methods are used, such as those that rely upon Kerr-effect based self-focusing to form a high aspect ratio channel, or those that use the formation of a glass hole itself to create a light guide, the presence of a gap such as an air gap between two glass pieces can completely disrupt the process making quality drilling of the bottom sheet difficult or completely ineffective. This is because when such a non-line focus (e.g. not a Gauss-Bessel) beam enters air, it will diffract and spread out quickly. If there is no pre-existing channel to re-confine it, or no substantial Kerr-effect to re-focus it, then the beam will spread to too large a diameter to modify the material below. In the case of Kerr-effect based self-focusing, the critical power to self-focus in air is ~20× as much as the critical power required in glass, making such an air gap very problematic. However, for a line focus system, the beam will continue to form a high intensity core whether or not the glass material is there, or polymer, or an air gap, or even in the presence of a vacuum. Hence the line focus beam will have no trouble continuing to drill the glass layer underneath regardless of the gap in material between it and the glass sheet above.

Similarly, the stack of substrate sheets may contain substrates of different glass compositions throughout the stack. For example, one stack may contain both substrate sheets of Eagle XG glass and of Corning glass code 2320. Or the stack of transparent substrate sheets may contain non-glass transparent inorganic material such as sapphire. The substrates must be substantially transparent to the wavelength of the laser that is used to create the line focus, for example the laser wavelength being situated from 200 nm to 2000 nm, for example, 1064 nm, 532 nm, 355 nm, or 266 nm. In some embodiments, the substrate can also be transparent to at least one wavelength in a range from about 390 nm to about 700 nm. In some embodiments, the substrate can transmit at least 70%, at least 75%, at least 80%, at least 85%, or at least 90% of at least one wavelength in a range from about 390 nm to about 700 nm. Drilling holes/damage tracks in glass or other transparent materials can be used to create an article comprising a stack of substrates (spaced or in direct contact with one another) with a plurality of holes formed through said stack, where the holes extend through each of the substrates, the holes being, for example, between 1-100 microns in diameter, and, for example, having a spacing of 25-1000 microns. Accordingly, this process can be utilized to create a substantially transparent article comprising a multilayer stack, where the multilayer stack comprises multiple glass layers and at least one layer of polymer situated between the glass layers, or at least two glass layers of different compositions, or at least one glass layer and at least on non-glass inorganic layer.

The lateral spacing (pitch) between the holes or defect lines/damage tracks is determined by the pulse or burst rate of the laser as the substrate is translated underneath the focused laser beam. Only a single picosecond laser pulse burst is usually necessary to form an entire hole, but multiple bursts may be used if desired. To form holes at different pitches, the laser can be triggered to fire at longer or shorter intervals. In some embodiments, the laser triggering generally can be synchronized with the stage driven motion of the workpiece beneath the beam, so laser bursts are triggered at a fixed interval, such as every 1 micron, every 5 microns, every 10 microns, or every 20 microns or greater. When forming the damage tracks in substrate intended to be used as an interposer, the distance, or periodicity, between adjacent damage tracks can depend upon the desired pattern of through-holes (i.e., the holes formed after the etching process). For example, in some embodiments, the desired pattern of damage tracks (and the resultant through-holes that are formed therefrom after etching) is an aperiodic pattern of irregular spacing. They need to be at locations where traces will be laid on the interposer or where specific electrical connections on the interposer to the chips are going to be placed. Therefore, a distinction between cutting and damage track drilling for interposers is that the through-holes for interposers is laid out in aperiodic patterns. Whereas for cutting patterns the damage tracks are made at a specific periodic pitch where the pitch depends on the composition of the material being cut. In the methods described herein, the holes or defect lines (or damage tracks, or perforations) can have a spacing between adjacent holes/ defect lines/damage tracks of about 10 µm or greater, about 20 µm or greater, about 30 µm or greater, about 40 µm or greater, about 50 µm or greater. In some embodiments, the spacing can be up to about 20 mm. In some embodiments, the spacing can be from 50 microns to 500 microns or from 10 microns and 50 microns.

Figure 10:
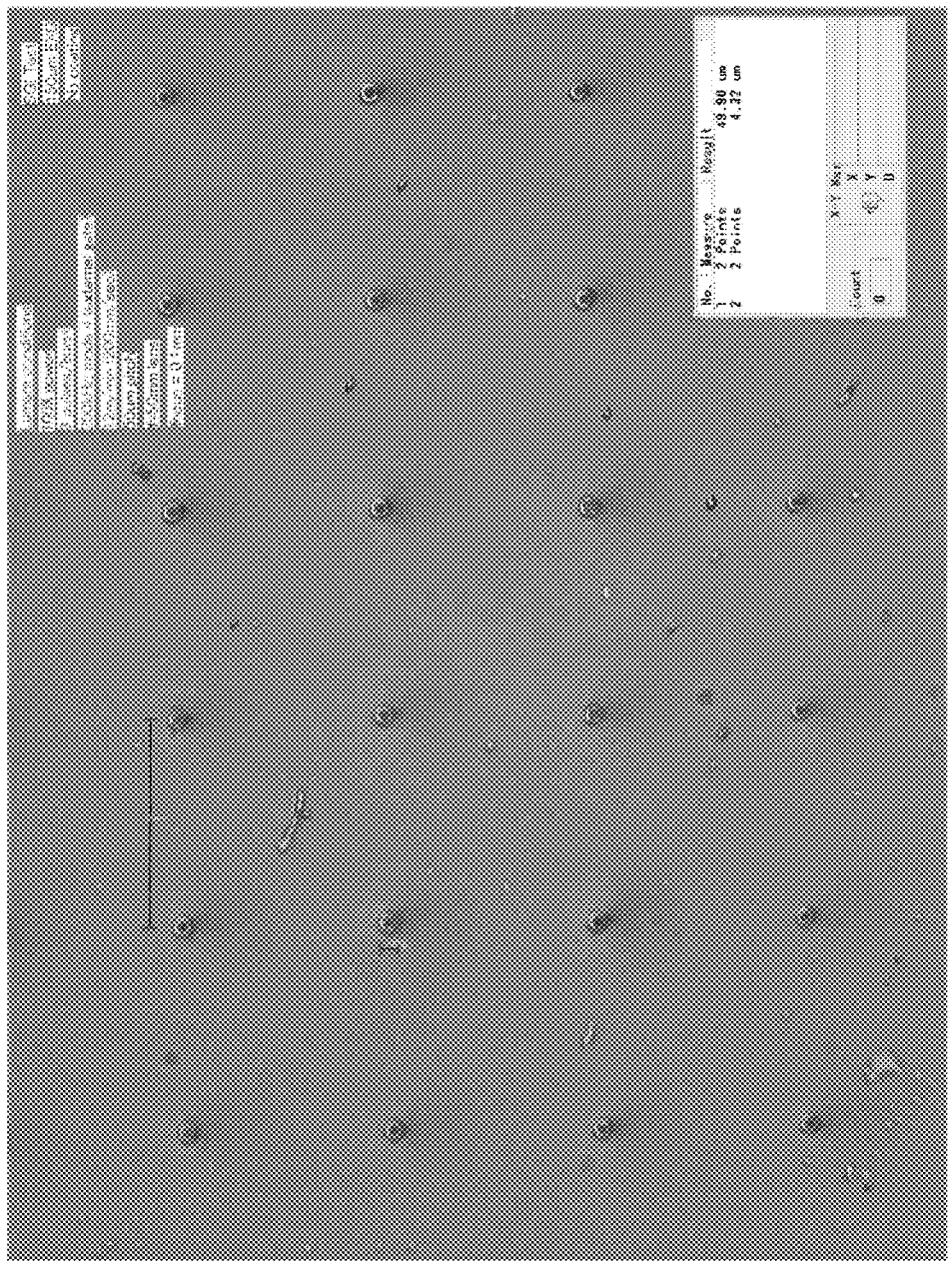
FIG. 10 is a microscope image of typical damage tracks or holes, top view, no acid etching.

FIG. 10 shows a similar sample, in this case 300 micron thick Corning Eagle XG® glass, from a top view, with a periodic array of holes. The entrance points of the laser beam are clearly seen. The pitch or spacing between adjacent holes is 300 microns, and the approximate diameter of the holes is 2 microns, with a rim or modified or raised material around each hole of about 4 microns diameter. A variety of laser process parameters were explored to find conditions that produced holes that fully penetrated the material and had minimal micro-cracking of the glass.

Figure 11:
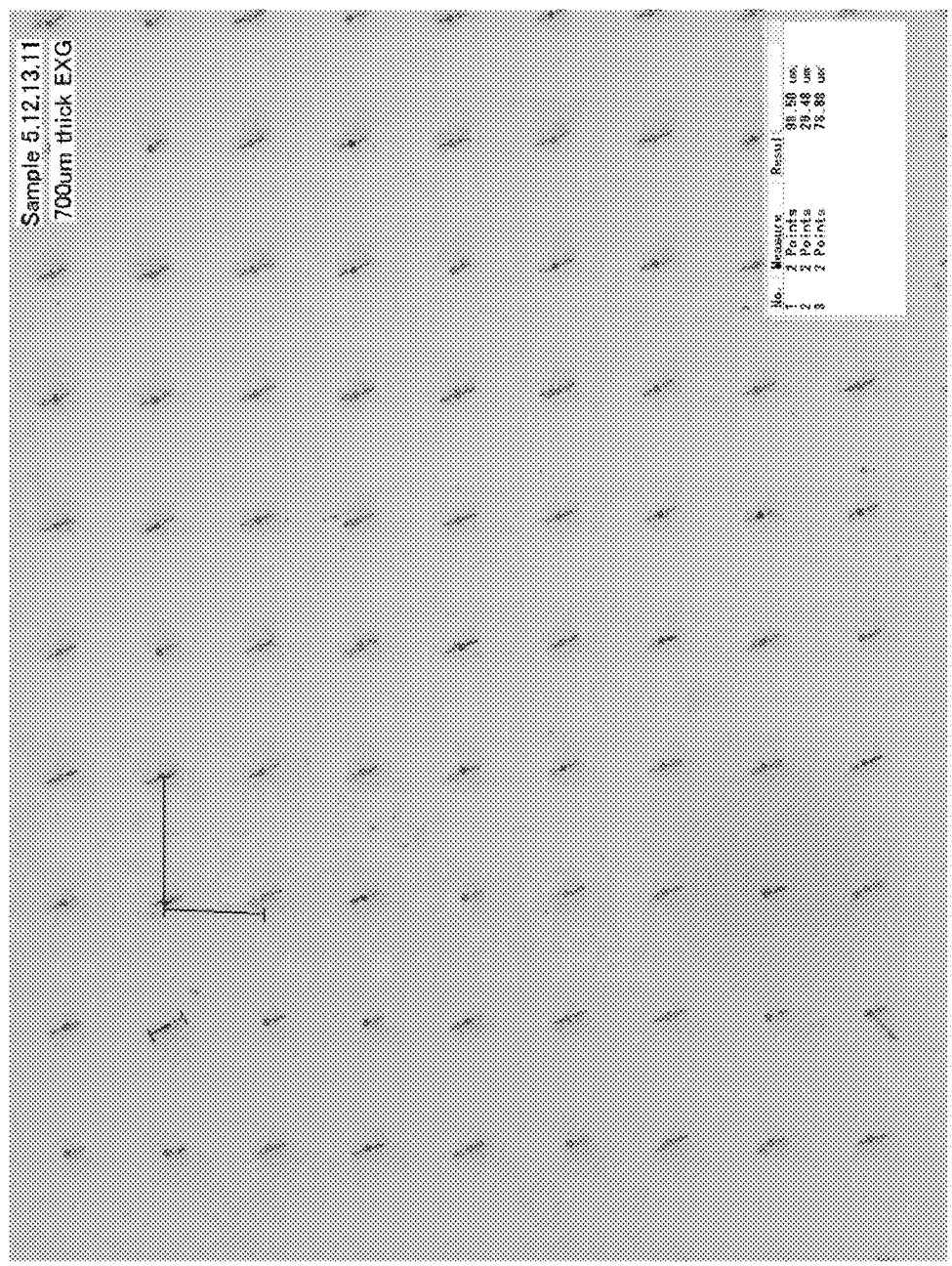
FIG. 11 is a scanning electron micrograph of holes made with process conditions that gave significant micro-cracking, by use of a shorter focal length objective lens (f=30 mm) which gave a shorter focal line (~0.5 mm) and hence high energy density in the defect line.

The laser power and lens focal length (which determines the focal line length and hence power density) are particularly important parameters to ensure full penetration of the glass and low micro-cracking. For example, FIG. 11 shows a result where significant micro-cracking of the glass occurred.

Figure 12:
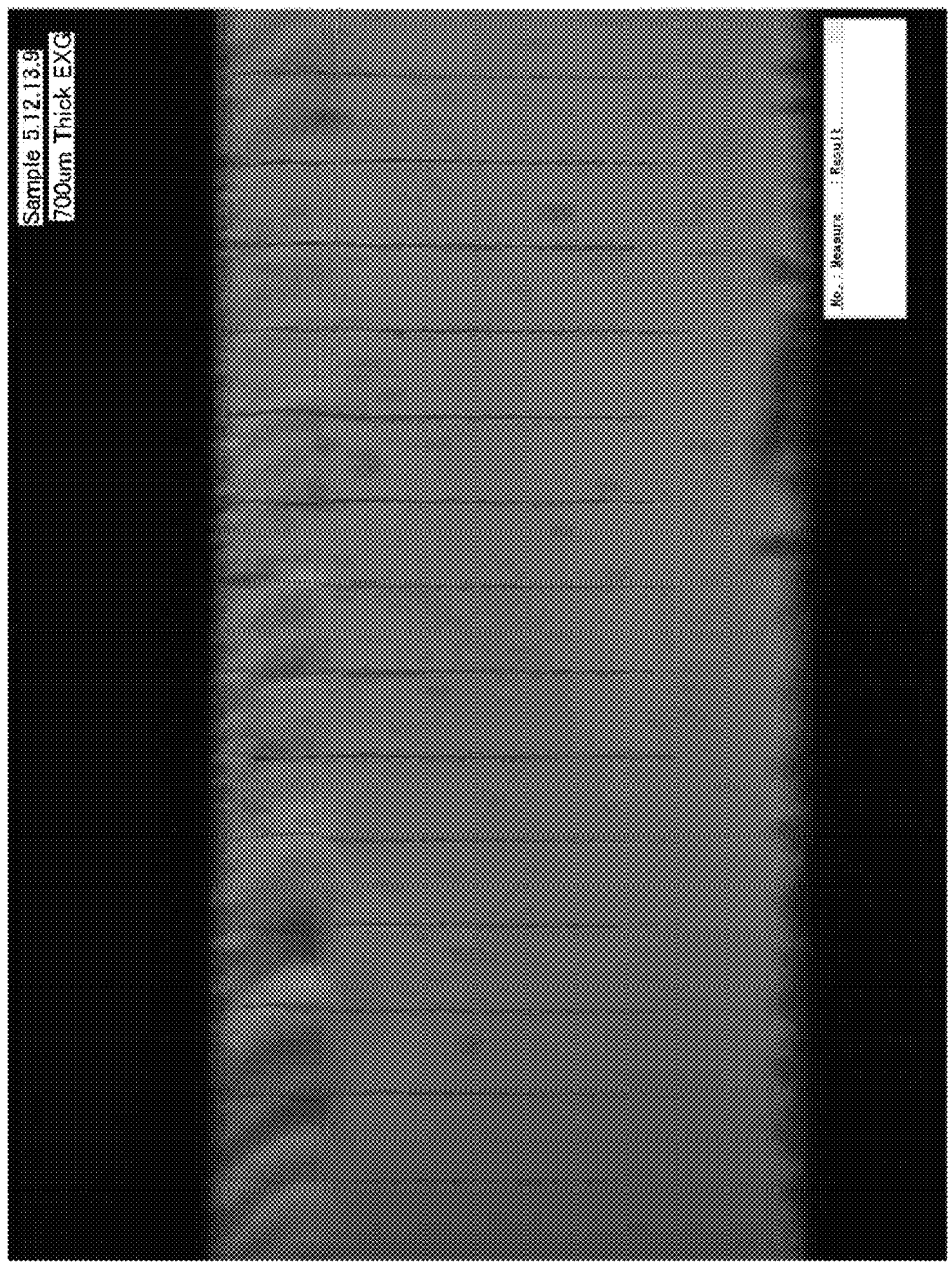
FIG. 12 is a scanning electron micrograph of holes that do not penetrate the full thickness of the part, and which can be used to make blind vias.

It is also possible to intentionally create perforations or damage tracks which only partially extend through the material. In this case, such tracks are useful for making blind holes or vias. An example of laser formed blind holes is shown in FIG. 12. Here the damage tracks extend about 75% of the way through the glass. To accomplish this, the focus of the optics is raised up until the line focus only causes damage in the top section of the glass. Other blind hole depths may be realized, such as extending only 10% of the way through the glass, only 25%, only 50%, or any fractional value of the glass thickness.

For following conditions were found to be suitable for creating damage tracks that are continuous or non-continuous through holes or channels extending from a first surface to a second surface in 300 micron thick Corning Eagle XG® glass:

Input beam diameter to axicon lens about 3 mm $1/e^2$
Axicon angle=10 degrees
Initial collimating lens focal length=125 mm
Final objective lens focal length=50 mm
Incident beam convergence angle (Beta)=12.75 degrees
Focus set to be at z=0.25 mm (approximately 50 microns below the top surface of the part)
Laser pulse energy at about 180 microJoules)
Pulse repetition rate of the laser=200 kHz.
3 pulses/burst Results from these conditions are shown in FIG. 10.

For cutting operations, the laser triggering generally is synchronized with the stage driven motion of the part beneath the beam, and laser pulses are most often triggered at a fixed interval, such as every 1 micron, or every 5 microns. The exact spacing is determined by the material properties that facilitate crack propagation from perforated hole to perforated hole, given the stress level in the substrate. However, in contrast to cutting a substrate, it is also possible to use the same method to only perforate the material with larger distances between the holes or damage tracks. In the case of interposers, the holes are generally separated by much greater distance than required for cutting—instead of a pitch of about 10 microns or less, the spacing between holes can be hundreds of microns. As discussed above, the exact locations of the holes need not be at regular intervals (i.e., they are aperiodic)—the location simply is determined by when the laser is triggered to fire, and may be at any location within the part. The holes made in FIG. 9 are an example of spacing and pattern that are somewhat representative of interposer applications.

In general, the higher the available laser power, the faster the material can be perforated and/or the fast damage tracks can be formed in the material with the above processes. In the case of drilling glass for interposers or similar applications, process speed is generally not limited directly by laser power, but more by the ability to direct the already abundant laser pulses or bursts to the specific locations at which holes are needed. As described above, in some embodiments, the desired pattern of damage tracks (and the resultant through-holes that are formed therefrom after etching) is an aperiodic pattern of irregular spacing. They need to be at locations where traces will be laid on the interposer or where specific electrical connections on the interposer to the chips are going to be placed. Therefore, a distinction between cutting and damage track drilling for interposers is that the through-holes for interposers is laid out in aperiodic patterns. For example, commercially available burst mode psec lasers can readily produce laser bursts of ~200 microJoules/burst at repetition rates ~100-200 kHz. This corresponds to a time average laser power of about 20-40 Watts. However, to drill interposers, most often the majority of these bursts will be unused, as even with very fast beam deflection methods the beam can only be placed at the desired hole locations at rates of kHz or possibly tens of kHz. This means that a primary challenge for efficient drilling with the above line focus and psec pulsed laser process is how the beam is moved and directed across the substrate surface. One method that may be used to divide the hole pattern into a series of 1-dimensional lines, where each line contains all of the holes that, for example, share a common y-axis location. The glass or beam can then be scanned in a "raster scan" mode where the laser beam travels in the x-direction, scanning across all of the desired hole locations that share common y-axis value. As the beam is scanned, that laser is triggered to fire a burst only at the desired hole locations. After a given y-line is scanned, the substrate or laser beam are moved to a new y-location, the process is repeated for the new set of desired hole locations on this new y-line. This process is then continued until all of the desired holes on the substrate are made.

The above process is straightforward, but not necessarily efficient as the speed at which the stage and spacing of the desired holes will determine what fraction of laser pulses/bursts can be used. For example, if the laser can produce pulses or bursts at 200,000 bursts/sec, but the stages move at average speed of 0.5 m/sec and the holes are on average 100 microns apart, then only about 5,000 bursts/sec are used—about 2.5% of the available laser bursts. While this does drill 5,000 holes (or damage tracks)/sec, this is only a small fraction of the laser capacity.

More efficient ways can be used to direct the laser beam. Scanning of the glass or beam delivery optics can be combined with rapid beam deflection available from galvanometer mirrors (galvo) and f-theta lenses, or with piezo actuation of optics or the glass or small ranges, or electro-optic beam deflection (EOD) or acousto-optic beam deflection (AOD), to allow the beam to be rapidly adjusted in a direction orthogonal to the linear "raster" scan direction described above. In that case, as the beam is scanned along the y-axis, small and rapid adjustments may be made with the fast beam deflector that allow the pulses to be directed to any hole within a certain range of the linear stage (x,y) coordinate at a given time. So instead of being able to direct the laser beam holes to only given locations along a line, the system can now direct the laser beam to any holes within a swath of width dy of the raster scan line. This can greatly increase the number of accessible holes by the laser beam per unit time, and thus greatly increase the number of holes/sec that may be drilled. In addition, the fast beam deflector may be used not only in a direction perpendicular to the raster scan axis, but also parallel to the scan axis. By also deflecting the beam parallel to the scan axis, the fast beam deflecting component (e.g. galvo, AOD, EOD, piezo) can be used to allow for holes within a dy swath that have identical scan axis locations (e.g. the x-axis in the above example) but different y-axis locations to be drilled, since the beam can be "moved" backwards relative to the stage scan to drill a second hole at a given x-location without stopping the linear stage motion. In addition, fast deflection along the scan axis also allows for more precision in the placement of holes, since it can be used to direct the beam to the desired x-axis location regardless of any small time delays in when the pulsed laser is available to fire a burst, and also compensate for velocity and acceleration artifacts in the linear stage motion.

Alternatively, instead of continuously scanning in one direction and making fast beam movements in coordination with that scan, it is also possible to use more traditional "step and repeat" methods, where the linear stages are moved to a specific (x,y) location, all the holes within a certain field of a fast beam deflector (e.g. a galvo) are drilled, and the linear stages are stepped to a new (x,y) location, and the process is repeated. However, it may be advantageous for overall drilling speed to instead use the aforementioned coordinated linear stages and fast deflector method where the linear stages are kept moving almost constantly.

To achieve even higher system throughput (holes/sec/system, the above beam scanning methods may also be combined with beam splitting techniques, where a common laser source has its bursts distributed among multiple beam delivery heads above a single substrate or series of substrates. For example, an acousto-optic or electro-optic elements may be used to deflect every $N^{th}$ pulse to a given optical path, and there may be N optical heads used. This may be accomplished by employing the angle-deflection properties of such beam steering elements, or by using the polarization altering properties of such elements to direct the beams through polarization dependent beam splitters.

Depending upon the desired pattern of damage tracks (and the through-holes created therefrom by the etching process) the damage tracks can be created at a speed greater than about 50 damage tracks/second, greater than about 100 damage tracks/second, greater than about 500 damage tracks/second, greater than about 1,000 damage tracks/second, greater than about 2,000 damage tracks/second, greater than about 3,000 damage tracks/second, greater than about 4,000 damage tracks/second, greater than about 5,000 damage tracks/second, greater than about 6,000 damage tracks/second, greater than about 7,000 damage tracks/second, greater than about 8,000 damage tracks/second, greater than about 9,000 damage tracks/second, greater than about 10,000 damage tracks/second, greater than about 25,000 damage tracks/second, greater than about 50,000 damage tracks/second, greater than about 75,000 damage tracks/second, or greater than about 100,000 damage tracks/second.

Etching:

To enlarge the holes to a size useful for metal/conductive material coating/filling and electrical connections, the parts were acid etched. Use of acid etching to enlarge the holes to a final diameter can have a number of benefits: 1) acid etching changes the holes from a size (for example, about 1 micron) that is too small to practically metalize and use for interposers to more convenient size (for example, 5 microns or higher); 2) etching can take what may start as a non-contiguous hole or simply a damage track through the glass and etch it out to form a continuous though-hole via; 3) etching is a highly parallel process where all of the holes/damage tracks in a part are enlarged at the same time—which is much faster than what would happen if a laser had to re-visit the hole and drill out more material to enlarge it; and 4) etching helps blunt any edges or small checks within the part, increasing the overall strength and reliability of the material.

Figure 52A:
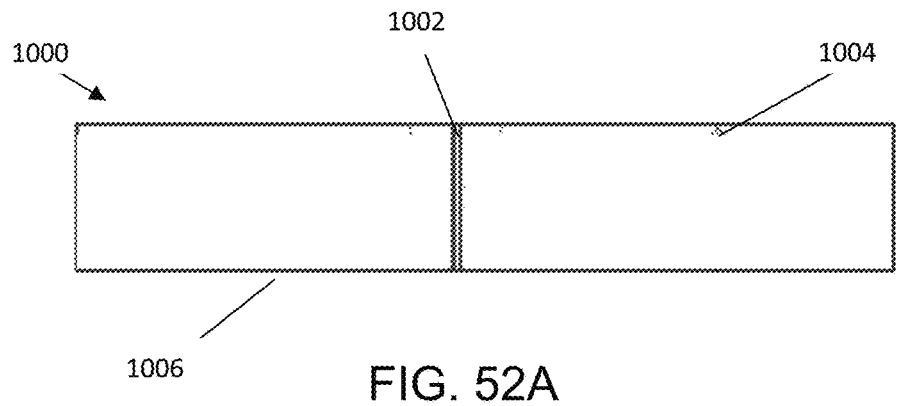
FIGS. 52A and 52B illustrate a substrate 1000 after laser drilling and after acid etching, respectively.
Figure 52B:
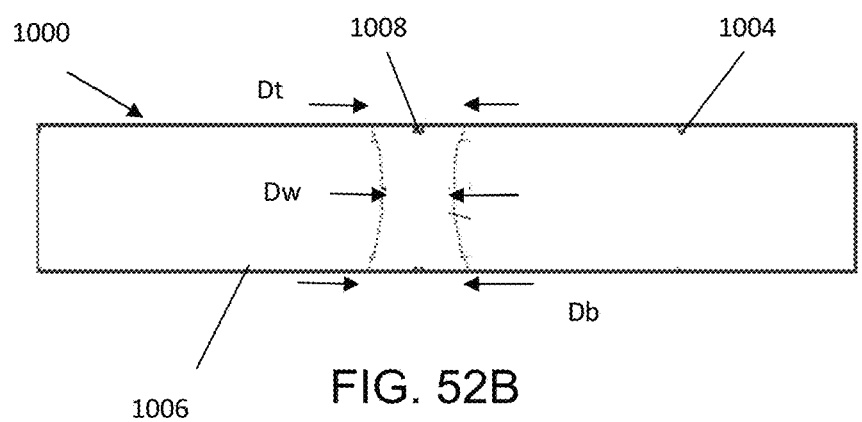

FIGS. 52A and 52B illustrate a substrate 1000 after laser drilling and after acid etching, respectively. As shown in FIG. 52A, a substrate 1000 can be subjected to any of the laser drilling processes described above to form one or more damage tracks or pilot holes 1002 extending from a first or top surface 1004 to a second or bottom surface 1006. Damage track 1002 is illustrated as being a continuous hole for illustration purposes only. As described above, in some embodiments, damage track 1002 is a non-continuous hole wherein particles of the substrate are present in the damage track. As shown in FIG. 52B, after substrate 1000 is subjected to any of the etching processes described below, the damage track is enlarged to a create a through-hole via 1008, having a top diameter Dt at a top opening in top surface 1004, a bottom diameter Db at a bottom opening in bottom surface 1006, and a waist diameter Dw. As used herein, the waist refers to the narrowest portion of a hole located between the top and bottom openings. While the profile of through-hole via 1008 is shown as being hourglass shaped due to the waist, this is only exemplary. In some embodiments, the through-hole vias are substantially cylindrical. In some embodiments, the etching process produces through-hole vias having a diameter greater than 1 micron, greater than about 2 microns, greater than about 3 microns, greater than about 4 microns, greater than about 5 microns, greater than about 10 microns, greater than about 15 microns, or greater than about 20 microns.

In one example, the acid used was 10% HF/15% $HNO_3$ by volume. The parts were etched for 53 minutes at a temperature of 24-25° C. to remove about 100 microns of material. The parts were immersed in this acid bath, and ultrasonic agitation at a combination of 40 kHz and 80 kHz frequencies was used to facilitate penetration of fluid and fluid exchange in the holes/damage tracks. In addition, manual agitation (e.g. mechanical agitation) of the part within the ultrasonic field was made to prevent standing wave patterns from the ultrasonic field from creating "hot spots" or cavitation related damage on the part, and also to provide macroscopic fluid flow across the part. The acid composition and etch rate was intentionally designed to slowly etch the part—a material removal rate of only 1.9 microns/minute. An etch rate of less than, for example, about 2 microns/minute allows acid to fully penetrate the narrow holes/damage tracks and agitation to exchange fresh fluid and remove dissolved material from the holes/damage tracks which are initially very narrow. This allows the holes to expand during the etch at nearly the same rate throughout the thickness of the substrate (i.e. throughout the length of the hole or damage track). In some embodiments, the etch rate can be a rate of less than about 10 microns/min, such as a rate of less than about 5 microns/min, or a rate of less than about 2 microns/min.

Figures 13A, 13B:
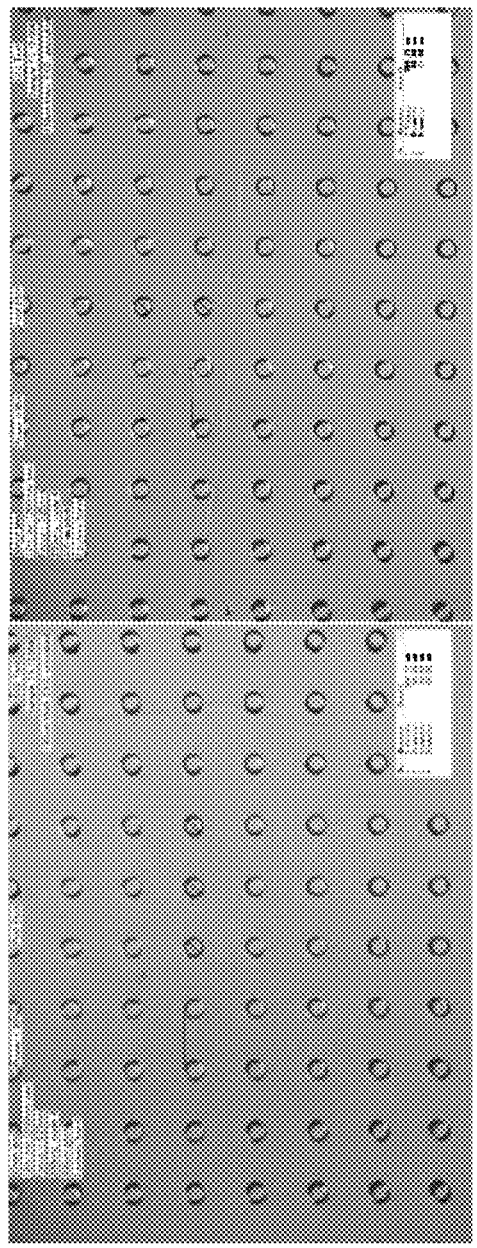
FIGS. 13A and 13B are scanning electron micrographs of entrance holes post etch (laser incident side) and exit holes—post acid etch (laser exit side), respectively.
Figure 15:
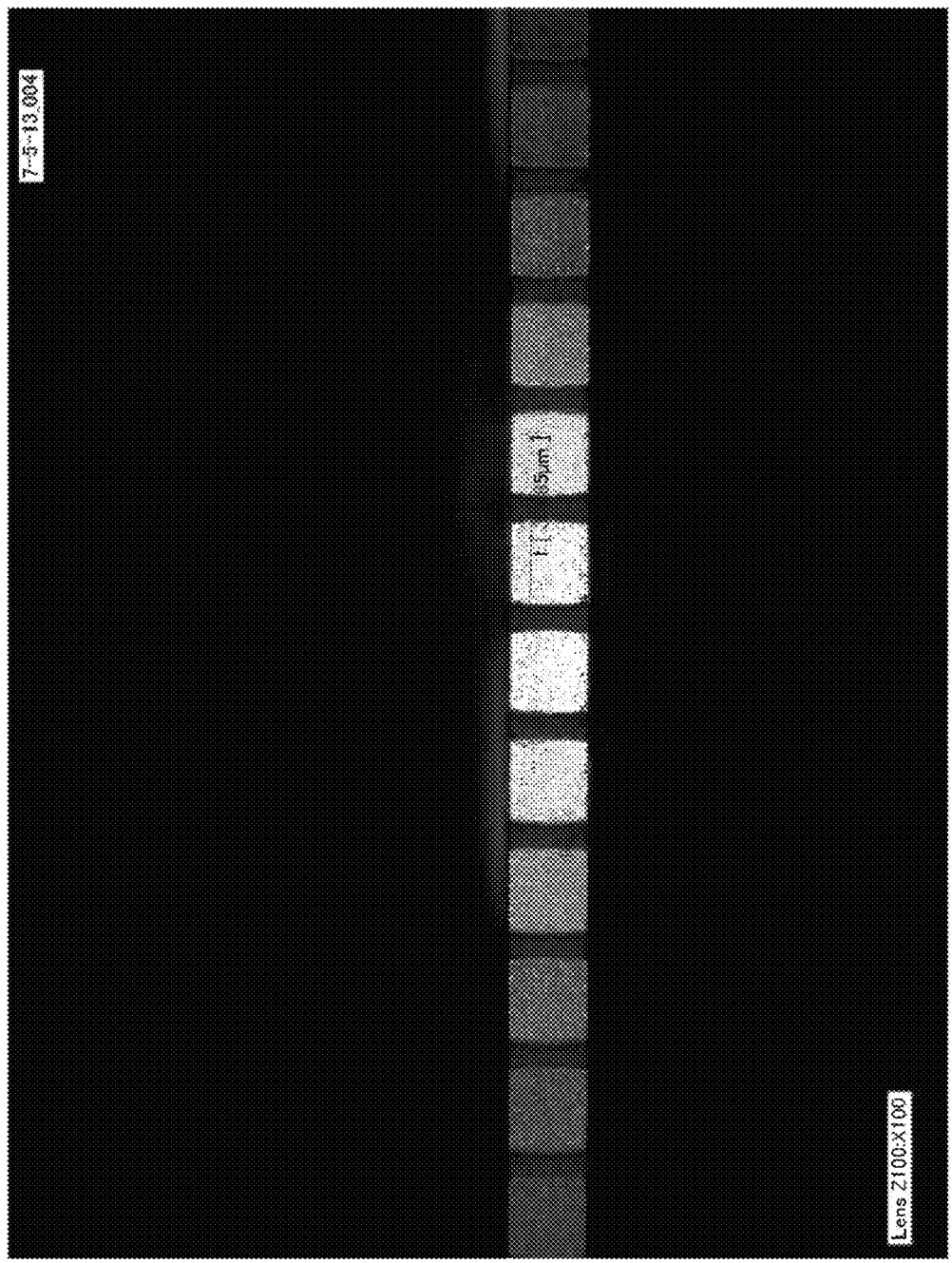
FIG. 15 is a photograph showing side views of holes—post acid etch. The sample has been diced to show a cross section. The bright areas are the glass; the dark areas are the holes.
Figure 16:
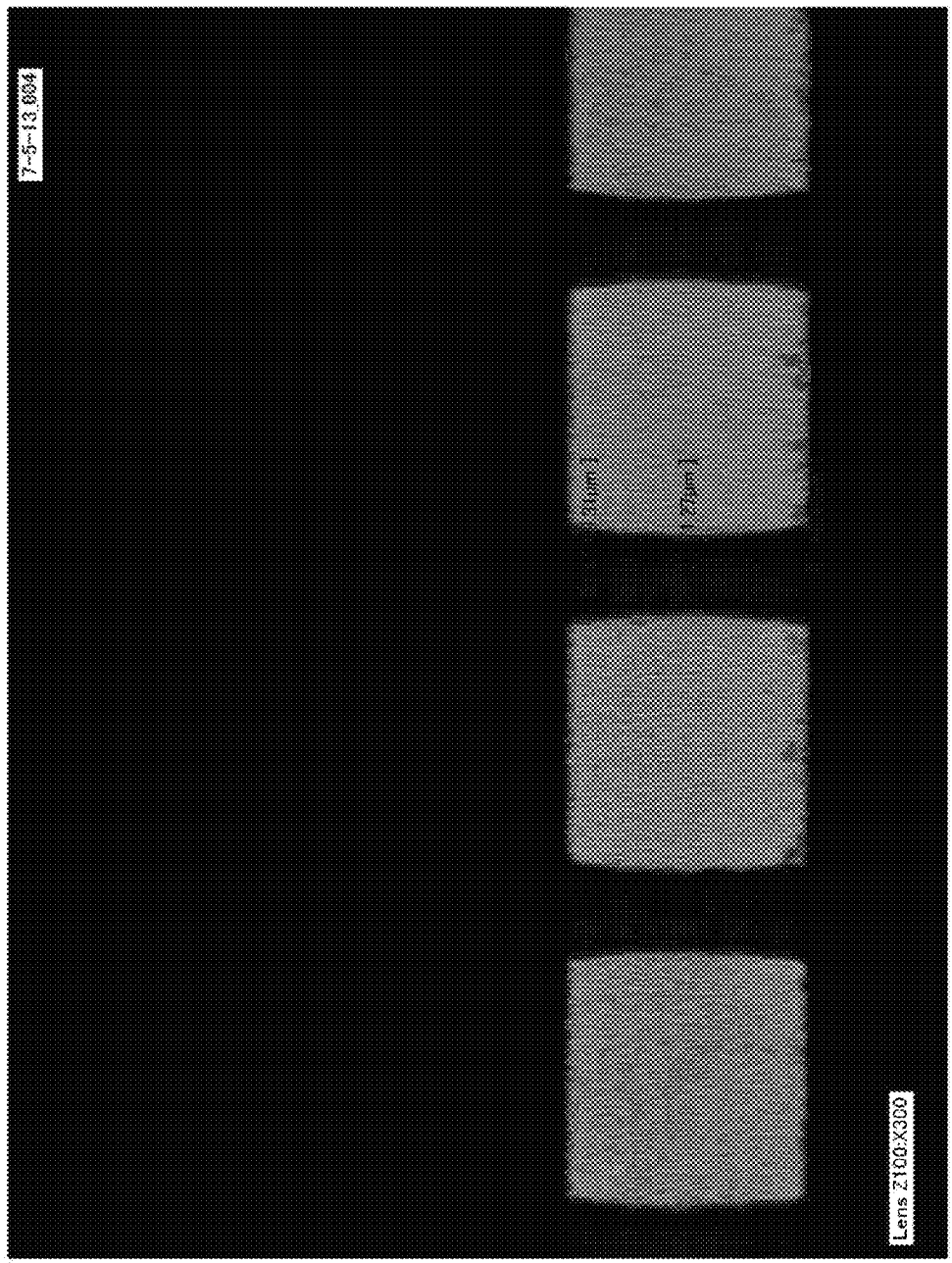
FIG. 16 is a photograph showing side views of holes—post acid etch, but with higher magnification than the photograph shown in FIG. 15.

FIGS. 13A and 13B show top and bottom views of a resulting part. The holes are about 95 microns in diameter, and are very circular, indicating that there was very little micro-cracking of the material. The holes are at 300 micron pitch, and each hole is approximately 90-95 microns in diameter. The images in FIGS. 13A and 13B were taken with a back light, and the bright regions within each hole also indicate that the holes have been fully opened by the acid etching. The same samples were then diced, to look more closely at the interior profiles of the holes. FIGS. 15 and 16 show the results. The holes have an "hourglass" shape, i.e., they taper down toward the middle of the hole. Typically this shape is determined by the etching environment, rather than the pilot hole formation process. The bright areas are the glass; the dark areas are the holes. The top (laser incidence) diameter of the holes is about 89 micron diameter, the waist is about 71 microns, and the bottom (laser exit) diameter is about 85 microns.

Figure 14:
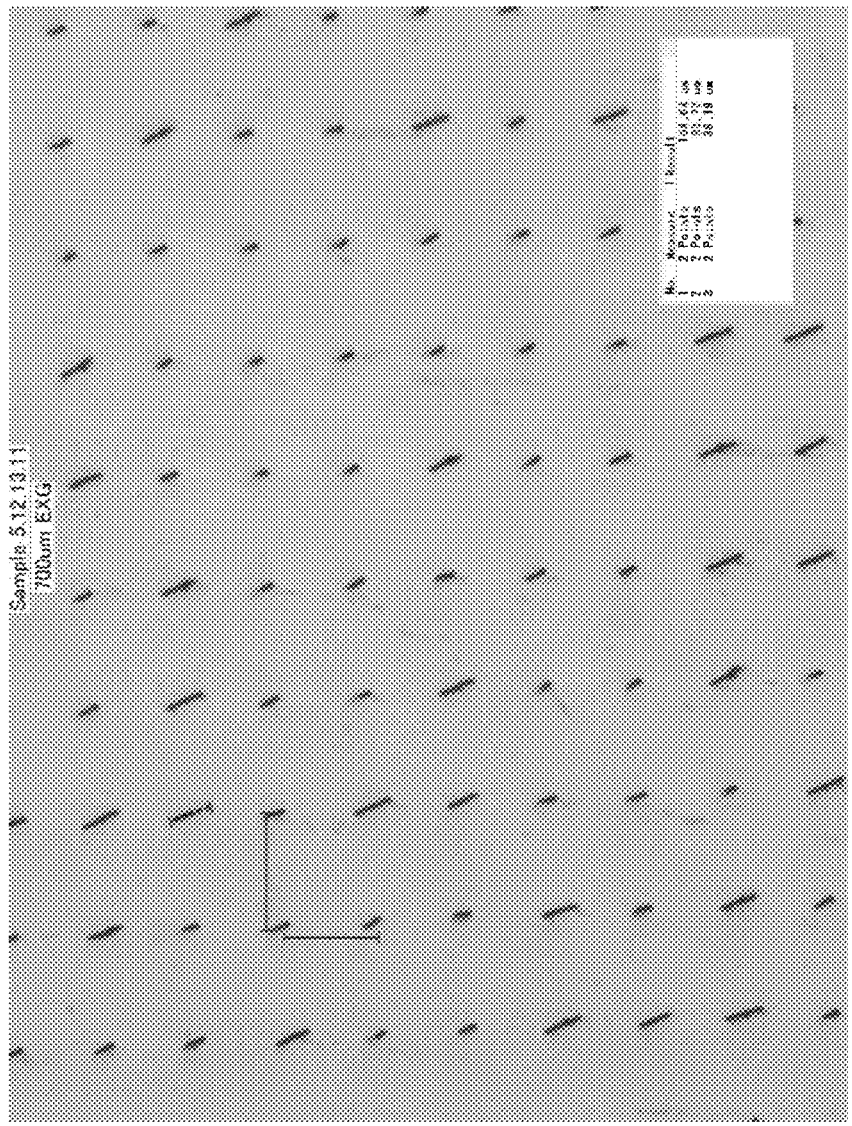
FIG. 14 is a post-etch image of the impact of microcracking. The microcracks have been acid etched out into elongated features.

In contrast, FIG. 14 shows results of etching a sample that had significant micro-cracking from the laser process—the holes etch out into elongated shapes instead of circular features. Micro-cracking can be reduced by lowering the laser burst energy, increasing the number of pulses per burst, or by increasing the length of the line focus, for example by using a longer focal length objective lens. These changes can lower the energy density contained within the substrate. In addition, care must be made to ensure optimal alignment of the optical system such that aberrations are not introduced to the line focus so that azimuthal asymmetries are created in the line focus. Such asymmetries can introduce high energy density locations within the substrate that can lead to micro-cracks.

To verify that this laser and etch process gave consistent results, hole patterns were made of 100×100 arrays (10,000 total holes) at 300 micron pitch, and the etched samples were then measured using a machine vision system to obtain the top and bottom diameters of each hole, as well as the diameter of the waist. The results are shown as histograms in FIGS. 17A-17C. The top and bottom diameters are both about 95 microns, very close in size, and the standard deviation of about 2.5 microns. In contrast to the top and bottom diameters, the waists are about 70 microns, with a standard deviation of about 3 microns. Thus, the waists are about 30% narrower than the top and bottom diameters. FIGS. 18A-18C show histograms of circularity measurements on the same holes, for top, bottom, and waists. Circularity is defined as the maximum diameter of the hole minus the minimum diameter of the same hole, and is given in units of microns. The distributions indicate that the holes are generally circular to less than about 5 microns. There are no significant tails to the distributions that would indicate micro-cracks or chips that have etched out to create non-round shapes.

After forming the acid-etched substrates depicted in FIGS. 13A-16 and having characteristics displayed in FIGS. 17A-18C, it was found that the acid etching conditions can be modified to adjust various attributes of the through-holes to make them useful as via through-holes for an interposer. In some embodiments, for example, the through-holes can have a top opening, a bottom opening, and a waist, and the ratio of the diameter of the waist to the diameter of the top or bottom opening can be controlled. As used herein, the waist refers to the narrowest portion of a hole located between the top and bottom openings. Two factors that control the diameter of the waist, top opening, and bottom opening is the etching reaction rate and the diffusion rate. In order to etch away material throughout the thickness of the substrate to enlarge the damage tracks into via through-holes, the acid needs to travel the entire length of the damage track. If the etching rate is too fast so that the acid does not have time to adequately diffuse and reach all portions of the damage track, then the acid will disproportionately etch more material away at the surface of the material than in the middle of the material. Manipulation of the Thiele modulus ($\varphi$) of an etching process, as described in Thiele, E. W. *Relation between catalytic activity and size of particle*, Industrial and Engineering Chemistry, 31 (1939), pp. 916-920, can be utilized to control the ratio of the waist diameter to the diameter of the top or bottom opening. The Thiele modulus is a ratio of the diffusion time to the etching reaction time and is represented by the following equation:

$$\varphi = \sqrt{\frac{2k_r C^\gamma}{r D_{\mathit{eff}}}} * L$$

wherein:
$k_r$ is the reaction rate constant for etching;
$C$ is the bulk acid concentration;
$\gamma$ is a factor based on the kinetic reaction order;
$r$ is the radius of the hole during the reaction;
$D_{\mathit{eff}}$ is the effective diffusivity of the acid through water down in the damage track or hole, which is an augmented natural diffusivity D enhanced by agitation and sonication; and L is ½ the thickness of the material.

According to the equation above, when the etching reaction time is greater than the diffusion time, the Thiele modulus will be greater than 1. This means that the acid will be depleted before it travels the entire length of the damage track or hole and can be replenished by diffusion in the center of the damage track or hole. As a result, etching will proceed faster at the top and bottom of the tracks or holes at a rate governed by $k_r$ and etching at the center will occur more slowly at a rate governed by diffusion leading to an hourglass-like shape for the via hole. However, if the diffusion time is equal to or greater than the etching reaction time, then the Thiele modulus will be less than or equal to 1. Under such conditions, the acid concentration will be uniform along the entire damage track or hole and the damage track or hole will be etched uniformly, yielding a substantially cylindrical via hole.

Figure 53:
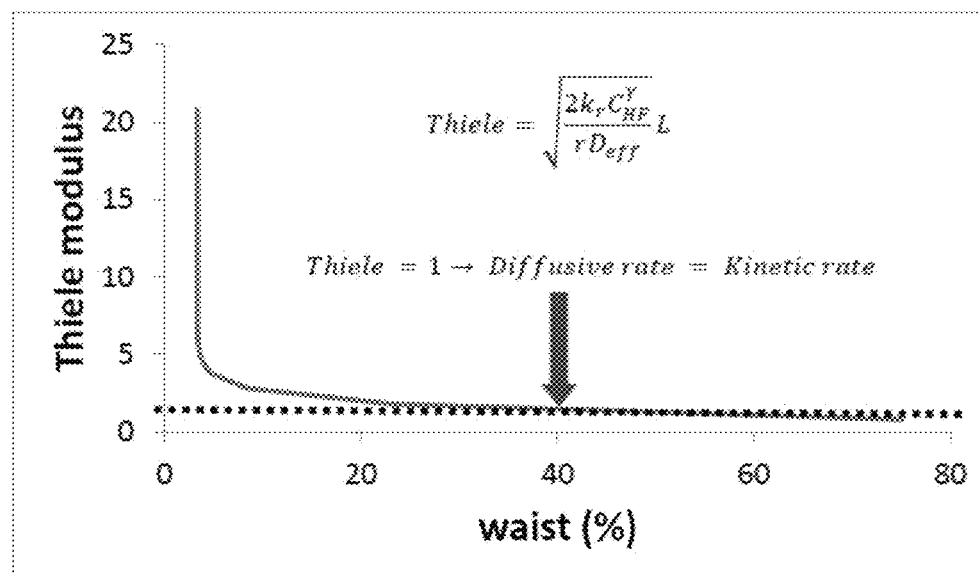
FIG. 53 illustrates the relationship between the Thiele modulus of the etching system and an expected percentage of the waist diameter with respect to the diameter of the top and bottom openings.

In some embodiments the diffusion time and etching reaction time can be controlled to control the Thiele modulus of the etching system, and thereby the ratio of the waist diameter to the diameters of the top and bottom openings. FIG. 53 illustrates the relationship between the Thiele modulus of the etching system and an expected percentage of the waist diameter with respect to the diameter of the top and bottom openings. In some embodiments, the Thiele modulus for the etching process can be less than or equal to about 5, less than or equal to about 4.5, less than or equal to about 4, less than or equal to about 3.5, less than or equal to about 3, less than or equal to about 2.5, less than or equal to about 2, less than or equal to about 1.5, or less than or equal to about 1. In some embodiments, the diameter of the waist of the via hole is 50% to 100%, 50% to 95%, 50% to 90%, 50% to 85%, 50% to 80%, 50% to 75%, 50% to 70%, 55% to 100%, 55% to 95%, 55% to 90%, 55% to 85%, 55% to 80%, 55% to 75%, 55% to 70%, 60% to 100%, 60% to 95%, 60% to 60%, 60% to 85%, 60% to 80%, 60% to 75%, 60% to 70%, 65% to 100%, 65% to 95%, 65% to 90%, 65% to 85%, 65% to 80%, 65% to 75%, 65% to 70%, 70% to 100%, 70% to 95%, 70% to 90%, 70% to 85%, 70% to 80%, 70% to 75%, 75% to 100%, 75% to 95%, 75% to 90%, 75% to 85%, 75% to 80%, 80% to 100%, 80% to 95%, 80% to 90%, 80% to 85%, 85% to 100%, 85% to 95%, 85% to 90%, 90% to 100%, 90% to 95%, or 95% to 100% of the diameter of the top and/or bottom opening of the via hole. In some embodiments, the diameter of the waist of the via hole is about 50% or greater, about 55% or greater, about 60% or greater, about 65% or greater, about 70% or greater, about 75% or greater, about 80% or greater, about 85% or greater, about 90% or greater, about 95% or greater, or about 100% of the diameter of the top and/or bottom opening of the via hole. In some embodiments, the diameter of the waist of the via hole is 50% to 100%, 50% to 95%, 50% to 90%, 50% to 85%, 50% to 80%, 50% to 75%, 50% to 70%, 55% to 100%, 55% to 95%, 55% to 90%, 55% to 85%, 55% to 80%, 55% to 75%, 55% to 70%, 60% to 100%, 60% to 95%, 60% to 60%, 60% to 85%, 60% to 80%, 60% to 75%, 60% to 70%, 65% to 100%, 65% to 95%, 65% to 90%, 65% to 85%, 65% to 80%, 65% to 75%, 65% to 70%, 70% to 100%, 70% to 95%, 70% to 90%, 70% to 85%, 70% to 80%, 70% to 75%, 75% to 100%, 75% to 95%, 75% to 90%, 75% to 85%, 75% to 80%, 80% to 100%, 80% to 95%, 80% to 90%, 80% to 85%, 85% to 100%, 85% to 95%, 85% to 90%, 90% to 100%, 90% to 95%, or 95% to 100% of the average diameter of the top and bottom opening of the via hole. In some embodiments, the diameter of the waist of the via hole is about 50% or greater, about 55% or greater, about 60% or greater, about 65% or greater, about 70% or greater, about 75% or greater, about 80% or greater, about 85% or greater, about 90% or greater, about 95% or greater, or about 100% of average of the diameter of the top and bottom opening of the via hole.

Figure 54:
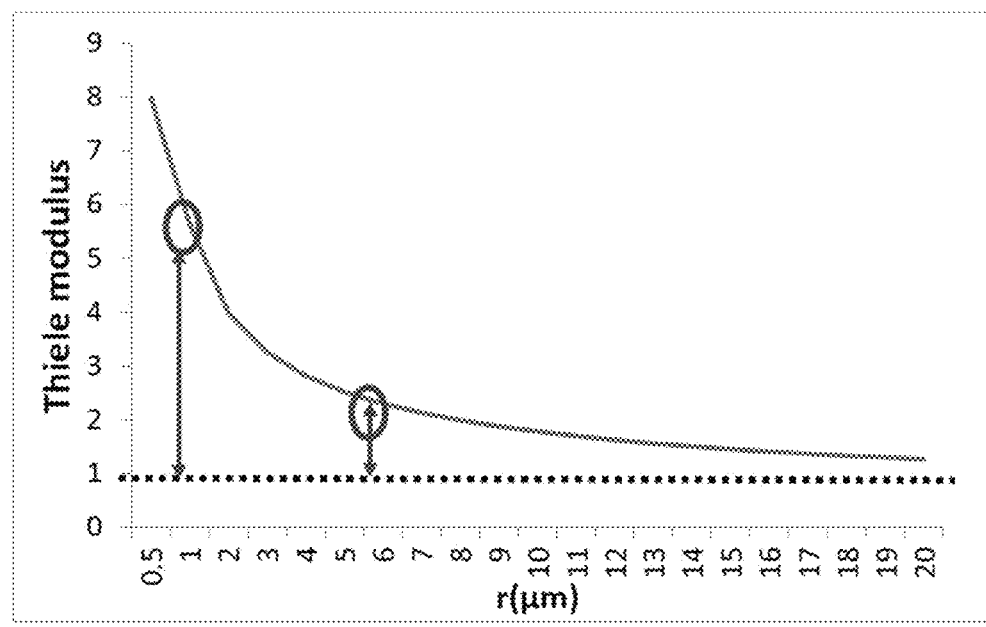
FIG. 54 plots the Thiele modulus of the etching system as a function of the radius of the damage track.
Figure 55:
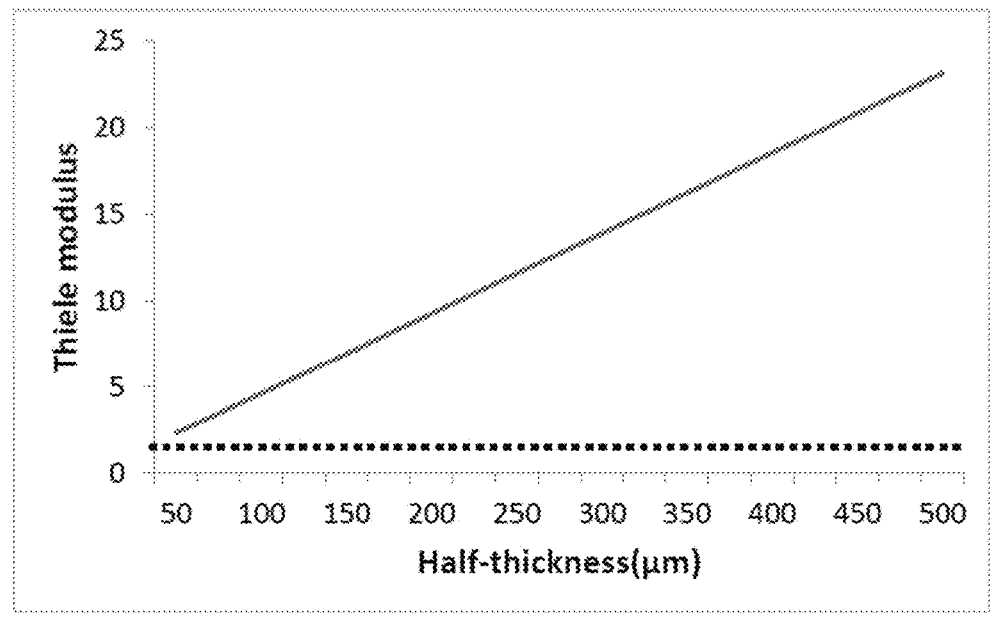
FIG. 55 plots the Thiele modulus of the etching system as a function of the half-thickness of a glass substrate.
Figure 56:
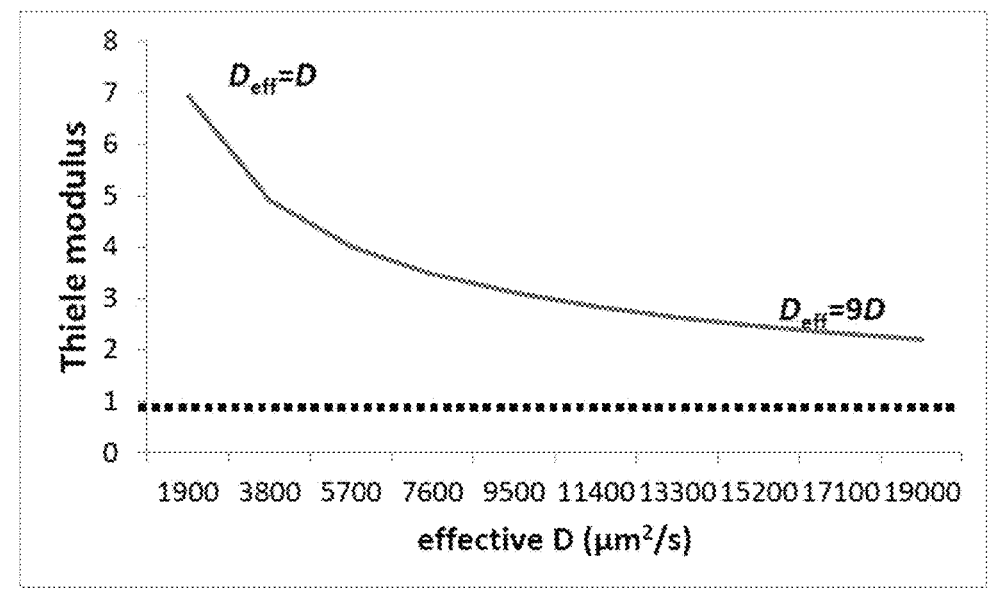
FIG. 56 plots the Thiele modulus of the etching system as a function of the effective diffusivity ($D_{eff}$).
Figure 57:
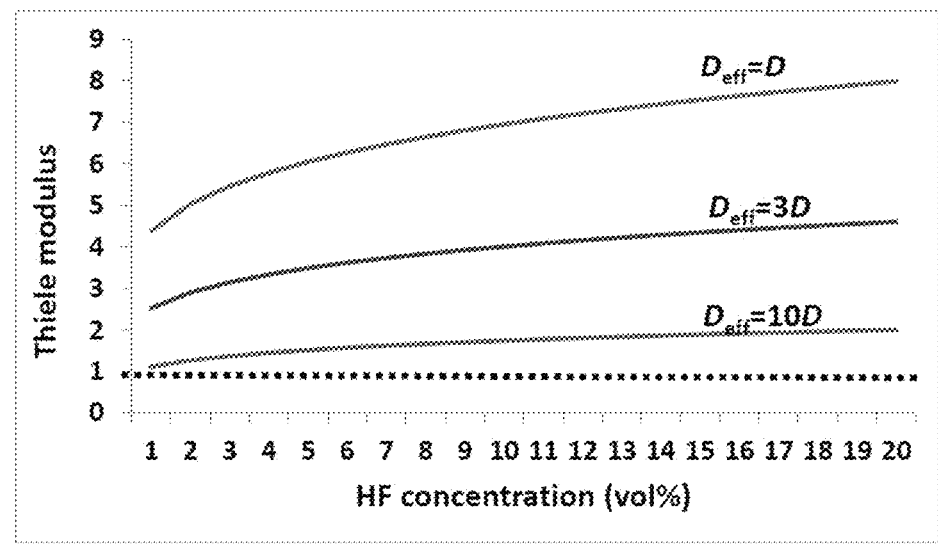
FIG. 57 plots the Thiele modulus of the etching system as a function of the acid concentration in volume % as well as the combined effect of modifying the effective diffusivity and acid concentration on the Thiele modulus.

As can be determined from Thiele modulus equation above the initial radius of the damage track and the thickness of the glass contribute to the Thiele modulus. FIG. 54 illustrates how the Thiele modulus decreases with the initial radius of the damage track. FIG. 55 illustrates how the Thiele modulus increases with the half-thickness of the substrate. The thickness of the substrate and radius of the damage tracks are factors that in some instances cannot be changed if a certain thickness or radius of the damage track is needed. Thus other factors affecting the Thiele modulus can be adjusted in such instances. For example, FIG. 56 illustrates how the Thiele modulus decreases as the effective diffusivity ($D_{eff}$) increases. In some embodiments, the effective diffusivity can be increased by adding agitation and/or sonication to the etching conditions as described in more detail below. FIG. 57 illustrates how the Thiele modulus decreases as the acid concentration decreases, in this example the HF concentration. FIG. 57 also illustrates how a combination of increasing the effective diffusivity and decreasing the acid concentration decreases the Thiele modulus.

In some embodiments, the etching reaction time can be controlled by adjusting the acid concentration in the etching solution. In some embodiments, the etching solution can be an aqueous solution including deionized water, a primary acid, and a secondary acid. The primary acid can be hydrofluoric acid and the secondary acid can be nitric acid, hydrochloric acid, or sulfuric acid. In some embodiments, the etching solution can only include a primary acid. In some embodiments, the etching solution can include a primary acid other than hydrofluoric acid and/or a second acid other than nitric acid, hydrochloric acid, or sulfuric acid. Exemplary etching solutions can include 10% by volume hydrofluoric acid/15% by volume nitric acid or 5% by volume hydrofluoric acid/7.5% by volume nitric acid, or 2.5% by volume hydrofluoric acid/3.75% by volume nitric acid.

In some embodiments, orientation of the substrate in the etching tank, mechanical agitation, and/or the addition of surfactant to the etching solution are other etching conditions that can be modified to adjust the attributes of the via holes. In some embodiments, the etching solution is ultrasonically agitated and the substrate is oriented in the etching tank holding the etching solution so that the top and bottom openings of the damage tracks receive substantially uniform exposure to the ultrasonic waves in order for the damage tracks to be etched uniformly. For example, if the ultrasonic transducers are arranged at the bottom of the etching tank, the substrate can be oriented in the etching tank so that the surfaces of the substrate with the damage tracks are perpendicular to the bottom of the etching tank rather than parallel to the bottom of the etching tank.

In some embodiments, the etching tank can be mechanically agitated in the x, y, and z directions to improve uniform etching of the damage tracks. In some embodiments, the mechanical agitation in the x, y, and z directions can be continuous.

In some embodiments, a surfactant can be added to the etching solution to increase the wettability of the damage tracks. The increased wettability lowers the diffusion time and can allow for increasing the ratio of the diameter of the via hole waist to the diameter of the via hole top and bottom openings. In some embodiments, the surfactant can be any suitable surfactant that dissolves into the etching solution and that does not react with the acid(s) in the etching solution. In some embodiments, the surfactant can be a fluorosurfactant such as Capstone® FS-50 or Capstone® FS-54. In some embodiments, the concentration of the surfactant in terms of ml of surfactant/L of etching solution can be about 1, about 1.1, about 1.2, about 1.3, about 1.4, about 1.5, about 1.6, about 1.7, about 1.8, about 1.9, about 2 or greater.

Speed:

The major advantage of making perforations or "pilot holes" or "damage tracks" with a laser using the methods described above is that process time is extremely fast. Each of the damage tracks shown in FIG. 8 is made with a single burst of picosecond laser pulses. This is fundamentally different from percussion drilling, where many laser pulses are required to progressively remove layers of material.

For the samples shown here, the stage speed was 12 m/min=200 mm/sec. For the 300 micron spacing, this means that a laser burst was fired every 1.5 msec to form a hole, which is a formation rate of 667 holes/sec. Accounting for stage accelerations and decelerations to make every row of this approximately 30 mm×30 mm hole pattern, the hole formation rate was well in excess of 300 holes/sec. If the pattern was made larger in physical extent, so the stage would need to accelerate less often, the average hole formation rate would be faster.

As the laser used here can easily provide 100,000 pulses/sec at full pulse energy, it is possible to form holes at this rate. In general, the limitation for hole formation rate is how fast the laser beam can be moved relative to the substrate. If the holes are spaced 10 microns apart, and the stage speed is 1 m/sec, then 100,000 holes/sec are formed. In fact, this is how cutting of substrates is often done. But for practical interposers the holes are often spaced by hundreds of microns, and at more random intervals (i.e., there is an aperiodic pattern). Hence the numbers stated above for the pattern shown are only about 300 holes/sec. To achieve higher rates, the stage speed can be increased, for example, from 200 mm/sec to 1 m/sec, realizing another 5× increase in speed. Similarly, if the average hole pitch was less than 300 microns, the hole formation rate would increase commensurately.

Besides translating the substrate underneath the laser beam, it is possible to use other methods for rapidly moving the laser from hole to hole: moving the optical head itself, using galvanometers and f-theta lenses, acousto-optic deflectors, spatial light modulators, etc.

As described above, depending upon the desired pattern of damage tracks (and the through-holes created therefrom by the etching process) the damage tracks can be created at a speed greater than about 50 damage tracks/second, greater than about 100 damage tracks/second, greater than about 500 damage tracks/second, greater than about 1,000 damage tracks/second, greater than about 2,000 damage tracks/second, greater than about 3,000 damage tracks/second, greater than about 4,000 damage tracks/second, greater than about 5,000 damage tracks/second, greater than about 6,000 damage tracks/second, greater than about 7,000 damage tracks/second, greater than about 8,000 damage tracks/second, greater than about 9,000 damage tracks/second, greater than about 10,000 damage tracks/second, greater than about 25,000 damage tracks/second, greater than about 50,000 damage tracks/second, greater than about 75,000 damage tracks/second, or greater than about 100,000 damage tracks/second.

Final Parts:

In some embodiments, subjecting a substrate to the above processes of damage track formation and acid etching can result in a substrate with a plurality of through-hole vias. In some embodiments, the vias can have a diameter of about 30 microns or less, about 25 microns or less, about 20 microns or less, about 15 microns or less, about 10 microns or less, in a range from about 5 to about 10 microns, about 5 to about 15 microns, about 5 to about 20 microns, about 5 to about 25 microns, about 5 to about 30 microns, or up to many tens of microns depending upon requirements for the intended use. In other embodiments, the vias can have a diameter of greater than about 20 µm. In some embodiments, the substrate can have vias with varying diameter, for example the vias can have a difference of at least 5 µm in diameter. In some embodiments, a difference in the diameter of the top opening and the bottom opening of the vias can be 3 µm or less, 2.5 µm or less, 2 µm or less, 1.5 µm or less or 1 µm or less, which can be enabled by the use of a line focus beam to create damage tracks in the material. These damage tracks maintain a very small diameter over the entire depth of the substrate, which is what ultimately yields uniform top and bottom diameters after etching. In some embodiments, the spacing (center to center distance) between adjacent the vias can be about 10 µm or greater, about 20 µm or greater, about 30 µm or greater, about 40 µm or greater, about 50 µm or greater. In some embodiments, the spacing of adjacent vias can be up to about 20 mm. In some embodiments, the density of the vias can about 0.01 vias/mm² or greater, about 0.1 vias/mm² or greater, about 1 via/mm² or greater, about 5 vias/mm² or greater, about 10 vias/mm² or greater, about 20 vias/mm² or greater, about 30 vias/mm² or greater, about 40 vias/mm² or greater, about 50 vias/mm² or greater, about 75 vias/mm² or greater, about 100 vias/mm² or greater, about 150 vias/mm² or greater, about 200 vias/mm² or greater, about 250 vias/mm² or greater, about 300 vias/mm² or greater, about 350 vias/mm² or greater, about 400 vias/mm² or greater, about 450 vias/mm² or greater, about 500 vias/mm² or greater, about 550 vias/mm² or greater, about 600 vias/mm² or greater, or about 650 vias/mm² or greater. In some embodiments, the density of the vias can range from about 0.01 via/mm² to about 650 via/mm², or about 5 via/mm² to about 50 via/mm².

As discussed above, in some embodiments, the diameter of the waist of the via hole is 50% to 100%, 50% to 95%, 50% to 90%, 50% to 85%, 50% to 80%, 50% to 75%, 50% to 70%, 55% to 100%, 55% to 95%, 55% to 90%, 55% to 85%, 55% to 80%, 55% to 75%, 55% to 70%, 60% to 100%, 60% to 95%, 60% to 60%, 60% to 85%, 60% to 80%, 60% to 75%, 60% to 70%, 65% to 100%, 65% to 95%, 65% to 90%, 65% to 85%, 65% to 80%, 65% to 75%, 65% to 70%, 70% to 100%, 70% to 95%, 70% to 90%, 70% to 85%, 70% to 80%, 70% to 75%, 75% to 100%, 75% to 95%, 75% to 90%, 75% to 85%, 75% to 80%, 80% to 100%, 80% to 95%, 80% to 90%, 80% to 85%, 85% to 100%, 85% to 95%, 85% to 90%, 90% to 100%, 90% to 95%, or 95% to 100% of the diameter of the top and/or bottom opening of the via hole. In some embodiments, the diameter of the waist of the via hole is about 50% or greater, about 55% or greater, about 60% or greater, about 65% or greater, about 70% or greater, about 75% or greater, about 80% or greater, about 85% or greater, about 90% or greater, about 95% or greater, or about 100% of the diameter of the top and/or bottom opening of the via hole. In some embodiments, the diameter of the waist of the via hole is 50% to 100%, 50% to 95%, 50% to 90%, 50% to 85%, 50% to 80%, 50% to 75%, 50% to 70%, 55% to 100%, 55% to 95%, 55% to 90%, 55% to 85%, 55% to 80%, 55% to 75%, 55% to 70%, 60% to 100%, 60% to 95%, 60% to 60%, 60% to 85%, 60% to 80%, 60% to 75%, 60% to 70%, 65% to 100%, 65% to 95%, 65% to 90%, 65% to 85%, 65% to 80%, 65% to 75%, 65% to 70%, 70% to 100%, 70% to 95%, 70% to 90%, 70% to 85%, 70% to 80%, 70% to 75%, 75% to 100%, 75% to 95%, 75% to 90%, 75% to 85%, 75% to 80%, 80% to 100%, 80% to 95%, 80% to 90%, 80% to 85%, 85% to 100%, 85% to 95%, 85% to 90%, 90% to 100%, 90% to 95%, or 95% to 100% of the average diameter of the top and bottom opening of the via hole. In some embodiments, the diameter of the waist of the via hole is about 50% or greater, about 55% or greater, about 60% or greater, about 65% or greater, about 70% or greater, about 75% or greater, about 80% or greater, about 85% or greater, about 90% or greater, about 95% or greater, or about 100% of the average diameter of the top and bottom opening of the via hole.

In some embodiments, an aspect ratio (substrate thickness:via diameter) of the via holes can be about 1:1 or greater, about 2:1 or greater, about 3:1 or greater, about 4:1 or greater, about 5:1 or greater, about 6:1 or greater, about 7:1 or greater, about 8:1 or greater, about 9:1 or greater, about 10:1 or greater, about 11:1 or greater, about 12:1 or greater, about 13:1 or greater, about 14:1 or greater, about 15:1 or greater, about 16:1 or greater, about 17:1 or greater, about 18:1 or greater, about 19:1 or greater, about 20:1 or greater, about 25:1 or greater, about 30:1 or greater, or about 35:1 or greater. In some embodiments, the aspect ratio of the via holes can be in a range from about 5:1 to about 10:1, about 5:1 to 20:1, about 5:1 to 30:1, or about 10:1 to 20:1 about 10:1 to 30:1.

In some embodiments, the substrate has a thickness in a range from about 20 μm to about 3 mm, from about 20 μm to about 1 mm, or from about 50 μm to 300 μm, or from 100 μm to 750 μm, or from about 1 mm to about 3 mm. In some embodiments, the substrate can be made of a transparent material, including, but not limited to, glass, fused silica, synthetic quartz, a glass ceramic, ceramic, and a crystalline material such as sapphire. In some embodiments the substrate can be glass and the glass can include alkali containing glass, alkali-free glass (for example an alkali-free alkaline aluminoborosilicate glass), or laminated glass pieces with layers containing different glass compositions. In some embodiments, the glass can be chemically strengthened (e.g. ion exchanged) glass. In some embodiments, the substrate can be transparent to at least one wavelength in a range from about 390 nm to about 700 nm. In some embodiments, the substrate can transmit at least 70%, at least 75%, at least 80%, at least 85%, or at least 90% of at least one wavelength in a range from about 390 nm to about 700 nm.

The through-hole vias can then be coated and/or filled with a conductive material and used for electrical interposer applications. In some embodiments, the coating and/or filling can be done by metallization. Metallization can be done, for example, by vacuum deposition, electroless plating, filling with conductive paste, or a variety of other methods. After that, electrical traces may be patterned on the surfaces of the parts, and a series of re-distribution layers and contact pads may be built up that allow routing of electrical signals from the holes to connections on microchips or other electrical circuitry.

For biochemical applications such as digital polymerase chain reaction (dPCR) testing, the parts can also be functionalized with coatings that allow control of the hydrophilic or hydrophobic nature of the surface. Other coatings can also be applied, that allow attachment of antibodies, proteins, or other biomolecules. For dPCR microarrays, substrates with very dense and regular arrays of holes are particularly useful—for example hexagonally close-packed patterns of holes at pitches of less than about 100 micron. For such a pattern, the speed possible with the aforementioned laser process is particularly high, as the laser can be fired extremely often and effectively use the full repetition rate of the laser. Thus hole formation rates in excess of 10,000 holes/sec may be achieved (1 m/sec stage speed with 100 micron spacing of holes). It should be noted that the hole forming may only utilize a small fraction of the laser pulses. The laser burst repetition rate can easily be hundreds of kHz, while it can be difficult to direct the beam to new hole locations at rates great enough to use all of these bursts. For example, the actual hole forming rate may be 100 holes/sec, 500 holes/sec, 999 holes/sec, 3,000 holes/sec, 5,000 holes/sec, 10,000 holes/sec, while the laser repetition rate at the same time may be 100,000 bursts/sec, 200,000 bursts/sec. In these cases most of the burst pulse is redirected by a device such as an electro-optic modulator to enter a beam dump, rather than being directed out of the laser and to the substrate. Thus a smaller number of bursts/sec are utilized for hole drilling than what is actually available from the full repetition rate of the laser. Many short pulse lasers have electro-optic or acoustic-optic modulators at their outputs, enabling them to be operated in such a fashion.

EXAMPLES

Example 1

Figure 19A:
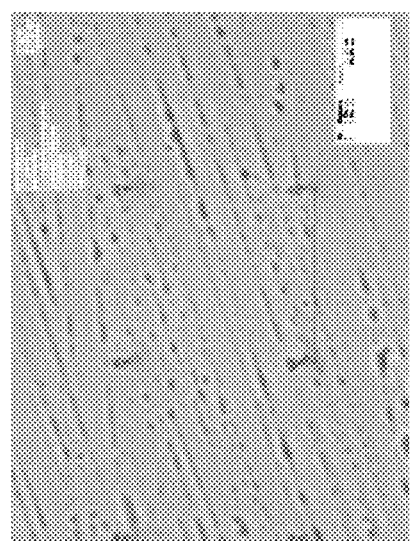
FIGS. 19A-19C are photographs of radial cracks before etching (FIG. 19A), and greater magnification of the entrance hole array (FIGS. 19B and 19C).
Figure 19B:
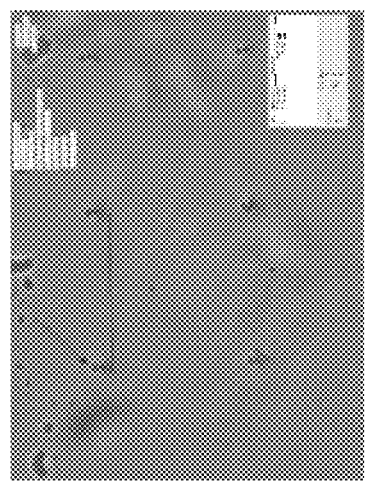
Figure 19C:
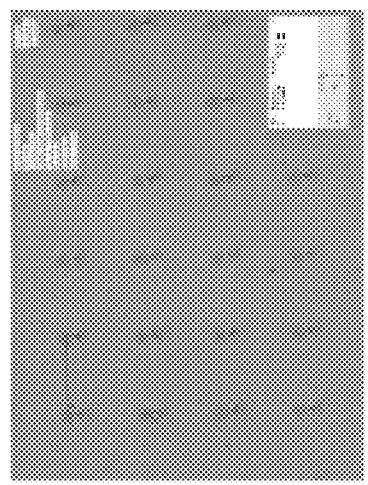
Figure 21C:
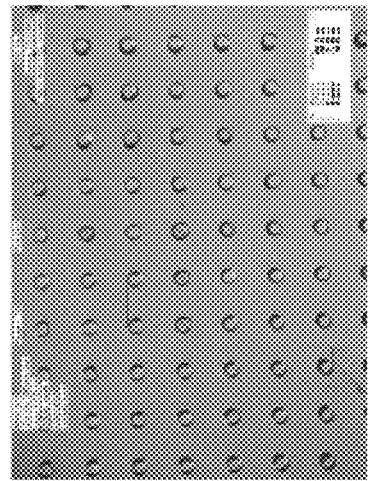
FIGS. 21A-21E are photographs of top views of holes post acid etching at 55% laser power (FIG. 21A), 65% laser power (FIG. 21B), 75% laser power (FIG. 21C), 85% laser power (FIG. 21D), and 100% laser power (FIG. 21E).
Figure 21B:
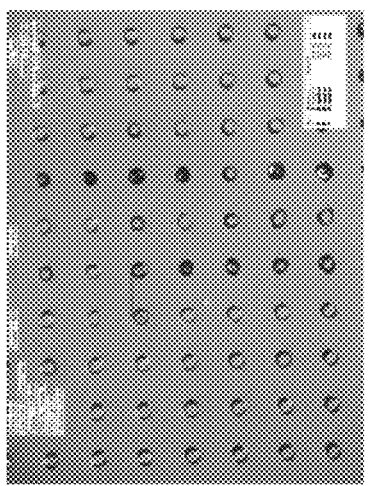
Figure 21E:
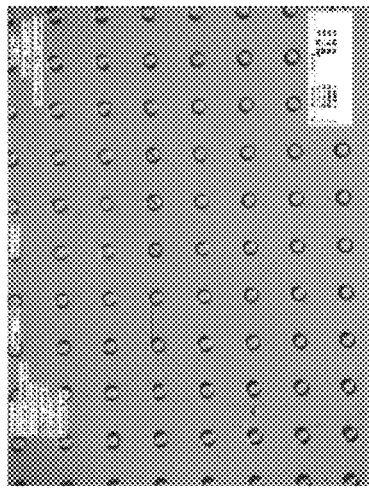
Figure 21A:
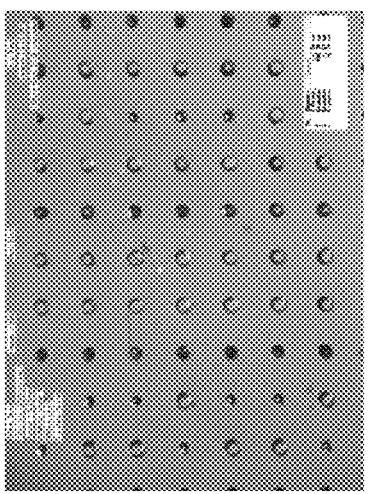
Figure 21D:
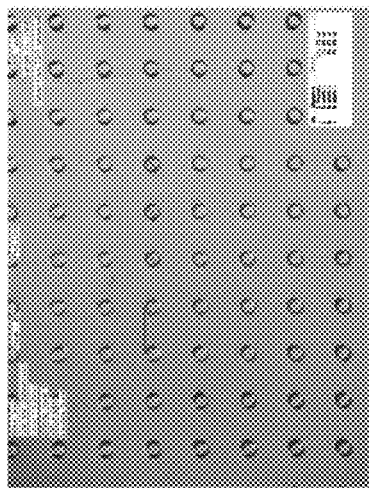

Test samples of Corning Eagle XG® glass (300 microns thickness) were prepared for making through holes in the samples, shown in FIGS. 19B and 19C. Small radial cracks inside the glass, about 10 microns in extent, were observed, as shown in FIG. 19A, in all samples despite varying the burst energy and number of pulses per burst of the picosecond laser, and varying the pitch from 50 microns to 300 microns.

Additional samples of Corning Eagle XG® glass (150 micron thickness) were prepared for making through holes followed by etching to enlarge the diameter of the hole. The parts were: 100×100 hole arrays at 300 micron pitch, varying the laser power or burst energy (5 samples), one sample having a 150×150 hole array at 200 microns pitch, and one sample having a 300×300 hole array at 100 micron pitch. As shown in the pre-etch photographs in FIGS. 20A-20C, the top view (FIG. 20A), bottom view (FIG. 20B), and side view (FIG. 20C), through holes were successfully made with no substantial chips or cracks at the glass surface, but with some internal radial cracks and subsurface damage (not shown). As shown in FIGS. 21A-21E, top views of the 100×100 hole arrays at 300 microns pitch post-etch (etched out to about 100 microns diameter) with increasing laser power (FIG. 21A=55%, FIG. 21B=65%, FIG. 21C=75%, FIG. 21D=85%, FIG. 21E=100% laser power) show that the best results were obtained at the higher power levels (roundest holes, no clogging (a dark center indicates a clogged hole)), with an optimum at about 75-85% power, with the same results found for bottom views of the same samples, shown in FIGS. 22A-22E (FIG. 22A=55%, FIG. 22B=65%, FIG. 22C=75%, FIG. 22D=85%, FIG. 22E=100% laser power).

Figure 23C:
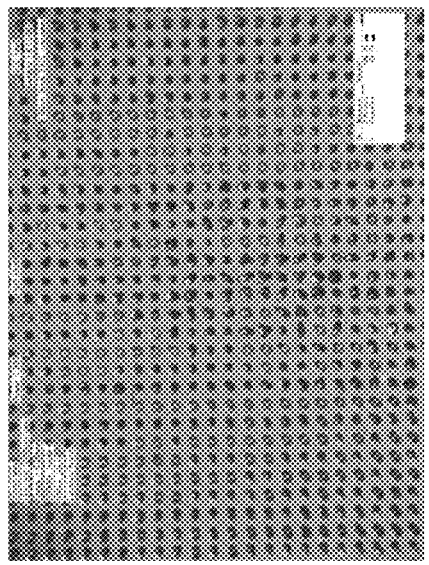
FIGS. 23A-23C are photographs of top views of holes post acid etch
Figure 23B:
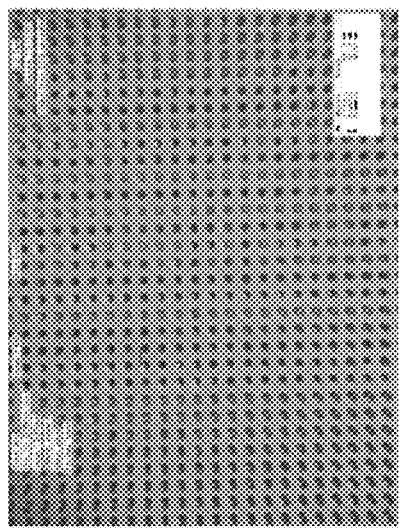
Figure 23A:
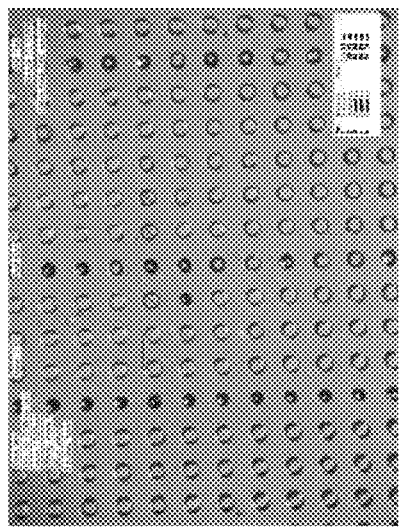

As shown in FIGS. 23A-23C, larger array test results at 65% laser power (FIG. 23A=150×150 array, 200 microns pitch, 100 microns holes) (FIGS. 23B-23C=300×300 array, 100 micron pitch, 50 micron holes) produced round holes for both 100 micron and 50 micron holes, but also some clogging, with some periodicity in the clogging (possibly due to ultrasound standing waves creating small regions of higher and lower mixing during etching), and also some regions with cracked and chipped holes, as shown in FIG. 23C.

Figure 24A:
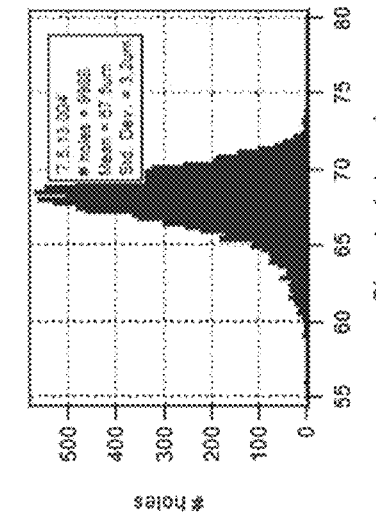
FIGS. 24A-24C are graphs of number of holes a function of diameter for a sample having 100×100 array of holes, showing results for a sample for the top (FIG. 24A), bottom (FIG. 24B), and waists (FIG. 24C).
Figure 24B:
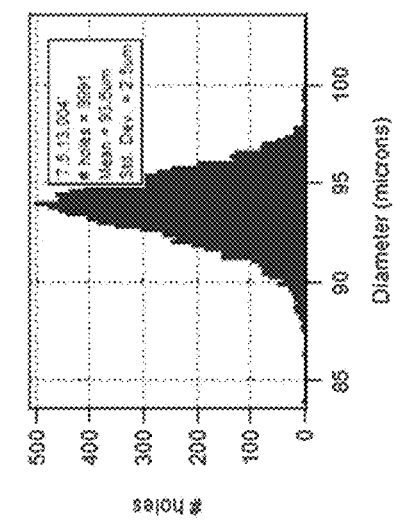
Figure 24C:
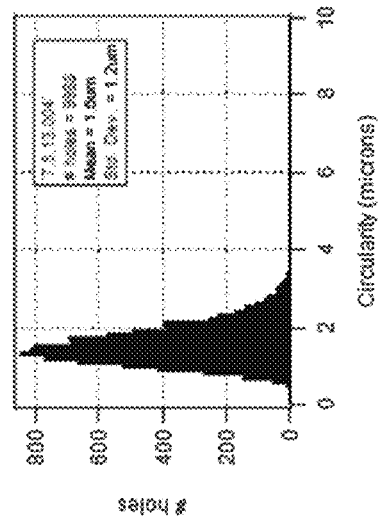
Figure 25A:
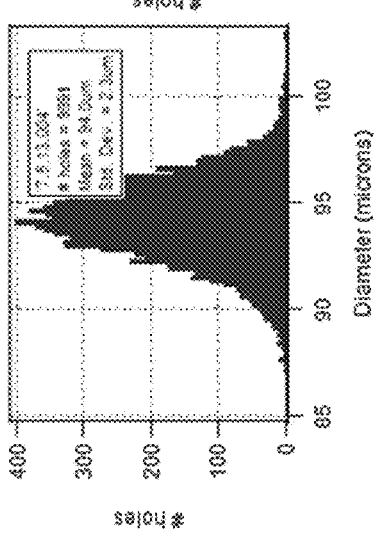
FIGS. 25A-25C are graphs of number of holes a function of circularity for a sample having 100×100 array of holes, showing results for a sample for the top (FIG. 25A), bottom (FIG. 25B), and waists (FIG. 25C).
Figure 25B:
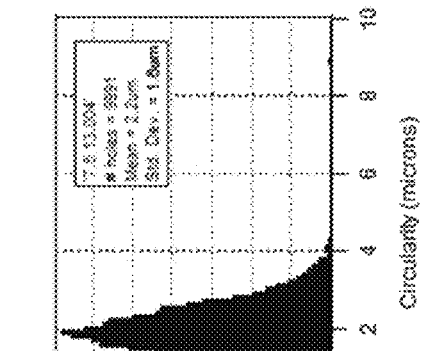
Figure 25C:
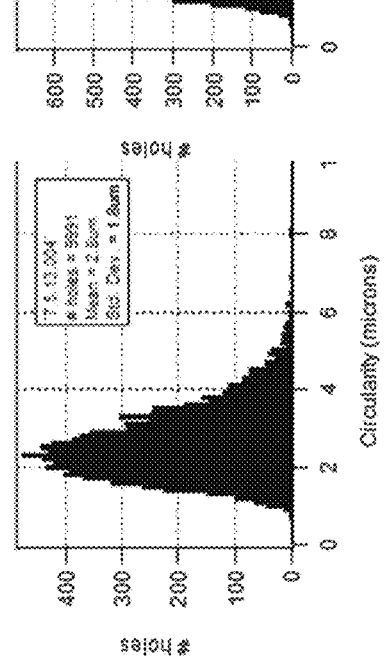

Dimensional analysis on two 100×100 array samples showed that circularity (circularity=largest inscribed diameter−smallest inscribed diameter) is good (i.e., less than about 5 microns), as shown in FIGS. 25A-25C for the first sample (FIG. 25A=top, FIG. 25B=bottom, FIG. 25C=waists), and 27A-27C for the second sample (FIG. 27A=top, FIG. 27B=bottom, FIG. 27C=waists), and the top (shown in FIG. 24A for the first sample and FIG. 26A for the second sample) and bottom (shown in FIG. 24B for the first sample and FIG. 26B for the second sample) diameters are nearly equal, and the waists (shown in FIG. 24C for the first sample and FIG. 26C for the second sample) are open.

Example 2

Figure 28C:
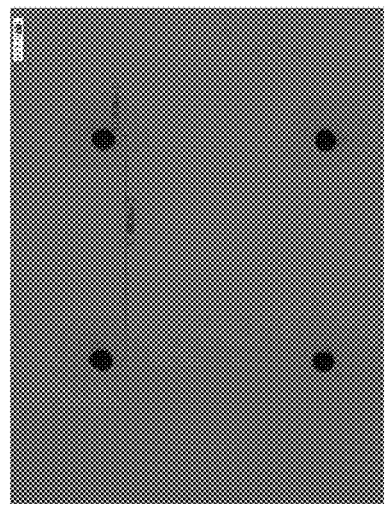
FIGS. 28A-28C and 29A-29C are post acid etch photographs of 30 micron and 50 micron holes, respectively, made using 100% laser power, showing top (FIGS. 28A, 29A), side (FIGS. 28B, 29B), and bottom (FIGS. 28C, 29C) views.
Figure 29C:
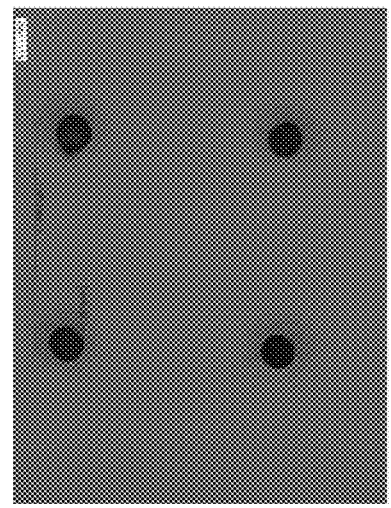
Figure 28B:
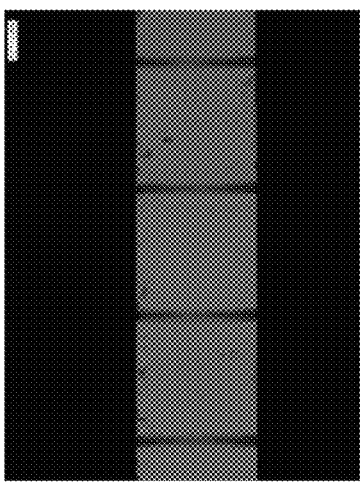
Figure 29B:
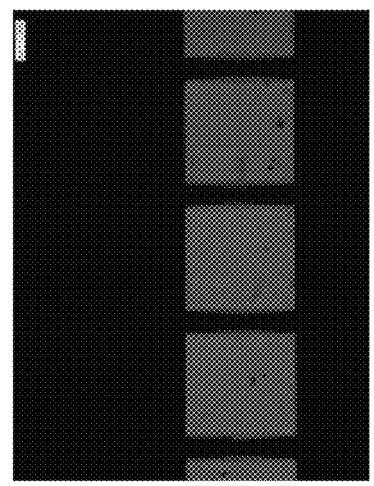
Figure 28A:
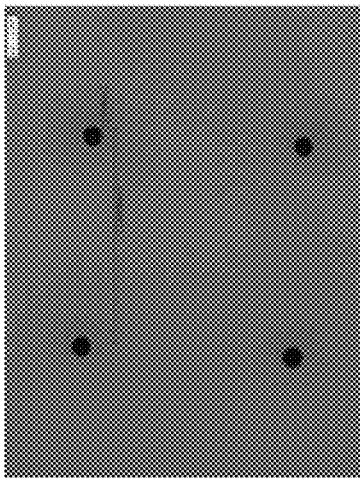
Figure 29A:
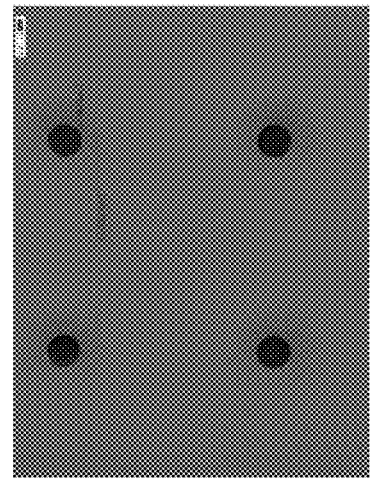
Figure 30C:
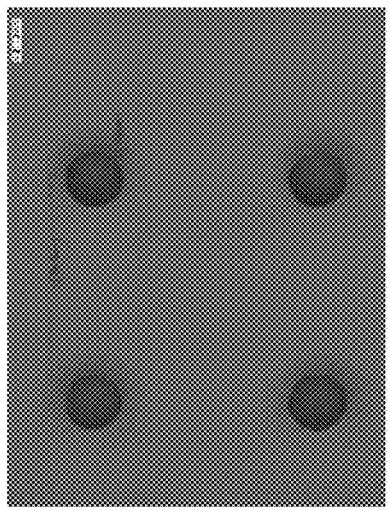
FIGS. 30A-30C and 31A-31C are post acid etch photographs of 75 micron and 100 micron holes, respectively, made using 100% laser power, showing top (FIGS. 30A, 31A), side (FIGS. 30B, 31B), and bottom (FIGS. 30C, 31C) views.
Figure 31C:
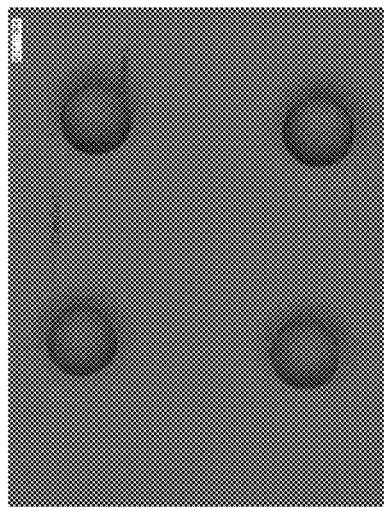
Figure 30B:
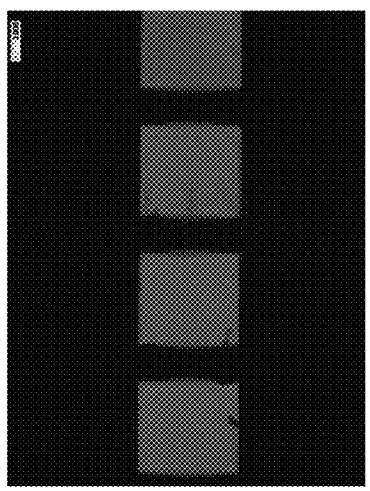
Figure 31B:
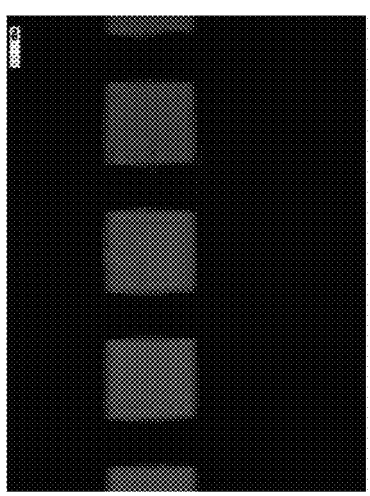
Figure 30A:
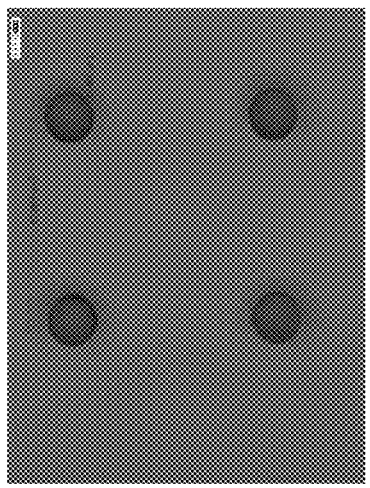
Figure 31A:
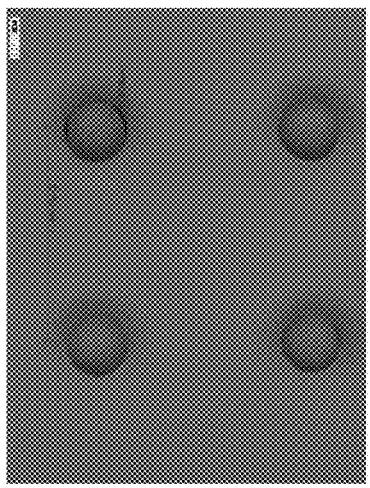
Figure 32A:
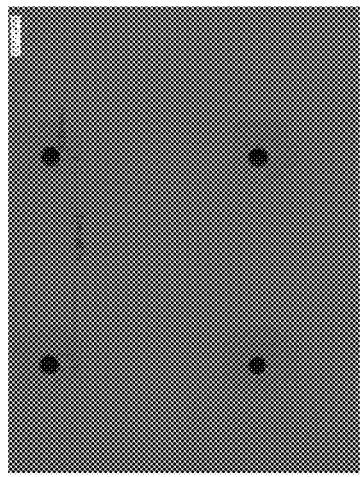
FIGS. 32A-32C and 33A-33C are post acid etch photographs of 30 micron and 50 micron holes, respectively, made using 85% laser power, showing top (FIGS. 32A, 33A), side (FIGS. 32B, 33B), and bottom (FIGS. 32C, 33C) views.
Figure 32B:
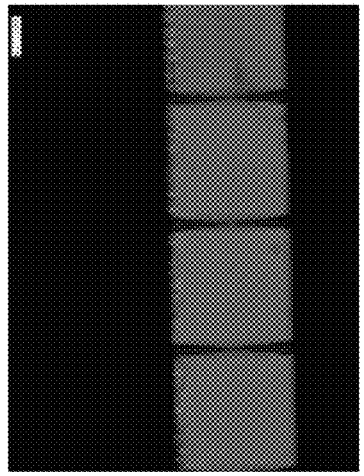
Figure 32C:
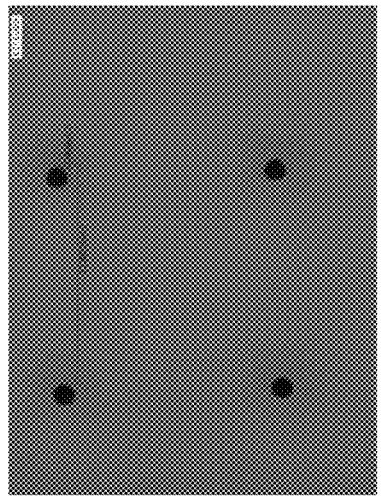
Figure 33A:
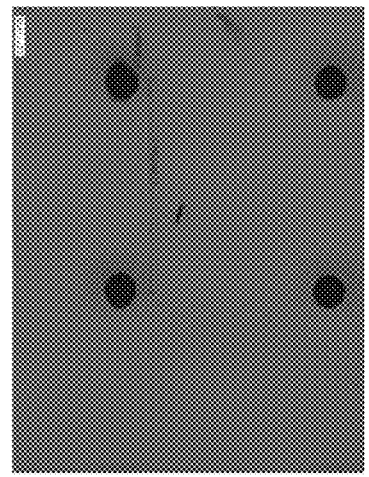
Figure 33B:
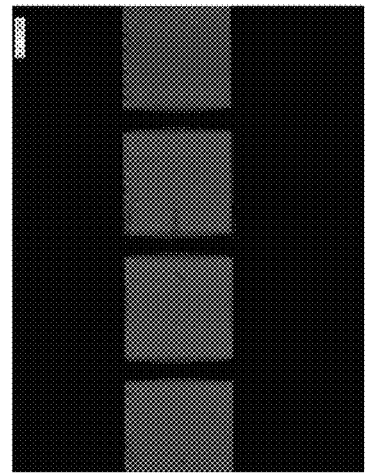
Figure 33C:
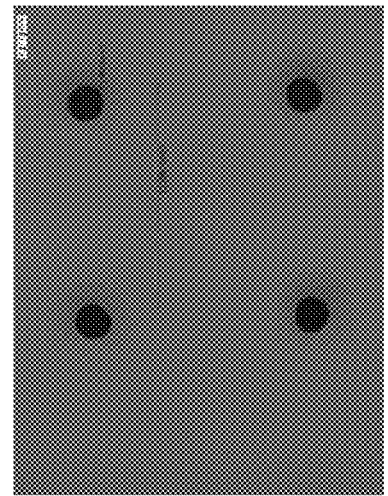
Figure 34C:
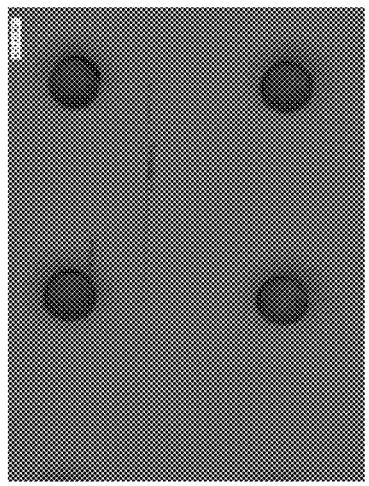
FIGS. 34A-34C and 35A-35C are post acid etch photographs of 75 micron and 100 micron holes, respectively, made using 85% laser power, showing top (FIGS. 34A, 35A), side (FIGS. 34B, 35B), and bottom (FIGS. 34C, 35C) views.
Figure 35C:
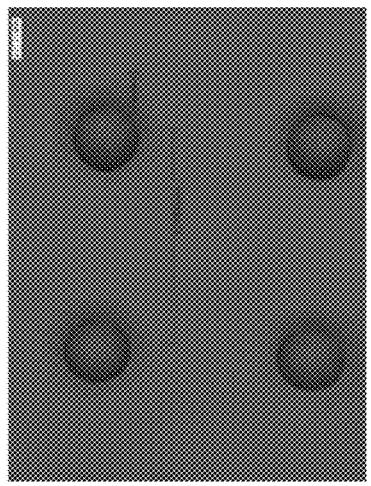
Figure 34B:
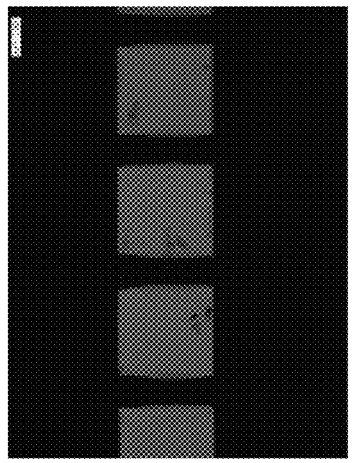
Figure 35B:
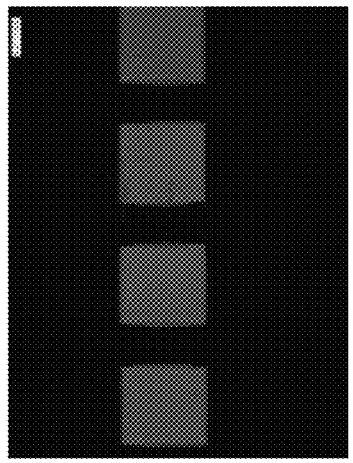
Figure 34A:
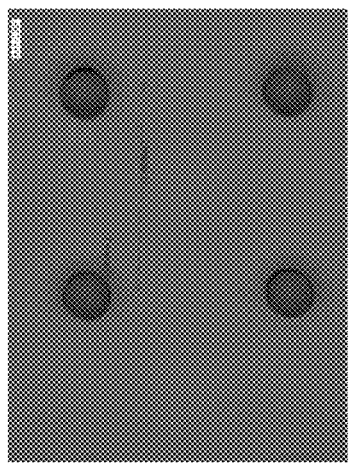
Figure 35A:
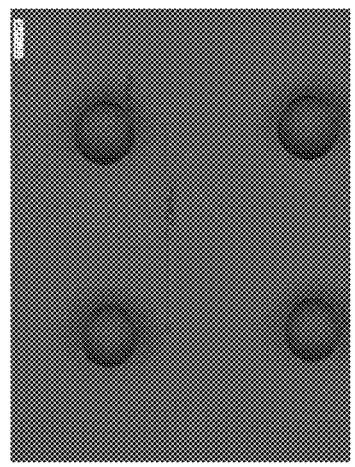
Figure 36C:
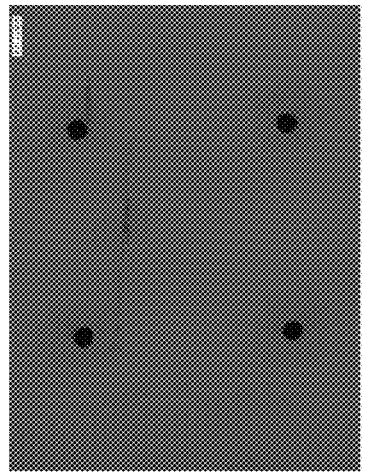
FIGS. 36A-36C and 37A-37C are post acid etch photographs of 30 micron and 50 micron holes, respectively, made using 75% laser power, showing top (FIGS. 36A, 37A), side (FIGS. 36B, 37B), and bottom (FIGS. 36C, 37C) views.
Figure 37C:
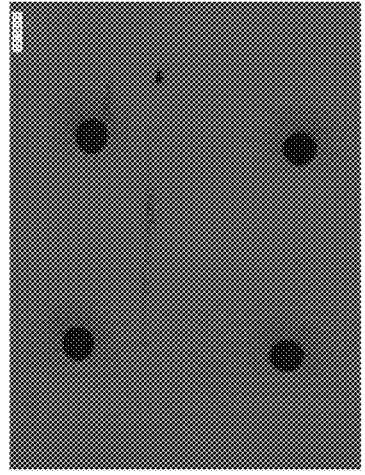
Figure 36B:
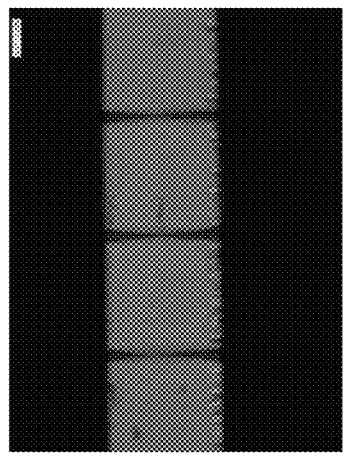
Figure 37B:
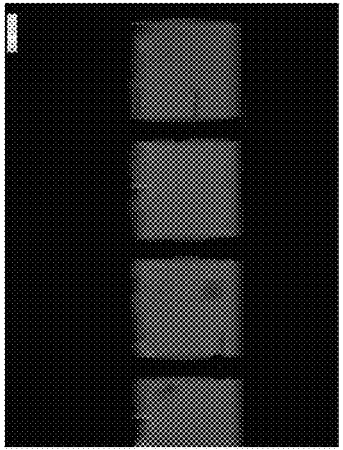
Figure 36A:
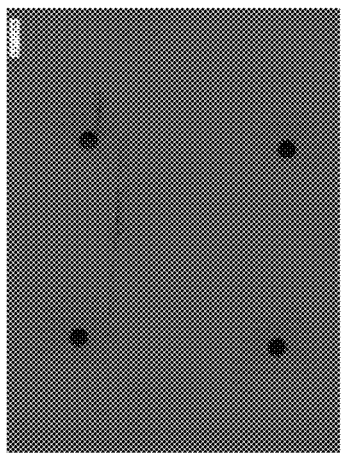
Figure 37A:
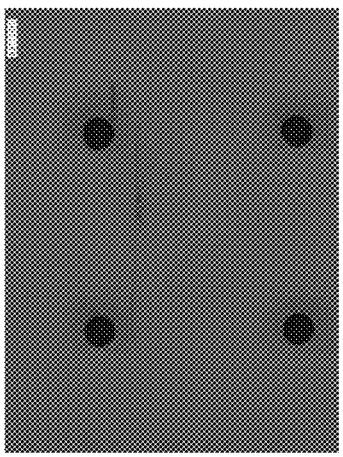
Figure 38C:
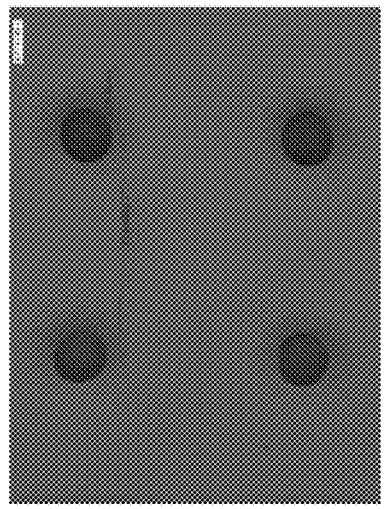
FIGS. 38A-38C and 39A-39C are post acid etch photographs of 75 micron and 100 micron holes, respectively, made using 75% laser power, showing top (FIGS. 38A, 39A), side (FIGS. 38B, 39B), and bottom (FIGS. 38C, 39C) views.
Figure 39C:
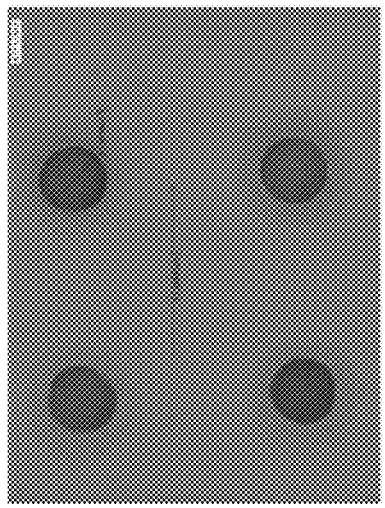
Figure 38B:
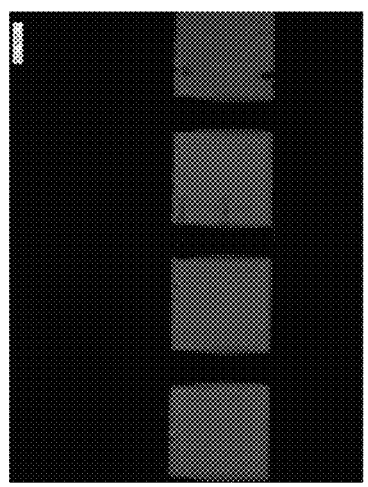
Figure 39B:
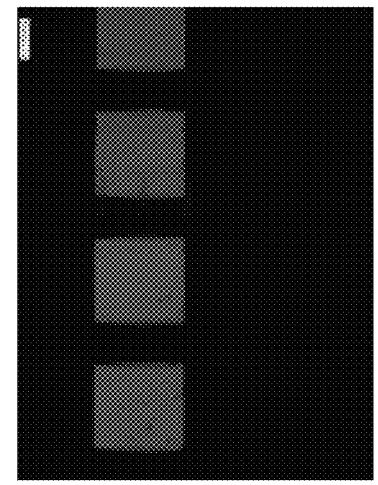
Figure 38A:
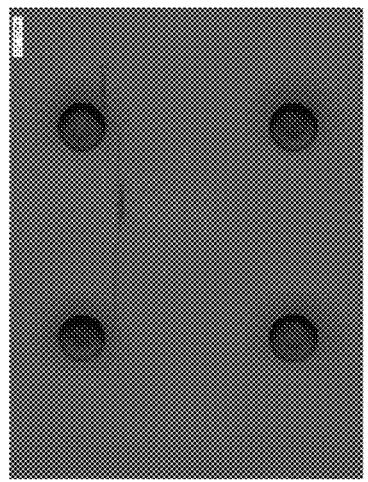
Figure 39A:
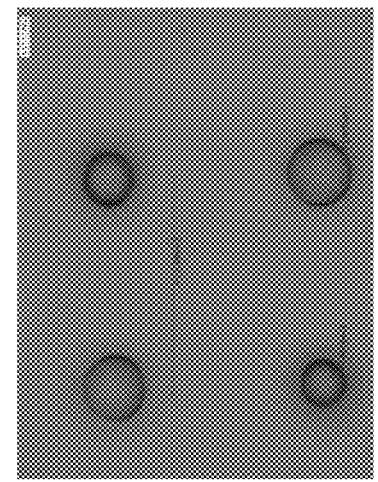
Figure 40C:
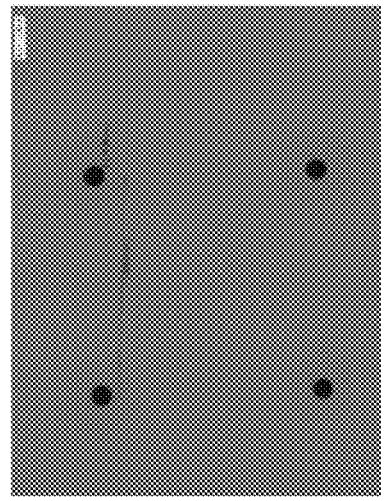
FIGS. 40A-40C and 41A-41C are post acid etch photographs of 30 microns and 50 micron holes, respectively, made using 65% laser power, showing top (FIGS. 40A, 41A), side (FIGS. 40B, 41B), and bottom (FIGS. 40C, 41C) views.
Figure 41C:
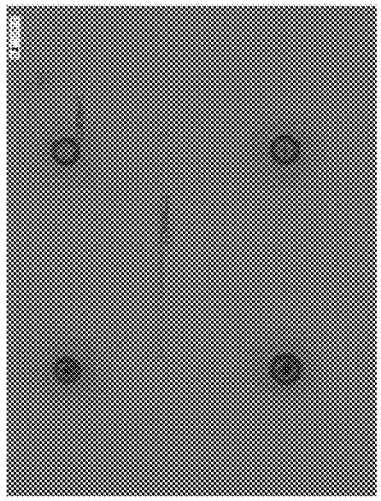
Figure 40B:
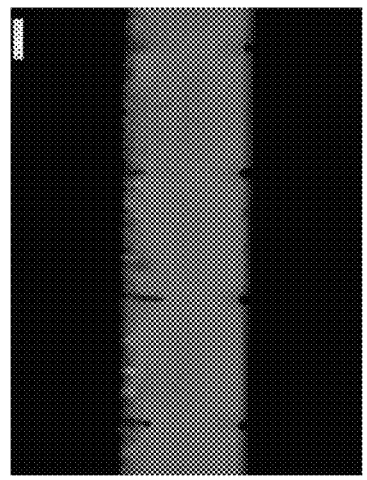
Figure 41B:
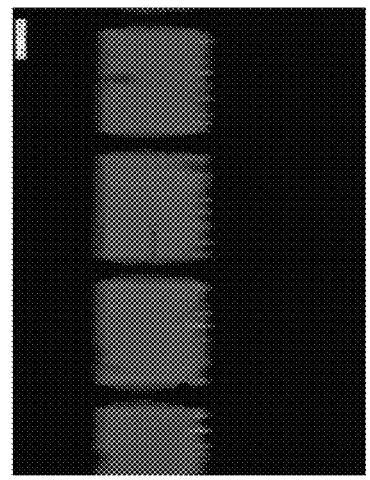
Figure 40A:
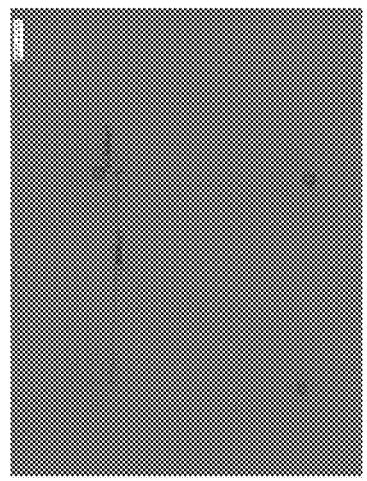
Figure 41A:
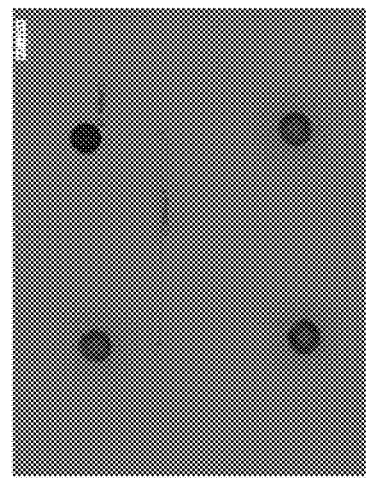
Figure 42C:
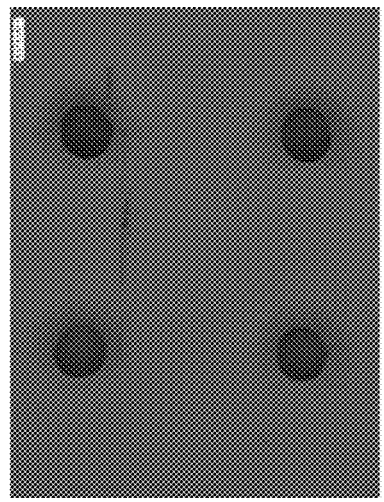
FIGS. 42A-42C and 43A-43C are post acid etch photographs of 75 micron and 100 micron holes, respectively, made using 65% laser power, showing top (FIGS. 42A, 43A), side (FIGS. 42B, 43B), and bottom (FIGS. 42C, 43C) views.
Figure 43C:
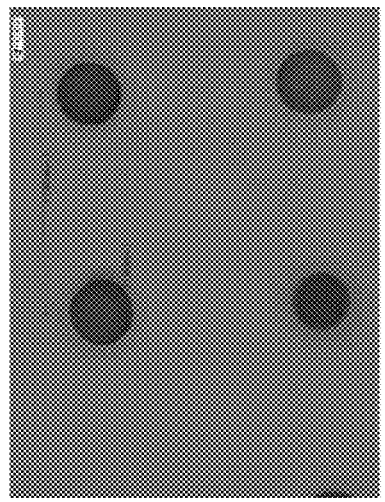
Figure 42B:
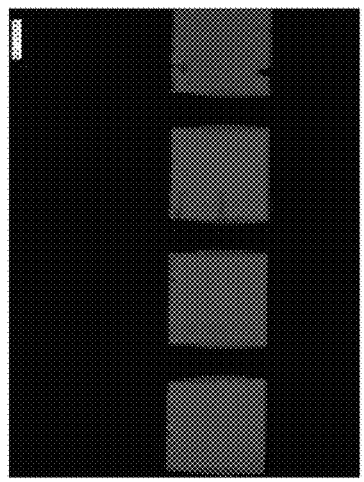
Figure 43B:
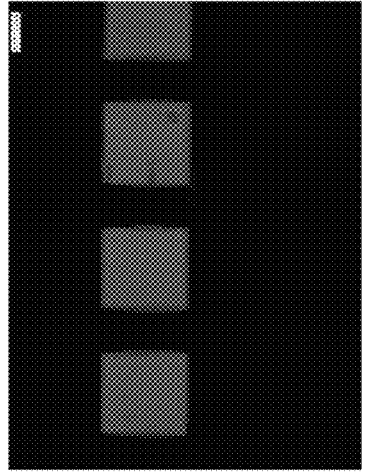
Figure 42A:
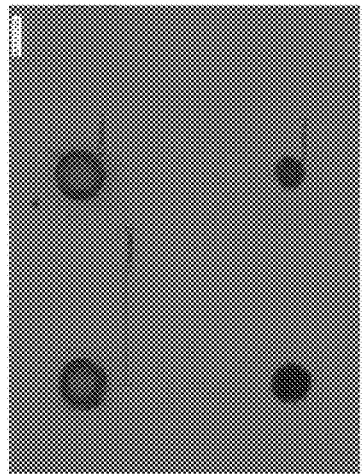
Figure 43A:
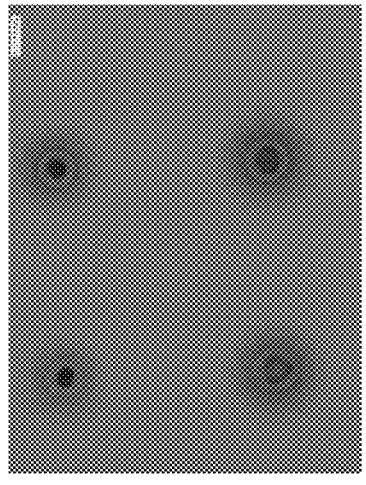
Figure 44C:
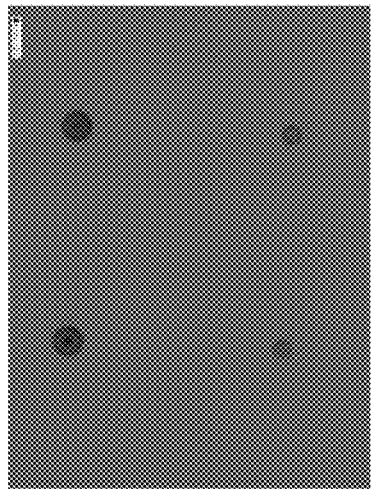
FIGS. 44A-44C and 45A-45C are post acid etch photographs of 30 micron and 50 micron holes, respectively, made using 55% laser power, showing top (FIGS. 44A, 45A), side (FIGS. 44B, 45B), and bottom (FIGS. 44C, 45C) views.
Figure 44B:
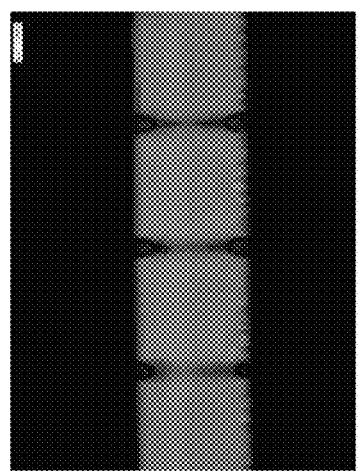
Figure 44A:
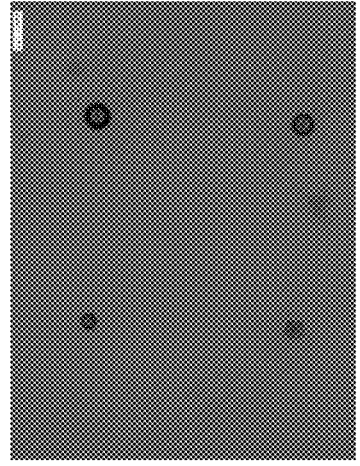
Figure 45C:
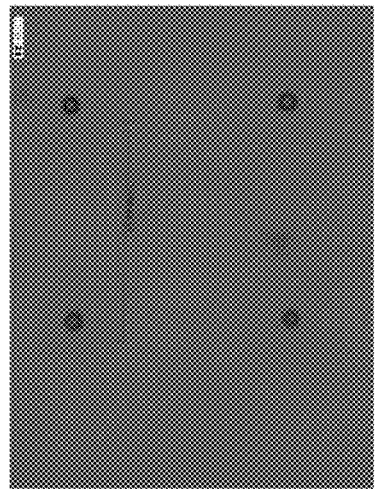
Figure 45B:
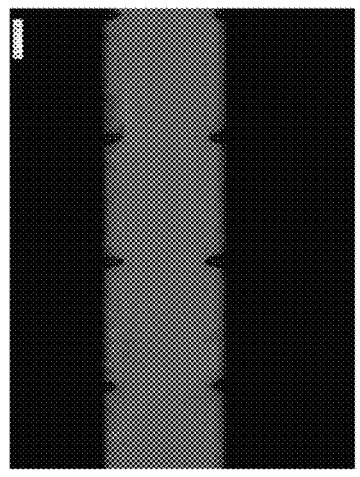
Figure 45A:
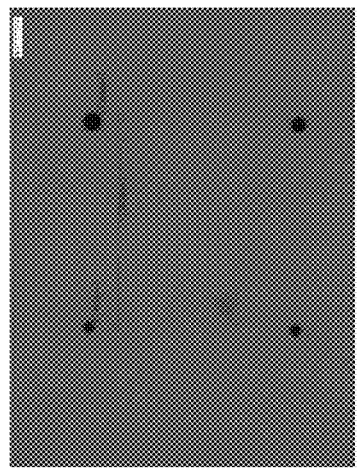
Figure 46A:
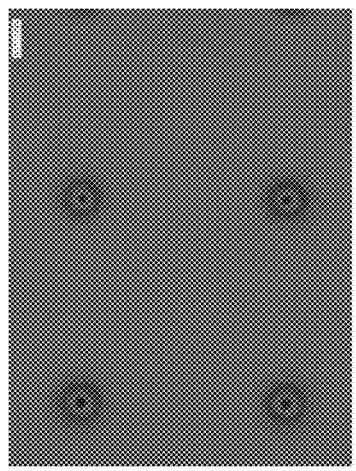
FIGS. 46A-46C and 47A-47C are post acid etch photographs of 75 micron and 100 micron holes, respectively, made using 55% laser power, showing top (FIGS. 46A, 47A), side (FIGS. 46B, 47B), and bottom (FIGS. 46C, 47C) views.
Figure 46B:
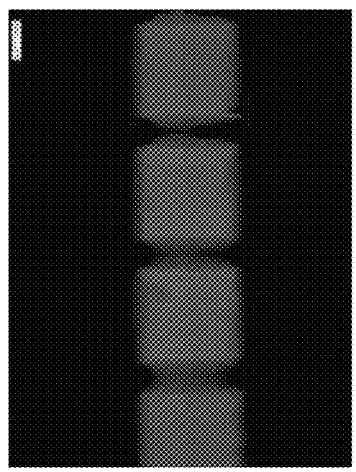
Figure 46C:
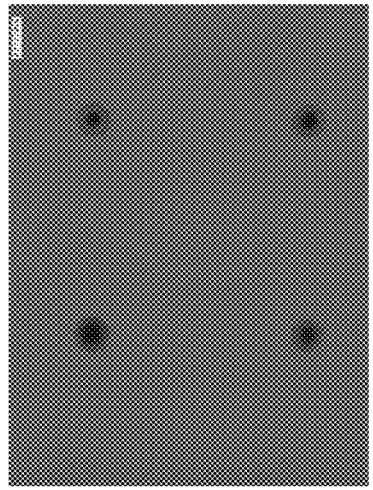
Figure 47A:
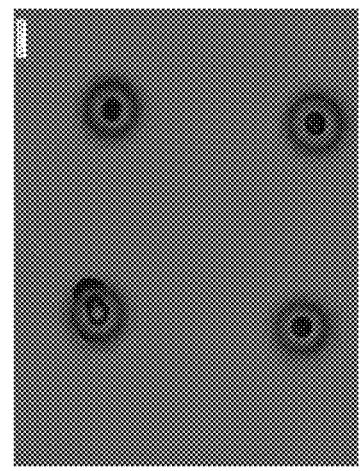
Figure 47B:
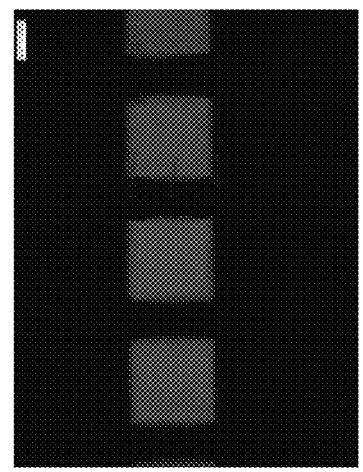
Figure 47C:
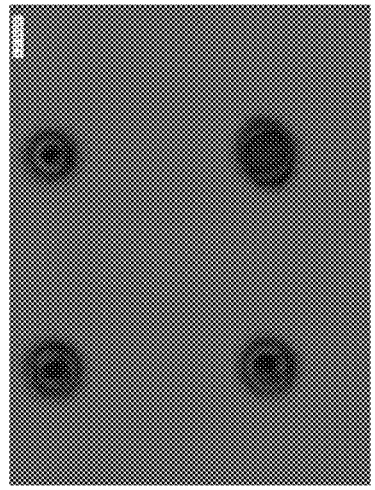

Additional samples of Corning Eagle XG® glass (300 micron thickness) were tested to examine how hole quality varies with final diameter (post-etch). Through holes were made in 150×150 arrays (22,500 holes for each sample) at 300 microns pitch, with increasing laser power (55,65, 75, 85, and 100% laser power), and at four hole diameters obtained by etch removal (30, 50, 75, and 100 micron diameters). The laser conditions for the through hole making process were: 50 mm lens, 12 m/min (200 mm/sec) stage speed, 200 kHz repetition rate 3 pulses per burst. The through holes were made at about 187 holes/sec. As shown in FIGS. 28A-28C for 30 microns holes and in FIGS. 29A-29C for 50 microns holes, at 100% laser power, the waists on 30 microns holes appear narrowed (FIG. 28B), while the waists on 50 micron holes (FIG. 29B) are wide open. As shown in FIGS. 30A-30C for 75 microns holes and in FIGS. 31A-31C for 100 micron holes, at 100% laser power the waists (FIGS. 30B and 31B) on both sizes are wide open. As shown in FIGS. 32A-32C for 30 microns holes and in FIGS. 33A-33C for 50 microns holes, at 85% laser power the waists on 30 micron holes appear narrowed (FIG. 32B), while the waists on 50 micron holes (FIG. 33B) are very open. As shown in FIGS. 34A-34C for 75 micron holes and in FIGS. 35A-35C for 100 micron holes, at 85% laser power the waists (FIGS. 34B and 35B) on both sizes are wide open. As shown in FIGS. 36A-36C for 30 microns holes and in FIGS. 37A-37C for 50 micron holes, at 75% laser power the waists on 30 micron holes appear narrowed (FIG. 36B), while the waists on 50 micron holes (FIG. 37B) are wide open. As shown in FIGS. 38A-38C for 75 micron holes and in FIGS. 39A-39C for 100 micron holes, at 75% laser power the waists (FIGS. 38B and 39B) on both sizes are open, but there may be some variability in overall hole diameter. As shown in FIGS. 40A-40C for 30 micron holes and in FIGS. 41A-41C for 50 micron holes, at 65% laser power the holes are not fully formed inside the glass after etch, with the worst results on 30 micron holes (FIG. 41B), although even the 50 micron holes (FIG. 41A) appear to have some lack of opening or clogging. As shown in FIGS. 42A-42C for 75 micron holes and in FIGS. 43A-43C for 100 micron holes, at 65% laser power there is evidence of poor opening and clogging from top (FIGS. 42A and 43A) and bottom (FIGS. 42C and 43C) views. As shown in FIGS. 44A-44C for 30 micron holes and in FIGS. 45A-45C for 50 micron holes, at 55% laser power the holes are not fully formed and acid etching did not open them up. As shown in FIGS. 46A-46C for 75 micron holes and in FIGS. 47A-47C for 100 micron holes, at 55% laser power the holes are not fully formed and acid etching is not able to open them up. As shown in FIGS. 47A and 47C, even the 100 micron holes show evidence of lack of open waists or clogging in the top and bottom views, respectively.

Example 3

Figure 48:
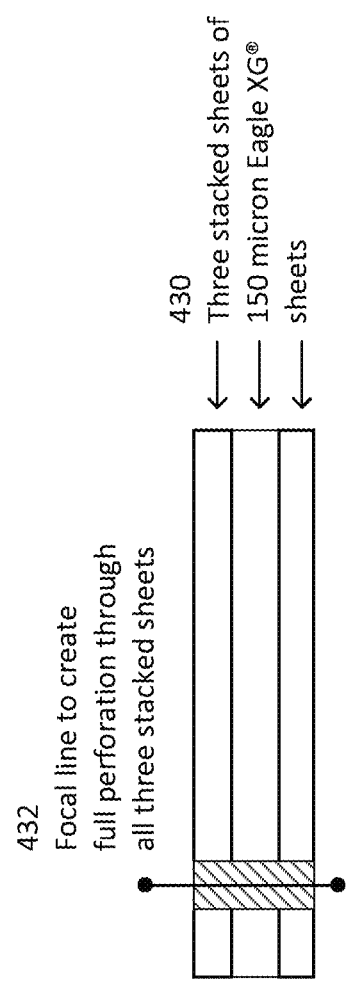
FIG. 48 illustrates a focal line extending through three stacked, 150 micron Eagle XG® glass sheets.

The methods disclosed herein also enable even higher process speeds by allowing multiple layers to be drilled at the same time. FIG. 48 illustrates a focal line 432 extending through three stacked, 150 micron Eagle XG® glass sheets 430. With the focal line 432 extending through all three stacked sheets, a full perforation or full defect line can be formed through all three layers simultaneously. To create a full perforation through a stack, the focal line length needs to be longer than the stack height. Once the parts are drilled, they can be separated and then etched, which allows for easier access of the aid into the holes of each sheet.

A significant advantage of this line focus method for drilling is that the process is no sensitive to air gaps between the parts, unlike processes that rely upon self-focusing of the laser beam. For example, a focused Gaussian beam will diverge upon entering the first glass layer and will not drill to large depths, or if self-focusing occurs due to reflection along the side of the hole or waveguiding as the as the glass is drilled, the beam will emerge from the first glass layer and diffract, and will not drill into the second glass layer. Even in the case of laser processes that use Kerr-effect based self-focusing (sometimes referred to as "filamentation") to achieve longer interaction lengths inside materials, having the laser beam leave an upper glass piece and enter air is problematic, as air requires ~20 times more power in air to induce Kerr-effect based self-focusing over the power need to maintain Kerr-effect self-focusing in glass. In contrast, a Bessel beam will drill both glass layers over the full extent of the line focus, regardless of changes (up to many hundreds of microns or even 1 mm) in the size of the air gap.

Example 4

It is also possible to insert protective layers or coatings on top of, below, and in-between the glass pieces during such a drilling process. As long as the material is transparent to the laser radiation, the beam will still focus through the protective coating and drill the glass pieces. This can be particularly advantageous if one seeks to keep a part clean and prevent scratching or other handling damage during the drilling process. After the part is drilled, the coatings can be removed. Likewise, such layers, such as thin layers of transparent polymer (such as YY-100 polyethylene self-stick film from Donguan Yunyang Industrial Co. Ltd.) can be used in between the sheets during the stack drilling process to prevent surface abrasion of one sheet on the other, helping to retain part strength and prevent cosmetic or other defects.

Figure 49:
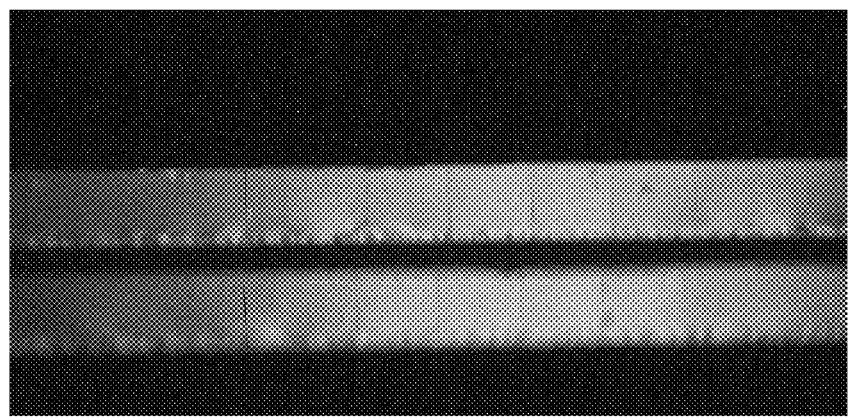
FIG. 49 is a pre-acid etch photograph showing a side view a stack of two sheets of 300 micron thick EXG glass that have been drilled with damage tracks.
Figure 50:
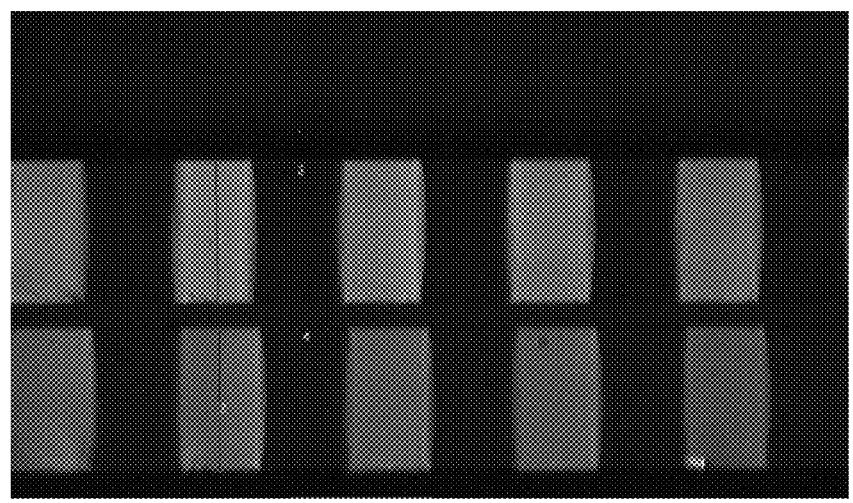
FIG. 50 is a post-acid etch photograph showing a side view of the same stack from FIG. 49 after acid etch.
Figure 51:
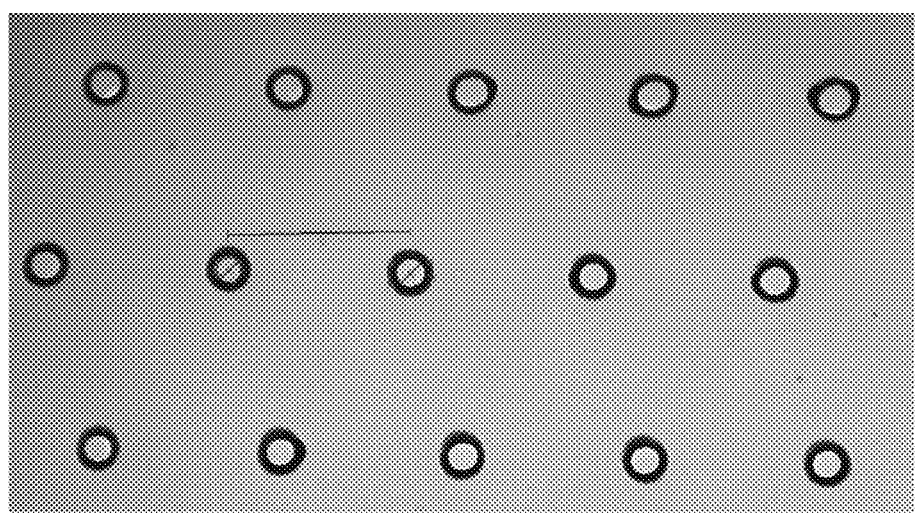
FIG. 51 is a post-acid etch photograph showing a top view of the same stack from FIG. 49 after acid etch.

FIG. 49 shows an image of two sheets of 300 micron thick EXG glass that have been drilled with such a method. FIG. 50 shows the same parts after acid etch. In this case the holes appear to be 150 microns in diameter from a side profile, but are actually about 70 microns in diameter, and only appear to be large form a side perspective because there are multiple rows of holes extending away from the focal plane of the camera, and each row is slightly offset laterally, giving the illusion of a large open hole than there actually is. The top view of the holes (FIG. 51) shows the diameter of the holes are indeed approximately 70 microns, and the light coming through the center of each hole indicates they are open through holes.

Example 5

Figure 58:
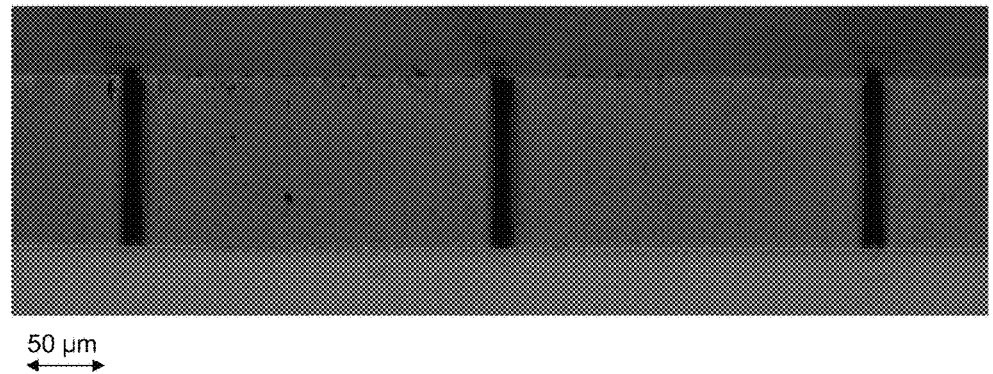
FIG. 58 is a post-acid etch photograph of a side view of the glass part.

A 150 μm thick Corning Eagle XG® glass part having damage tracks was vertically placed in an acid etch bath having 5% HF/7.5% HNO₃ by volume. The part was etched for 810 seconds at a temperature of 26° C. to remove about 13 microns of material at a rate of about 1 micron/min. Ultrasonic agitation at a combination of 40 kHz and 80 kHz frequencies was used to facilitate penetration of fluid and fluid exchange in the holes. In addition, continuous movement of the part in the x, y, and z directions within the ultrasonic field was made to prevent standing wave patterns from the ultrasonic field from creating "hot spots" or cavitation related damage on the part, and also to provide macroscopic fluid flow across the part. During etching the damage tracks were enlarged to create via holes having a 13 μm diameter, an aspect ratio of 11:1, and a waist diameter that was 73% of the average of the diameters of the via openings at the top and bottom surfaces of the glass part. FIG. 58 is a post-acid etch photograph of a side view of the glass part.

The relevant teachings of all patents, published applications and references cited herein are incorporated by reference in their entirety.

While exemplary embodiments have been disclosed herein, it will be understood by those skilled in the art that various changes in form and details may be made therein without departing from the scope encompassed by the appended claims.

What is claimed is:

1. A method of forming through-holes in a material comprising:
    forming a plurality of damage tracks into the material by focusing a pulsed laser beam into a laser beam focal line oriented along a beam propagation direction and directing the laser beam focal line into the material, wherein the damage tracks have a diameter of less than 5 μm; and
    etching the material to enlarge the plurality of damage tracks to produce a plurality of through-holes in the material so that (i) the plurality of through-holes comprise an opening in a first surface of the material and an opening in a second surface of the material and (ii) the plurality of through-holes have a circularity of less than 5 μm at at least one of the first surface and the second surface.

2. The method of claim 1, wherein the material is transparent to at least one wavelength in a range from 390 nm to 700 nm.

3. The method of claim 1, wherein the material can transmit at least 70% of at least one wavelength in a range from 390 nm to 700 nm.

4. The method of claim 1, further comprising mechanically agitating the acid solution during etching.

5. The method of claim 1, wherein the plurality of through-holes have a diameter of 20 μm or less and a spacing between adjacent through-holes of at least 10 microns.

6. The method of claim 5, wherein:
    the plurality of through-holes comprise a waist located between the opening in the first surface and the opening in the second surface,
    a diameter of the waist is at least 50% of the diameter of the opening in the first surface or the opening in the second surface, and
    a difference between a diameter of the opening in the first surface and a diameter of the opening in the second surface is 3 μm or less.

7. The method of claim 1, wherein the acid solution comprises a surfactant.

8. The method of claim 1, wherein the damage tracks are made in an aperiodic pattern.

9. The method of claim 1, wherein the pulsed laser beam produces at least 500 damage tracks/sec.

10. The method of claim 1, wherein the pulsed laser beam produces at least 1,000 damage tracks/sec.

11. The method of claim 1, wherein the material is a glass.

12. The method of claim 1, wherein the material is fused silica.

13. The method of claim 1, wherein the etching is at a rate of less than about 5 microns/min.

14. The method of claim 1, wherein the pulsed laser beam has a burst energy density in a range from 25 microJoules/mm of line focus to 125 microJoules/mm of line focus.

15. The method of claim 1, wherein pulses of the pulsed laser beam are produced in bursts of at least two pulses separated by a duration in a range of between about 1 nsec and about 50 nsec, and wherein a burst repetition frequency of the bursts is in a range of between about 1 kHz and about 650 kHz.

16. The method of claim 15, wherein the at least two pulses are separated by a duration of 20 nsec plus or minus 2 nsec.

17. The method of claim 1, wherein the damage tracks have a diameter of less than 4 μm.

18. The method of claim 1, wherein the pulsed laser beam has a wavelength λ.

19. The method of claim 1, wherein focusing the pulsed laser beam into the laser beam focal line comprises passing the pulsed laser beam through an optical arrangement, wherein the optical arrangement comprises a optical element that is illuminated in a ring-shaped region.

20. The method of claim 1, wherein a Thiele modulus of the etching is less than or equal to 2.

21. The method of claim 1, wherein at least a portion of the plurality of through-holes have a diameter of 30 μm or less.

22. The method of claim 1, wherein a difference between a diameter of the opening in the first surface and a diameter of the opening in the second surface is 3 μm or less.

23. The method of claim 1, wherein the plurality of through-holes have an aspect ratio of 3:1 or greater.

24. The method of claim 1, where the focal line is created by using a Bessel beam or a Gauss-Bessel beam.

25. The method of claim 1, wherein focusing the pulsed laser beam into the laser beam focal line comprises passing the pulsed laser beam through an optical arrangement, wherein the optical arrangement comprises an axicon.

26. The method of claim 1, wherein at least a portion of the plurality of through-holes comprise:
    a waist located between the opening in the first surface and the opening in the second surface,
    a diameter of the waist of at least 50% of the diameter of the opening in the first surface,
    a diameter of 100 μm or less at the first surface, and
    an aspect ratio of the substrate thickness to the diameter at the first surface of 1:1 or greater.

* * * * *

UNITED STATES PATENT AND TRADEMARK OFFICE
CERTIFICATE OF CORRECTION

PATENT NO. : 10,144,093 B2
APPLICATION NO. : 15/251453
DATED : December 4, 2018
INVENTOR(S) : Sasha Marjanovic et al.

Page 1 of 1

It is certified that error appears in the above-identified patent and that said Letters Patent is hereby corrected as shown below:

On the Title Page

On page 5, Column 2, item (56), other publications, Line 17, delete "pluse" and insert -- pulse --, therefor.

On page 6, Column 1, item (56), other publications, Line 65, delete "Partical" and insert -- Particle --, therefor.

On page 7, Column 2, item (56), other publications, Lines 26-27, delete "Eelectropolishing" and insert -- Electropolishing --, therefor.

Signed and Sealed this
Second Day of June, 2020

Andrei Iancu
*Director of the United States Patent and Trademark Office*